(12) United States Patent
Raghavan et al.

(10) Patent No.: US 12,057,921 B2
(45) Date of Patent: Aug. 6, 2024

(54) METHODS FOR SWITCHING BETWEEN REPEATER AND INTELLIGENT REFLECTIVE SURFACE OPERATIONS IN AN ASSISTIVE DEVICE

(71) Applicant: QUALCOMM INCORPORATED

(72) Inventors: Vasanthan Raghavan, West Windsor Township, NJ (US); Mohammad Ali Tassoudji, San Diego, CA (US); Tao Luo, San Diego, CA (US); Junyi Li, Fairless Hills, PA (US)

(73) Assignee: QUALCOMM Incorporated, San Diego, CA (US)

( * ) Notice: Subject to any disclaimer, the term of this patent is extended or adjusted under 35 U.S.C. 154(b) by 247 days.

(21) Appl. No.: 17/454,444

(22) Filed: Nov. 10, 2021

(65) Prior Publication Data
US 2023/0142735 A1    May 11, 2023

(51) Int. Cl.
*H04B 7/155* (2006.01)
*H01Q 19/10* (2006.01)
*H04W 72/12* (2023.01)

(52) U.S. Cl.
CPC ............. *H04B 7/155* (2013.01); *H01Q 19/10* (2013.01); *H04W 72/12* (2013.01)

(58) Field of Classification Search
None
See application file for complete search history.

(56) References Cited

U.S. PATENT DOCUMENTS

2022/0052764 A1* 2/2022 Medra .................. H04B 10/541
2022/0322321 A1* 10/2022 Dai .................... H04W 52/0206

FOREIGN PATENT DOCUMENTS

WO    WO-2021258997 A1 * 12/2021 ............... H04B 1/04
WO    WO-2023075656 A1 *  5/2023

OTHER PUBLICATIONS

International Search Report and Written Opinion—PCT/US2022/048383—ISA/EPO—Feb. 24, 2023.
(Continued)

*Primary Examiner* — Gerald A Smarth
(74) *Attorney, Agent, or Firm* — Holland & Hart LLP

(57) ABSTRACT

Methods, systems, and devices for wireless communications are described. An assistive node may include circuitry for operating in an amplifying mode and operating in a reflecting mode. The assistive node may transmit a message to a network entity indicating that the assistive node is capable of operating in an amplifying mode or a reflecting mode. The network entity may transmit scheduling information to the assistive node for a packet transmission to be reflected or amplified by the assistive node to a wireless device, for example, because a direct path between the network entity and the wireless device is blocked. The network entity may transmit control signaling to the assistive node configuring the assistive node to either reflect or amplify the packet transmission to the wireless device. The assistive node may reflect or amplify the packet transmission to the wireless device based on the control signaling.

30 Claims, 22 Drawing Sheets

(56) References Cited

OTHER PUBLICATIONS

Liu Y., et al., "Transmission Mode Switching for Relay/RIS Assisted Device-to-Device Communication Networks", 2021 IEEE/CIC International Conference on Communications in China (ICCC Workshops), IEEE, Jul. 28, 2021, pp. 133-136, XP033976814, Retrieved on Sep. 14, 2021, Abstract, Figures 1-2, p. 135, 4 Pages.

Nguyen T. H., et al., "Hybrid Relay-Reflecting Intelligent Surface-Assisted Wireless Communication", arxiv.org, Cornell University Library, 201 OLIN Library Cornell University Ithaca, NY 14853, Mar. 5, 2021, XP081906862, Abstract, Figures 1-2, p. 3, 13 Pages.

\* cited by examiner

METHODS FOR SWITCHING BETWEEN REPEATER AND INTELLIGENT REFLECTIVE SURFACE OPERATIONS IN AN ASSISTIVE DEVICE

FIELD OF TECHNOLOGY

The following relates to wireless communications, including methods for switching between repeater and intelligent reflective surface operations in an assistive device.

BACKGROUND

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal FDMA (OFDMA), or discrete Fourier transform spread orthogonal frequency division multiplexing (DFT-S-OFDM). A wireless multiple-access communications system may include one or more base stations or one or more network access nodes, each simultaneously supporting communication for multiple communication devices, which may be otherwise known as user equipment (UE).

SUMMARY

The described techniques relate to improved methods, systems, devices, and apparatuses that support methods for switching between repeater and intelligent reflective surface (IRS) operations in an assistive device. Generally, the described techniques provide for control signaling between a network entity (e.g., a base station) and an assistive node for configuring the assistive node to either reflect or amplify a packet transmission from the network entity to another wireless device. An assistive node may include circuitry for operating in an amplifying mode (e.g., a repeating mode or a relaying mode) and operating in a reflecting mode (e.g., via an IRS or a reflect-array). Under some conditions an amplifying mode may be associated with better performance, while under other conditions, a reflecting mode may be associated with better performance. The assistive node may transmit a message to a network entity indicating that the assistive node is capable of operating in an amplifying mode or a reflecting mode. The network entity may transmit scheduling information to the assistive node for a packet transmission to be reflected or amplified by the assistive node to a wireless device (e.g., a user equipment (UE)), for example, because a direct path between the network entity and the wireless device is blocked. The network entity may transmit control signaling to the assistive node configuring the assistive node to either reflect or amplify (e.g., relay or repeat) the packet transmission to the wireless device.

In some examples, the network entity or assistive node may select whether the assistive node should operate in a reflecting mode or an amplifying mode to reflect or amplify the packet transmission based on a message type of the packet transmission, a latency target associated with the packet transmission, a power consumption target, a size of an analog beamforming codebook associated with the assistive node, beamwidths associated with beams in the analog beamforming codebook, a number of antenna elements of the assistive node, a distance between the network entity and the assistive node, the distance between the assistive node and the wireless device, or a combination thereof.

A method for wireless communications at an assistive node is described. The method may include transmitting, to a network entity, a control message indicating that the assistive node is capable of operating in an amplifying mode and in a reflecting mode, receiving, from the network entity, scheduling information for a packet transmission, receiving, from the network entity, control signaling indicating which one of the reflecting mode or the amplifying mode is to be applied by the assistive node based on the control message, and amplifying or reflecting the packet transmission to a wireless device based on the control signaling.

An apparatus for wireless communications at an assistive node is described. The apparatus may include a processor, memory coupled with the processor, and instructions stored in the memory. The instructions may be executable by the processor to cause the apparatus to transmit, to a network entity, a control message indicating that the assistive node is capable of operating in an amplifying mode and in a reflecting mode, receive, from the network entity, scheduling information for a packet transmission, receive, from the network entity, control signaling indicating which one of the reflecting mode or the amplifying mode is to be applied by the assistive node based on the control message, and amplify or reflect the packet transmission to a wireless device based on the control signaling.

Another apparatus for wireless communications at an assistive node is described. The apparatus may include means for transmitting, to a network entity, a control message indicating that the assistive node is capable of operating in an amplifying mode and in a reflecting mode, means for receiving, from the network entity, scheduling information for a packet transmission, means for receiving, from the network entity, control signaling indicating which one of the reflecting mode or the amplifying mode is to be applied by the assistive node based on the control message, and means for amplifying or reflecting the packet transmission to a wireless device based on the control signaling.

A non-transitory computer-readable medium storing code for wireless communications at an assistive node is described. The code may include instructions executable by a processor to transmit, to a network entity, a control message indicating that the assistive node is capable of operating in an amplifying mode and in a reflecting mode, receive, from the network entity, scheduling information for a packet transmission, receive, from the network entity, control signaling indicating which one of the reflecting mode or the amplifying mode is to be applied by the assistive node based on the control message, and amplify or reflect the packet transmission to a wireless device based on the control signaling.

Some examples of the method, apparatuses, and non-transitory computer-readable medium described herein may further include operations, features, means, or instructions for transmitting, to the network entity, a second message indicating a number and arrangement of antenna elements of the assistive node, where the control signaling instructs the assistive node to use at least a subset of antenna elements of the assistive node for amplifying or reflecting the packet transmission based on the number and arrangement of antenna elements.

Some examples of the method, apparatuses, and non-transitory computer-readable medium described herein may further include operations, features, means, or instructions for receiving the control signaling indicating an antenna element threshold, where the assistive node operates in the amplifying mode to amplify the packet transmission based on a number of antenna elements of the assistive node satisfying the antenna element threshold or the assistive node operates in the reflecting mode to reflect the packet transmission based on the number of antenna elements not satisfying the antenna element threshold.

Some examples of the method, apparatuses, and non-transitory computer-readable medium described herein may further include operations, features, means, or instructions for receiving the control signaling indicating a first beam of a first codebook that may be associated with the assistive node operating in the amplifying mode, where the packet transmission may be amplified by the assistive node using the first beam.

Some examples of the method, apparatuses, and non-transitory computer-readable medium described herein may further include operations, features, means, or instructions for transmitting, to the network entity, a second message indicating an estimated distance between the assistive node and the network entity, where the control signaling indicates to operate in the reflecting mode to reflect the packet transmission or operate in the amplifying mode to amplify the packet transmission based on the estimated distance between the assistive node and the network entity.

Some examples of the method, apparatuses, and non-transitory computer-readable medium described herein may further include operations, features, means, or instructions for receiving the control signaling indicating a distance threshold between the assistive node and the network entity, where the assistive node operates in the amplifying mode to amplify the packet transmission based on an estimated distance between the assistive node and the network entity satisfying the distance threshold or the assistive node operates in the reflecting mode to reflect the packet transmission based on the estimated distance between the assistive node and the network entity not satisfying the distance threshold.

Some examples of the method, apparatuses, and non-transitory computer-readable medium described herein may further include operations, features, means, or instructions for transmitting, to the network entity, a second message indicating an estimated distance between the assistive node and the wireless device, where the control signaling indicates to one of operate in the reflecting mode to reflect the packet transmission or operate in the amplifying mode to amplify the packet transmission based on the estimated distance between the assistive node and the wireless device.

Some examples of the method, apparatuses, and non-transitory computer-readable medium described herein may further include operations, features, means, or instructions for receiving the control signaling indicating a distance threshold between the assistive node and the wireless device, where the assistive node operates in the amplifying mode to amplify the packet transmission based on an estimated distance between the assistive node and the wireless device satisfying the distance threshold or the assistive node operates in the reflecting mode to reflect the packet transmission based on the estimated distance between the assistive node and the wireless device not satisfying the distance threshold.

Some examples of the method, apparatuses, and non-transitory computer-readable medium described herein may further include operations, features, means, or instructions for receiving the control signaling indicating which one of the reflecting mode or the amplifying mode may be to be applied to the packet transmission based on a message type of the packet transmission, a latency target associated with the packet transmission, a size of an analog beamforming codebook associated with the assistive node, beamwidths associated with beams in the analog beamforming codebook, a number and arrangement of antenna elements of the assistive node, a first threshold distance between the assistive node and the wireless device, a second threshold distance between the assistive node and the network entity, or a combination thereof.

In some examples of the method, apparatuses, and non-transitory computer-readable medium described herein, the packet transmission may be one of reflected via a reflective surface of the assistive node or amplified via one of a relay or a repeater of the assistive node.

Some examples of the method, apparatuses, and non-transitory computer-readable medium described herein may further include operations, features, means, or instructions for receiving, from the network entity, a second message including the scheduling information and the control signaling.

Some examples of the method, apparatuses, and non-transitory computer-readable medium described herein may further include operations, features, means, or instructions for selecting at least a subset of antenna elements of the assistive node and a size of an analog beamforming codebook for amplifying or reflecting the packet transmission based on the control signaling indicating which one of the reflecting mode or the amplifying mode may be to be applied by the assistive node.

A method for wireless communications at a network entity is described. The method may include receiving, from an assistive node, a control message indicating that the assistive node is capable of operating in an amplifying mode and in a reflecting mode, transmitting, to the assistive node, scheduling information for a packet transmission, transmitting, to the assistive node, control signaling indicating which one of the reflecting mode or the amplifying mode is to be applied by the assistive node to reflect or amplify the packet transmission to a wireless device based on the control message, and transmitting, to the assistive node, the packet transmission based on the scheduling information.

An apparatus for wireless communications at a network entity is described. The apparatus may include a processor, memory coupled with the processor, and instructions stored in the memory. The instructions may be executable by the processor to cause the apparatus to receive, from an assistive node, a control message indicating that the assistive node is capable of operating in an amplifying mode and in a reflecting mode, transmit, to the assistive node, scheduling information for a packet transmission, transmit, to the assistive node, control signaling indicating which one of the reflecting mode or the amplifying mode is to be applied by the assistive node to reflect or amplify the packet transmission to a wireless device based on the control message, and transmit, to the assistive node, the packet transmission based on the scheduling information.

Another apparatus for wireless communications at a network entity is described. The apparatus may include means for receiving, from an assistive node, a control message indicating that the assistive node is capable of operating in an amplifying mode and in a reflecting mode, means for transmitting, to the assistive node, scheduling information for a packet transmission, means for transmitting, to the assistive node, control signaling indicating which one of the reflecting mode or the amplifying mode is to be applied by the assistive node to reflect or amplify the packet transmission to a wireless device based on the control message, and means for transmitting, to the assistive node, the packet transmission based on the scheduling information.

A non-transitory computer-readable medium storing code for wireless communications at a network entity is described. The code may include instructions executable by a processor to receive, from an assistive node, a control message indicating that the assistive node is capable of operating in an amplifying mode and in a reflecting mode, transmit, to the assistive node, scheduling information for a packet transmission, transmit, to the assistive node, control signaling indicating which one of the reflecting mode or the amplifying mode is to be applied by the assistive node to reflect or amplify the packet transmission to a wireless device based on the control message, and transmit, to the assistive node, the packet transmission based on the scheduling information.

Some examples of the method, apparatuses, and non-transitory computer-readable medium described herein may further include operations, features, means, or instructions for receiving, from the assistive node, a second message indicating a number and arrangement of antenna elements of the assistive node, where the control signaling instructs the assistive node to use at least a subset of antenna elements of the assistive node for amplifying or reflecting the packet transmission based on the number and arrangement of antenna elements.

Some examples of the method, apparatuses, and non-transitory computer-readable medium described herein may further include operations, features, means, or instructions for transmitting the control signaling indicating an antenna element threshold, where the assistive node operates in the amplifying mode to amplify the packet transmission based on a number of antenna elements of the assistive node satisfying the antenna element threshold or the assistive node operates in the reflecting mode to reflect the packet transmission based on the number of antenna elements not satisfying the antenna element threshold.

Some examples of the method, apparatuses, and non-transitory computer-readable medium described herein may further include operations, features, means, or instructions for transmitting the control signaling indicating a first beam of a first codebook that may be associated with the assistive node operating in the amplifying mode, where the packet transmission may be amplified by the assistive node using the first beam.

Some examples of the method, apparatuses, and non-transitory computer-readable medium described herein may further include operations, features, means, or instructions for receiving, from the assistive node, a second message indicating an estimated distance between the assistive node and the network entity, where the control signaling indicates to operate in the reflecting mode to reflect the packet transmission or operate in the amplifying mode to amplify the packet transmission based on the estimated distance between the assistive node and the network entity.

Some examples of the method, apparatuses, and non-transitory computer-readable medium described herein may further include operations, features, means, or instructions for transmitting the control signaling indicating a distance threshold between the assistive node and the network entity, where the assistive node operates in the amplifying mode to amplify the packet transmission based on an estimated distance between the assistive node and the network entity satisfying the distance threshold or the assistive node operates in the reflecting mode to reflect the packet transmission based on the estimated distance between the assistive node and the network entity not satisfying the distance threshold.

Some examples of the method, apparatuses, and non-transitory computer-readable medium described herein may further include operations, features, means, or instructions for receiving, from the assistive node, a second message indicating an estimated distance between the assistive node and the wireless device, where the control signaling indicates to one of operate in the reflecting mode to reflect the packet transmission or operate in the amplifying mode to amplify the packet transmission based on the estimated distance between the assistive node and the wireless device.

Some examples of the method, apparatuses, and non-transitory computer-readable medium described herein may further include operations, features, means, or instructions for transmitting the control signaling indicating a distance threshold between the assistive node and the wireless device, where the assistive node operates in the amplifying mode to amplify the packet transmission based on an estimated distance between the assistive node and the wireless device satisfying the distance threshold or the assistive node operates in the reflecting mode to reflect the packet transmission based on the estimated distance between the assistive node and the wireless device not satisfying the distance threshold.

Some examples of the method, apparatuses, and non-transitory computer-readable medium described herein may further include operations, features, means, or instructions for transmitting the control signaling indicating which one of the reflecting mode or the amplifying mode may be to be applied based on a message type of the packet transmission, a latency target associated with the packet transmission, a size of an analog beamforming codebook associated with the assistive node, beamwidths associated with beams in the analog beamforming codebook, a number and arrangement of antenna elements of the assistive node, a first threshold distance between the assistive node and the wireless device, a second threshold distance between the assistive node and the network entity, or a combination thereof.

Some examples of the method, apparatuses, and non-transitory computer-readable medium described herein may further include operations, features, means, or instructions for transmitting, to the assistive node, a second message including the scheduling information and the control signaling.

DETAILED DESCRIPTION

Figure 1:
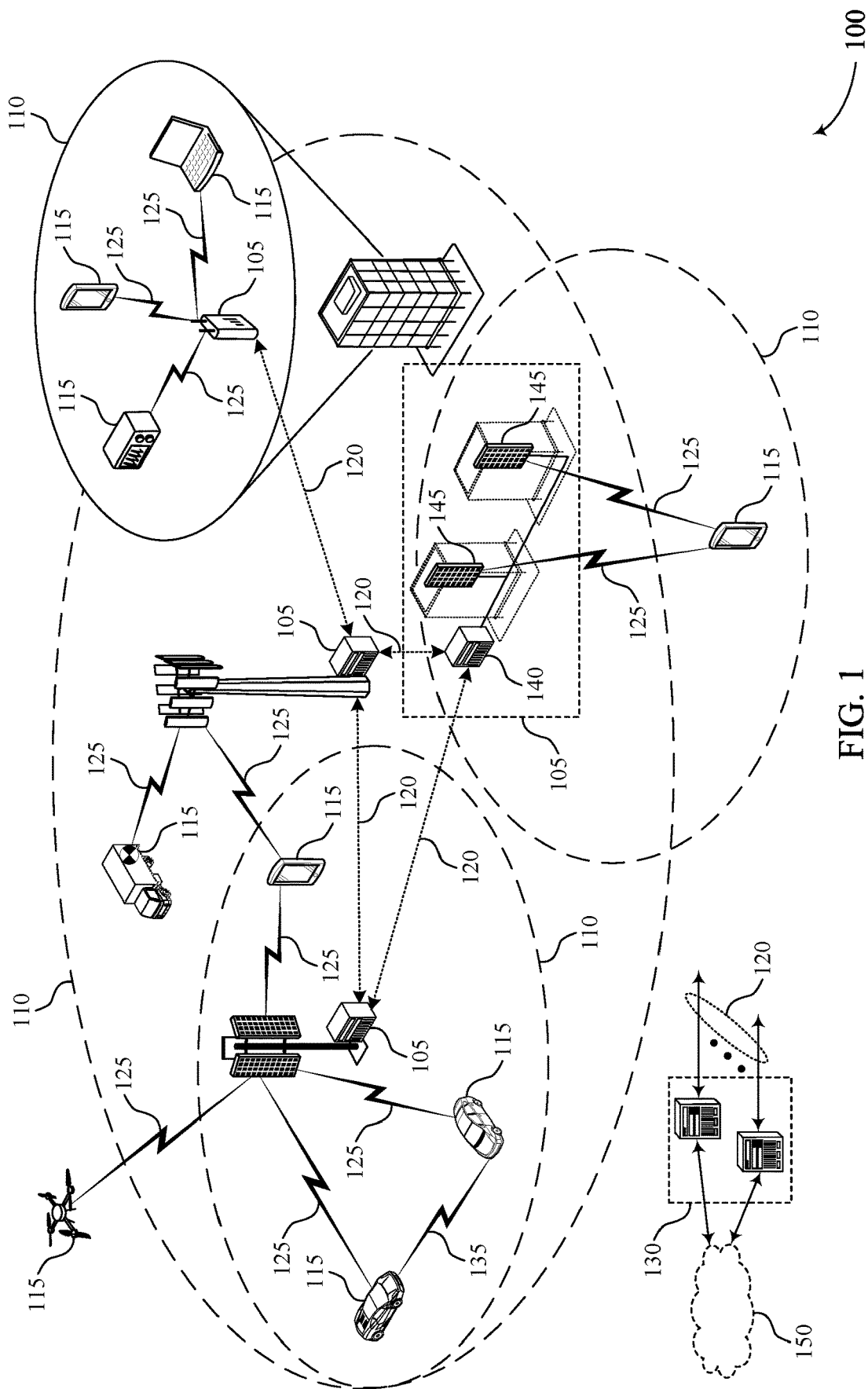
FIG. 1 illustrates an example of a wireless communications system that supports methods for switching between repeater and intelligent reflective surface (IRS) operations in an assistive device in accordance with aspects of the present disclosure.

Some wireless communications systems (e.g., 5G systems, 6G systems, etc.) may support communications between devices via assistive nodes such as intelligent reflective surfaces (IRSs), repeaters, or relays, which may forward signaling between wireless devices. For example, an assistive node may create viable paths for signaling from a base station to a user equipment (UE) while avoiding obstructions or blockages that affect direct connectivity between the base station and UE. Assistive nodes may be used with millimeter wave deployments, which may be particularly susceptible to direct link blockages. Blockages may correspond to objects in the environment such as vehicles, buildings or pedestrians which can significantly impair the link margin. Assistive nodes may serve as repeaters that may decode a transmitted symbol and amplify and forward the transmitted symbol. Assistive nodes may also serve as relays that may decode a symbol, correct for decoding errors, and amplify and forward the transmitted symbol. Assistive nodes may also serve as reflectors, for example, an assistive node may include an IRS or a reflect-array that may passively forward the transmitted energy from one direction to another. Amplifying signals at an assistive node, for example, via a repeater or relay consumes power and may be associated with a larger latency, while reflecting signals via a reflector may consume less power and be associated with less latency. An assistive node may include both amplifying hardware (e.g., repeater hardware or relay hardware) and reflector hardware, and there may be scenarios where either reflecting or amplifying is preferable at the assistive node.

An assistive node may transmit a message to a network entity (e.g., a base station) indicating that the assistive node is capable of operating in an amplifying mode or a reflecting mode. The network entity may transmit scheduling information to the assistive node for a packet transmission to be reflected or amplified by the assistive node to a wireless device (e.g., a UE), for example, because a direct path between the network entity and the wireless device is blocked. The network entity may transmit control signaling to the assistive node configuring the assistive node to either reflect or amplify (e.g., relay or repeat) the packet transmission to the wireless device. In some cases, the network entity may select whether the assistive node should operate in a reflecting mode or an amplifying mode. In some cases, the assistive node may select whether the assistive node should operate in a reflecting mode or an amplifying mode.

In some examples, the network entity or assistive node may select whether the assistive node should operate in a reflecting mode or an amplifying mode to reflect or amplify the packet transmission based on a message type of the packet transmission, for example, because some messages types may be more effectively reflected or repeated. In some examples, the network entity or assistive node may select whether the assistive node should operate in a reflecting mode or an amplifying mode to reflect or amplify the packet transmission based on a latency target associated with the packet transmission, for example, because reflecting may be associated with a lower latency than amplifying. In some examples, the network entity or assistive node may select whether the assistive node should operate in a reflecting mode or an amplifying mode to reflect or amplify the packet transmission based on a power consumption target, for example, because amplifying may be associated with a greater power consumption than reflecting.

In some examples, the network entity or assistive node may select whether the assistive node should operate in a reflecting mode or an amplifying mode to reflect or amplify the packet transmission based on a size of an analog beamforming codebook associated with the assistive node or beamwidths associated with beams in the analog beamforming codebook. In some examples, the network entity or assistive node may select whether the assistive node should operate in a reflecting mode or an amplifying mode to reflect or amplify the packet transmission based on a number of antenna elements of the assistive node, for example, because a beamforming gain of a reflecting operation may be higher as compared to an amplifying operation when the number of antenna elements is small. In some examples, the network entity or assistive node may select whether the assistive node should operate in a reflecting mode or an amplifying mode to reflect or amplify the packet transmission based on a distance estimate between the network entity and the assistive node or a distance estimate between the assistive node and the wireless device, for example, because a gain of a reflecting operation may be higher than the gain of an amplifying operation at shorter ranges.

Aspects of the disclosure are initially described in the context of wireless communications systems. Aspects of the disclosure are further illustrated by and described with reference to wireless communications systems and process flows. Aspects of the disclosure are further illustrated by and described with reference to apparatus diagrams, system diagrams, and flowcharts that relate to methods for switching between repeater and IRS operations in an assistive device.

FIG. 1 illustrates an example of a wireless communications system 100 that supports methods for switching between repeater and IRS operations in an assistive device in accordance with aspects of the present disclosure. The wireless communications system 100 may include one or more base stations 105, one or more UEs 115, and a core network 130. In some examples, the wireless communications system 100 may be a Long Term Evolution (LTE)

network, an LTE-Advanced (LTE-A) network, an LTE-A Pro network, or a New Radio (NR) network. In some examples, the wireless communications system 100 may support enhanced broadband communications, ultra-reliable communications, low latency communications, communications with low-cost and low-complexity devices, or any combination thereof.

The base stations 105 may be dispersed throughout a geographic area to form the wireless communications system 100 and may be devices in different forms or having different capabilities. The base stations 105 and the UEs 115 may wirelessly communicate via one or more communication links 125. Each base station 105 may provide a coverage area 110 over which the UEs 115 and the base station 105 may establish one or more communication links 125. The coverage area 110 may be an example of a geographic area over which a base station 105 and a UE 115 may support the communication of signals according to one or more radio access technologies.

The UEs 115 may be dispersed throughout a coverage area 110 of the wireless communications system 100, and each UE 115 may be stationary, or mobile, or both at different times. The UEs 115 may be devices in different forms or having different capabilities. Some example UEs 115 are illustrated in FIG. 1. The UEs 115 described herein may be able to communicate with various types of devices, such as other UEs 115, the base stations 105, or network equipment (e.g., core network nodes, relay devices, integrated access and backhaul (IAB) nodes, or other network equipment), as shown in FIG. 1.

The base stations 105 may communicate with the core network 130, or with one another, or both. For example, the base stations 105 may interface with the core network 130 through one or more backhaul links 120 (e.g., via an S1, N2, N3, or other interface). The base stations 105 may communicate with one another over the backhaul links 120 (e.g., via an X2, Xn, or other interface) either directly (e.g., directly between base stations 105), or indirectly (e.g., via core network 130), or both. In some examples, the backhaul links 120 may be or include one or more wireless links.

One or more of the base stations 105 described herein may include or may be referred to by a person having ordinary skill in the art as a base transceiver station, a radio base station, an access point, a radio transceiver, a NodeB, an eNodeB (eNB), a next-generation NodeB or a giga-NodeB (either of which may be referred to as a gNB), a Home NodeB, a Home eNodeB, or other suitable terminology.

A UE 115 may include or may be referred to as a mobile device, a wireless device, a remote device, a handheld device, or a subscriber device, or some other suitable terminology, where the "device" may also be referred to as a unit, a station, a terminal, or a client, among other examples. A UE 115 may also include or may be referred to as a personal electronic device such as a cellular phone, a personal digital assistant (PDA), a tablet computer, a laptop computer, or a personal computer. In some examples, a UE 115 may include or be referred to as a wireless local loop (WLL) station, an Internet of Things (IoT) device, an Internet of Everything (IoE) device, or a machine type communications (MTC) device, among other examples, which may be implemented in various objects such as appliances, or vehicles, meters, among other examples.

The UEs 115 described herein may be able to communicate with various types of devices, such as other UEs 115 that may sometimes act as relays as well as the base stations 105 and the network equipment including macro eNBs or gNBs, small cell eNBs or gNBs, or relay base stations, among other examples, as shown in FIG. 1.

The UEs 115 and the base stations 105 may wirelessly communicate with one another via one or more communication links 125 over one or more carriers. The term "carrier" may refer to a set of radio frequency spectrum resources having a defined physical layer structure for supporting the communication links 125. For example, a carrier used for a communication link 125 may include a portion of a radio frequency spectrum band (e.g., a bandwidth part (BWP)) that is operated according to one or more physical layer channels for a given radio access technology (e.g., LTE, LTE-A, LTE-A Pro, NR). Each physical layer channel may carry acquisition signaling (e.g., synchronization signals, system information), control signaling that coordinates operation for the carrier, user data, or other signaling. The wireless communications system 100 may support communication with a UE 115 using carrier aggregation or multi-carrier operation. A UE 115 may be configured with multiple downlink component carriers and one or more uplink component carriers according to a carrier aggregation configuration. Carrier aggregation may be used with both frequency division duplexing (FDD) and time division duplexing (TDD) component carriers.

In some examples (e.g., in a carrier aggregation configuration), a carrier may also have acquisition signaling or control signaling that coordinates operations for other carriers. A carrier may be associated with a frequency channel (e.g., an evolved universal mobile telecommunication system terrestrial radio access (E-UTRA) absolute radio frequency channel number (EARFCN)) and may be positioned according to a channel raster for discovery by the UEs 115. A carrier may be operated in a standalone mode where initial acquisition and connection may be conducted by the UEs 115 via the carrier, or the carrier may be operated in a non-standalone mode where a connection is anchored using a different carrier (e.g., of the same or a different radio access technology).

The communication links 125 shown in the wireless communications system 100 may include uplink transmissions from a UE 115 to a base station 105, or downlink transmissions from a base station 105 to a UE 115. Carriers may carry downlink or uplink communications (e.g., in an FDD mode) or may be configured to carry downlink and uplink communications (e.g., in a TDD mode).

A carrier may be associated with a particular bandwidth of the radio frequency spectrum, and in some examples the carrier bandwidth may be referred to as a "system bandwidth" of the carrier or the wireless communications system 100. For example, the carrier bandwidth may be one of a number of determined bandwidths for carriers of a particular radio access technology (e.g., 1.4, 3, 5, 10, 15, 20, 40, or 80 megahertz (MHz)). Devices of the wireless communications system 100 (e.g., the base stations 105, the UEs 115, or both) may have hardware configurations that support communications over a particular carrier bandwidth or may be configurable to support communications over one of a set of carrier bandwidths. In some examples, the wireless communications system 100 may include base stations 105 or UEs 115 that support simultaneous communications via carriers associated with multiple carrier bandwidths. In some examples, each served UE 115 may be configured for operating over portions (e.g., a sub-band, a BWP) or all of a carrier bandwidth.

Signal waveforms transmitted over a carrier may be made up of multiple subcarriers (e.g., using multi-carrier modulation (MCM) techniques such as orthogonal frequency division multiplexing (OFDM) or discrete Fourier transform spread OFDM (DFT-S-OFDM)). In a system employing MCM techniques, a resource element may consist of one symbol period (e.g., a duration of one modulation symbol) and one subcarrier, where the symbol period and subcarrier spacing are inversely related. The number of bits carried by each resource element may depend on the modulation scheme (e.g., the order of the modulation scheme, the coding rate of the modulation scheme, or both). Thus, the more resource elements that a UE 115 receives and the higher the order of the modulation scheme, the higher the data rate may be for the UE 115. A wireless communications resource may refer to a combination of a radio frequency spectrum resource, a time resource, and a spatial resource (e.g., spatial layers or beams), and the use of multiple spatial layers may further increase the data rate or data integrity for communications with a UE 115.

One or more numerologies for a carrier may be supported, where a numerology may include a subcarrier spacing (Δf) and a cyclic prefix. A carrier may be divided into one or more BWPs having the same or different numerologies. In some examples, a UE 115 may be configured with multiple BWPs. In some examples, a single BWP for a carrier may be active at a given time and communications for the UE 115 may be restricted to one or more active BWPs.

The time intervals for the base stations 105 or the UEs 115 may be expressed in multiples of a basic time unit which may, for example, refer to a sampling period of $T_s=1/(\Delta f_{max} \cdot N_f)$ seconds, where $\Delta f_{max}$ may represent the maximum supported subcarrier spacing, and $N_f$ may represent the maximum supported discrete Fourier transform (DFT) size. Time intervals of a communications resource may be organized according to radio frames each having a specified duration (e.g., 10 milliseconds (ms)). Each radio frame may be identified by a system frame number (SFN) (e.g., ranging from 0 to 1023).

Each frame may include multiple consecutively numbered subframes or slots, and each subframe or slot may have the same duration. In some examples, a frame may be divided (e.g., in the time domain) into subframes, and each subframe may be further divided into a number of slots. Alternatively, each frame may include a variable number of slots, and the number of slots may depend on subcarrier spacing. Each slot may include a number of symbol periods (e.g., depending on the length of the cyclic prefix prepended to each symbol period). In some wireless communications systems 100, a slot may further be divided into multiple mini-slots containing one or more symbols. Excluding the cyclic prefix, each symbol period may contain one or more (e.g., $N_f$) sampling periods. The duration of a symbol period may depend on the subcarrier spacing or frequency band of operation.

A subframe, a slot, a mini-slot, or a symbol may be the smallest scheduling unit (e.g., in the time domain) of the wireless communications system 100 and may be referred to as a transmission time interval (TTI). In some examples, the TTI duration (e.g., the number of symbol periods in a TTI) may be variable. Additionally or alternatively, the smallest scheduling unit of the wireless communications system 100 may be dynamically selected (e.g., in bursts of shortened TTIs (sTTIs)).

Physical channels may be multiplexed on a carrier according to various techniques. A physical control channel and a physical data channel may be multiplexed on a downlink carrier, for example, using one or more of time division multiplexing (TDM) techniques, frequency division multiplexing (FDM) techniques, or hybrid TDM-FDM techniques. A control region (e.g., a control resource set (CORESET)) for a physical control channel may be defined by a number of symbol periods and may extend across the system bandwidth or a subset of the system bandwidth of the carrier. One or more control regions (e.g., CORESETs) may be configured for a set of the UEs 115. For example, one or more of the UEs 115 may monitor or search control regions for control information according to one or more search space sets, and each search space set may include one or multiple control channel candidates in one or more aggregation levels arranged in a cascaded manner. An aggregation level for a control channel candidate may refer to a number of control channel resources (e.g., control channel elements (CCEs)) associated with encoded information for a control information format having a given payload size. Search space sets may include common search space sets configured for sending control information to multiple UEs 115 and UE-specific search space sets for sending control information to a specific UE 115.

Each base station 105 may provide communication coverage via one or more cells, for example, a macro cell, a small cell, a hot spot, or other types of cells, or any combination thereof. The term "cell" may refer to a logical communication entity used for communication with a base station 105 (e.g., over a carrier) and may be associated with an identifier for distinguishing neighboring cells (e.g., a physical cell identifier (PCID), a virtual cell identifier (VCID), or others). In some examples, a cell may also refer to a geographic coverage area 110 or a portion of a geographic coverage area 110 (e.g., a sector) over which the logical communication entity operates. Such cells may range from smaller areas (e.g., a structure, a subset of structure) to larger areas depending on various factors such as the capabilities of the base station 105. For example, a cell may be or include a building, a subset of a building, or exterior spaces between or overlapping with geographic coverage areas 110, among other examples.

A macro cell generally covers a relatively large geographic area (e.g., several kilometers in radius) and may allow unrestricted access by the UEs 115 with service subscriptions with the network provider supporting the macro cell. A small cell may be associated with a lower-powered base station 105, as compared with a macro cell, and a small cell may operate in the same or different (e.g., licensed, unlicensed) frequency bands as macro cells. Small cells may provide unrestricted access to the UEs 115 with service subscriptions with the network provider or may provide restricted access to the UEs 115 having an association with the small cell (e.g., the UEs 115 in a closed subscriber group (CSG), the UEs 115 associated with users in a home or office). A base station 105 may support one or multiple cells and may also support communications over the one or more cells using one or multiple component carriers.

In some examples, a carrier may support multiple cells, and different cells may be configured according to different protocol types (e.g., MTC, narrowband IoT (NB-IoT), enhanced mobile broadband (eMBB)) that may provide access for different types of devices.

In some examples, a base station 105 may be movable and therefore provide communication coverage for a moving geographic coverage area 110. In some examples, different geographic coverage areas 110 associated with different technologies may overlap, but the different geographic coverage areas 110 may be supported by the same base station 105. In other examples, the overlapping geographic coverage areas 110 associated with different technologies may be supported by different base stations 105. The wireless communications system 100 may include, for example, a heterogeneous network in which different types of the base stations 105 provide coverage for various geographic coverage areas 110 using the same or different radio access technologies.

The wireless communications system 100 may support synchronous or asynchronous operation. For synchronous operation, the base stations 105 may have similar frame timings, and transmissions from different base stations 105 may be approximately aligned in time. For asynchronous operation, the base stations 105 may have different frame timings, and transmissions from different base stations 105 may, in some examples, not be aligned in time. The techniques described herein may be used for either synchronous or asynchronous operations.

Some UEs 115, such as MTC or IoT devices, may be low cost or low complexity devices and may provide for automated communication between machines (e.g., via Machine-to-Machine (M2M) communication). M2M communication or MTC may refer to data communication technologies that allow devices to communicate with one another or a base station 105 without human intervention. In some examples, M2M communication or MTC may include communications from devices that integrate sensors or meters to measure or capture information and relay such information to a central server or application program that makes use of the information or presents the information to humans interacting with the application program. Some UEs 115 may be designed to collect information or enable automated behavior of machines or other devices. Examples of applications for MTC devices include smart metering, inventory monitoring, water level monitoring, equipment monitoring, healthcare monitoring, wildlife monitoring, weather and geological event monitoring, fleet management and tracking, remote security sensing, physical access control, and transaction-based business charging.

Some UEs 115 may be configured to employ operating modes that reduce power consumption, such as half-duplex communications (e.g., a mode that supports one-way communication via transmission or reception, but not transmission and reception simultaneously). In some examples, half-duplex communications may be performed at a reduced peak rate. Other power conservation techniques for the UEs 115 include entering a power saving deep sleep mode when not engaging in active communications, operating over a limited bandwidth (e.g., according to narrowband communications), or a combination of these techniques. For example, some UEs 115 may be configured for operation using a narrowband protocol type that is associated with a defined portion or range (e.g., set of subcarriers or resource blocks (RBs)) within a carrier, within a guard-band of a carrier, or outside of a carrier.

The wireless communications system 100 may be configured to support ultra-reliable communications or low-latency communications, or various combinations thereof. For example, the wireless communications system 100 may be configured to support ultra-reliable low-latency communications (URLLC). The UEs 115 may be designed to support ultra-reliable, low-latency, or critical functions. Ultra-reliable communications may include private communication or group communication and may be supported by one or more services such as push-to-talk, video, or data. Support for ultra-reliable, low-latency functions may include prioritization of services, and such services may be used for public safety or general commercial applications. The terms ultra-reliable, low-latency, and ultra-reliable low-latency may be used interchangeably herein.

In some examples, a UE 115 may also be able to communicate directly with other UEs 115 over a device-to-device (D2D) communication link 135 (e.g., using a peer-to-peer (P2P) or D2D protocol). One or more UEs 115 utilizing D2D communications may be within the geographic coverage area 110 of a base station 105. Other UEs 115 in such a group may be outside the geographic coverage area 110 of a base station 105 or be otherwise unable to receive transmissions from a base station 105. In some examples, groups of the UEs 115 communicating via D2D communications may utilize a one-to-many (1:M) system in which each UE 115 transmits to every other UE 115 in the group. In some examples, a base station 105 facilitates the scheduling of resources for D2D communications. In other cases, D2D communications are carried out between the UEs 115 without the involvement of a base station 105.

In some systems, the D2D communication link 135 may be an example of a communication channel, such as a sidelink communication channel, between vehicles (e.g., UEs 115). In some examples, vehicles may communicate using vehicle-to-everything (V2X) communications, vehicle-to-vehicle (V2V) communications, or some combination of these. A vehicle may signal information related to traffic conditions, signal scheduling, weather, safety, emergencies, or any other information relevant to a V2X system. In some examples, vehicles in a V2X system may communicate with roadside infrastructure, such as roadside units, or with the network via one or more network nodes (e.g., base stations 105) using vehicle-to-network (V2N) communications, or with both.

The core network 130 may provide user authentication, access authorization, tracking, Internet Protocol (IP) connectivity, and other access, routing, or mobility functions. The core network 130 may be an evolved packet core (EPC) or 5G core (5GC), which may include at least one control plane entity that manages access and mobility (e.g., a mobility management entity (MME), an access and mobility management function (AMF)) and at least one user plane entity that routes packets or interconnects to external networks (e.g., a serving gateway (S-GW), a Packet Data Network (PDN) gateway (P-GW), or a user plane function (UPF)). The control plane entity may manage non-access stratum (NAS) functions such as mobility, authentication, and bearer management for the UEs 115 served by the base stations 105 associated with the core network 130. User IP packets may be transferred through the user plane entity, which may provide IP address allocation as well as other functions. The user plane entity may be connected to IP services 150 for one or more network operators. The IP services 150 may include access to the Internet, Intranet(s), an IP Multimedia Subsystem (IMS), or a Packet-Switched Streaming Service.

Some of the network devices, such as a base station 105, may include subcomponents such as an access network entity 140, which may be an example of an access node controller (ANC). Each access network entity 140 may communicate with the UEs 115 through one or more other access network transmission entities 145, which may be referred to as radio heads, smart radio heads, or transmission/reception points (TRPs). Each access network transmission entity 145 may include one or more antenna panels. In some configurations, various functions of each access network entity 140 or base station 105 may be distributed across various network devices (e.g., radio heads and ANCs) or consolidated into a single network device (e.g., a base station 105).

The wireless communications system 100 may operate using one or more frequency bands, typically in the range of 300 megahertz (MHz) to 300 gigahertz (GHz). Generally, the region from 300 MHz to 3 GHz is known as the ultra-high frequency (UHF) region or decimeter band because the wavelengths range from approximately one decimeter to one meter in length. The UHF waves may be blocked or redirected by buildings and environmental features, but the waves may penetrate structures sufficiently for a macro cell to provide service to the UEs 115 located indoors. The transmission of UHF waves may be associated with smaller antennas and shorter ranges (e.g., less than 100 kilometers) compared to transmission using the smaller frequencies and longer waves of the high frequency (HF) or very high frequency (VHF) portion of the spectrum below 300 MHz.

The wireless communications system 100 may also operate in a super high frequency (SHF) region using frequency bands from 3 GHz to 30 GHz, also known as the centimeter band, or in an extremely high frequency (EHF) region of the spectrum (e.g., from 30 GHz to 300 GHz), also known as the millimeter band. In some examples, the wireless communications system 100 may support millimeter wave (mmW) communications between the UEs 115 and the base stations 105, and EHF antennas of the respective devices may be smaller and more closely spaced than UHF antennas. In some examples, this may facilitate use of antenna arrays within a device. The propagation of EHF transmissions, however, may be subject to even greater atmospheric attenuation and shorter range than SHF or UHF transmissions. The techniques disclosed herein may be employed across transmissions that use one or more different frequency regions, and designated use of bands across these frequency regions may differ by country or regulating body.

The wireless communications system 100 may utilize both licensed and unlicensed radio frequency spectrum bands. For example, the wireless communications system 100 may employ License Assisted Access (LAA), LTE-Unlicensed (LTE-U) radio access technology, or NR technology in an unlicensed band such as the 5 GHz industrial, scientific, and medical (ISM) band. When operating in unlicensed radio frequency spectrum bands, devices such as the base stations 105 and the UEs 115 may employ carrier sensing for collision detection and avoidance. In some examples, operations in unlicensed bands may be based on a carrier aggregation configuration in conjunction with component carriers operating in a licensed band (e.g., LAA). Operations in unlicensed spectrum may include downlink transmissions, uplink transmissions, P2P transmissions, or D2D transmissions, among other examples.

A base station 105 or a UE 115 may be equipped with multiple antennas, which may be used to employ techniques such as transmit diversity, receive diversity, multiple-input multiple-output (MIMO) communications, or beamforming. The antennas of a base station 105 or a UE 115 may be located within one or more antenna arrays or antenna panels, which may support MIMO operations or transmit or receive beamforming. For example, one or more base station antennas or antenna arrays may be co-located at an antenna assembly, such as an antenna tower. In some examples, antennas or antenna arrays associated with a base station 105 may be located in diverse geographic locations. A base station 105 may have an antenna array with a number of rows and columns of antenna ports that the base station 105 may use to support beamforming of communications with a UE 115. Likewise, a UE 115 may have one or more antenna arrays that may support various MIMO or beamforming operations. Additionally or alternatively, an antenna panel may support radio frequency beamforming for a signal transmitted via an antenna port.

The base stations 105 or the UEs 115 may use MIMO communications to exploit multipath signal propagation and increase the spectral efficiency by transmitting or receiving multiple signals via different spatial layers. Such techniques may be referred to as spatial multiplexing. The multiple signals may, for example, be transmitted by the transmitting device via different antennas or different combinations of antennas. Likewise, the multiple signals may be received by the receiving device via different antennas or different combinations of antennas. Each of the multiple signals may be referred to as a separate spatial stream and may carry bits associated with the same data stream (e.g., the same codeword) or different data streams (e.g., different codewords). Different spatial layers may be associated with different antenna ports used for channel measurement and reporting. MIMO techniques include single-user MIMO (SU-MIMO), where multiple spatial layers are transmitted to the same receiving device, and multiple-user MIMO (MU-MIMO), where multiple spatial layers are transmitted to multiple devices.

Beamforming, which may also be referred to as spatial filtering, directional transmission, or directional reception, is a signal processing technique that may be used at a transmitting device or a receiving device (e.g., a base station 105, a UE 115) to shape or steer an antenna beam (e.g., a transmit beam, a receive beam) along a spatial path between the transmitting device and the receiving device. Beamforming may be achieved by combining the signals communicated via antenna elements of an antenna array such that some signals propagating at particular orientations with respect to an antenna array experience constructive interference while others experience destructive interference. The adjustment of signals communicated via the antenna elements may include a transmitting device or a receiving device applying amplitude offsets, phase offsets, or both to signals carried via the antenna elements associated with the device. The adjustments associated with each of the antenna elements may be defined by a beamforming weight set associated with a particular orientation (e.g., with respect to the antenna array of the transmitting device or receiving device, or with respect to some other orientation).

A base station 105 or a UE 115 may use beam sweeping techniques as part of beam forming operations. For example, a base station 105 may use multiple antennas or antenna arrays (e.g., antenna panels) to conduct beamforming operations for directional communications with a UE 115. Some signals (e.g., synchronization signals, reference signals, beam selection signals, or other control signals) may be transmitted by a base station 105 multiple times in different directions. For example, the base station 105 may transmit a signal according to different beamforming weight sets associated with different directions of transmission. Transmissions in different beam directions may be used to identify (e.g., by a transmitting device, such as a base station 105, or by a receiving device, such as a UE 115) a beam direction for later transmission or reception by the base station 105.

Some signals, such as data signals associated with a particular receiving device, may be transmitted by a base station 105 in a single beam direction (e.g., a direction associated with the receiving device, such as a UE 115). In some examples, the beam direction associated with transmissions along a single beam direction may be determined based on a signal that was transmitted in one or more beam directions. For example, a UE 115 may receive one or more of the signals transmitted by the base station 105 in different directions and may report to the base station 105 an indication of the signal that the UE 115 received with a highest signal quality or an otherwise acceptable signal quality.

In some examples, transmissions by a device (e.g., by a base station 105 or a UE 115) may be performed using multiple beam directions, and the device may use a combination of digital precoding or radio frequency beamforming to generate a combined beam for transmission (e.g., from a base station 105 to a UE 115). The UE 115 may report feedback that indicates precoding weights for one or more beam directions, and the feedback may correspond to a configured number of beams across a system bandwidth or one or more sub-bands. The base station 105 may transmit a reference signal (e.g., a cell-specific reference signal (CRS), a channel state information reference signal (CSI-RS)), which may be precoded or unprecoded. The UE 115 may provide feedback for beam selection, which may be a precoding matrix indicator (PMI) or codebook-based feedback (e.g., a multi-panel type codebook, a linear combination type codebook, a port selection type codebook). Although these techniques are described with reference to signals transmitted in one or more directions by a base station 105, a UE 115 may employ similar techniques for transmitting signals multiple times in different directions (e.g., for identifying a beam direction for subsequent transmission or reception by the UE 115) or for transmitting a signal in a single direction (e.g., for transmitting data to a receiving device).

A receiving device (e.g., a UE 115) may try multiple receive configurations (e.g., directional listening) when receiving various signals from the base station 105, such as synchronization signals, reference signals, beam selection signals, or other control signals. For example, a receiving device may try multiple receive directions by receiving via different antenna subarrays, by processing received signals according to different antenna subarrays, by receiving according to different receive beamforming weight sets (e.g., different directional listening weight sets) applied to signals received at multiple antenna elements of an antenna array, or by processing received signals according to different receive beamforming weight sets applied to signals received at multiple antenna elements of an antenna array, any of which may be referred to as "listening" according to different receive configurations or receive directions. In some examples, a receiving device may use a single receive configuration to receive along a single beam direction (e.g., when receiving a data signal). The single receive configuration may be aligned in a beam direction determined based on listening according to different receive configuration directions (e.g., a beam direction determined to have a highest signal strength, highest signal-to-noise ratio (SNR), or otherwise acceptable signal quality based on listening according to multiple beam directions).

The wireless communications system 100 may be a packet-based network that operates according to a layered protocol stack. In the user plane, communications at the bearer or Packet Data Convergence Protocol (PDCP) layer may be IP-based. A Radio Link Control (RLC) layer may perform packet segmentation and reassembly to communicate over logical channels. A Medium Access Control (MAC) layer may perform priority handling and multiplexing of logical channels into transport channels. The MAC layer may also use error detection techniques, error correction techniques, or both to support retransmissions at the MAC layer to improve link efficiency. In the control plane, the Radio Resource Control (RRC) protocol layer may provide establishment, configuration, and maintenance of an RRC connection between a UE 115 and a base station 105 or a core network 130 supporting radio bearers for user plane data. At the physical layer, transport channels may be mapped to physical channels.

The UEs 115 and the base stations 105 may support retransmissions of data to increase the likelihood that data is received successfully. Hybrid automatic repeat request (HARQ) feedback is one technique for increasing the likelihood that data is received correctly over a communication link 125. HARQ may include a combination of error detection (e.g., using a cyclic redundancy check (CRC)), forward error correction (FEC), and retransmission (e.g., automatic repeat request (ARQ)). HARQ may improve throughput at the MAC layer in poor radio conditions (e.g., low signal-to-noise conditions). In some examples, a device may support same-slot HARQ feedback, where the device may provide HARQ feedback in a specific slot for data received in a previous symbol in the slot. In other cases, the device may provide HARQ feedback in a subsequent slot, or according to some other time interval.

In some examples, the wireless communications system 100 may include an assistive node that is capable of operating in an amplifying mode or a reflecting mode. For example, the assistive node may include amplifying hardware (e.g., repeater or relay hardware) and reflective hardware (e.g., an IRS or a reflect-array). The assistive node may forward (e.g., reflect, repeat, or relay) packet transmissions from a base station 105 to a UE 115. For example, a direct link 125 between a base station 105 and a UE 115 may be blocked by an obstruction such as a building. The assistive node may transmit a message to the base station 105 indicating that the assistive node is capable of operating in an amplifying mode or a reflecting mode. The base station 105 may transmit scheduling information to the assistive node for a packet transmission to be reflected or repeated by the assistive node to the UE 115. The base station 105 may also transmit control signaling indicating whether the assistive node is to operate in a reflecting mode or an amplifying mode to reflect or amplify the packet transmission to the UE 115. In some cases, the base station 105 may select whether the assistive node should operate in a reflecting mode or an amplifying mode. In some cases, the assistive node may select whether the assistive node should operate in a reflecting mode or an amplifying mode.

In some examples, the base station 105 or the assistive node may select whether the assistive node should operate in a reflecting mode or an amplifying mode to reflect or amplify the packet transmission based on a message type of the packet transmission, for example, because some messages types may be more effectively reflected or repeated. In some examples, the base station 105 or assistive node may select whether the assistive node should operate in a reflecting mode or an amplifying mode to reflect or amplify the packet transmission based on a latency target associated with the packet transmission, for example, because reflecting may be associated with a lower latency than amplifying. In some examples, the base station 105 or assistive node may select whether the assistive node should operate in a reflecting mode or an amplifying mode to reflect or amplify the packet transmission based on a power consumption target, for example, because amplifying may be associated with a greater power consumption than reflecting.

In some examples, the base station 105 or assistive node may select whether the assistive node should operate in a reflecting mode or an amplifying mode to reflect or amplify the packet transmission based on a size of an analog beamforming codebook associated with the assistive node or beamwidths associated with beams in the analog beamforming codebook. In some examples, the base station 105 or assistive node may select whether the assistive node should operate in a reflecting mode or an amplifying mode to reflect or amplify the packet transmission based on a number of antenna elements of the assistive node, for example, because a gain of a reflecting operation may be higher as compared to an amplifying operation when the number of antenna elements is small. In some examples, the base station 105 or assistive node may select whether the assistive node should operate in a reflecting mode or an amplifying mode to reflect or amplify the packet transmission based on a distance between the base station 105 and the assistive node or the distance between the assistive node and the UE 115, for example, because a gain of a reflecting operation may be higher than the gain of an amplifying operation at shorter ranges.

Figure 2:
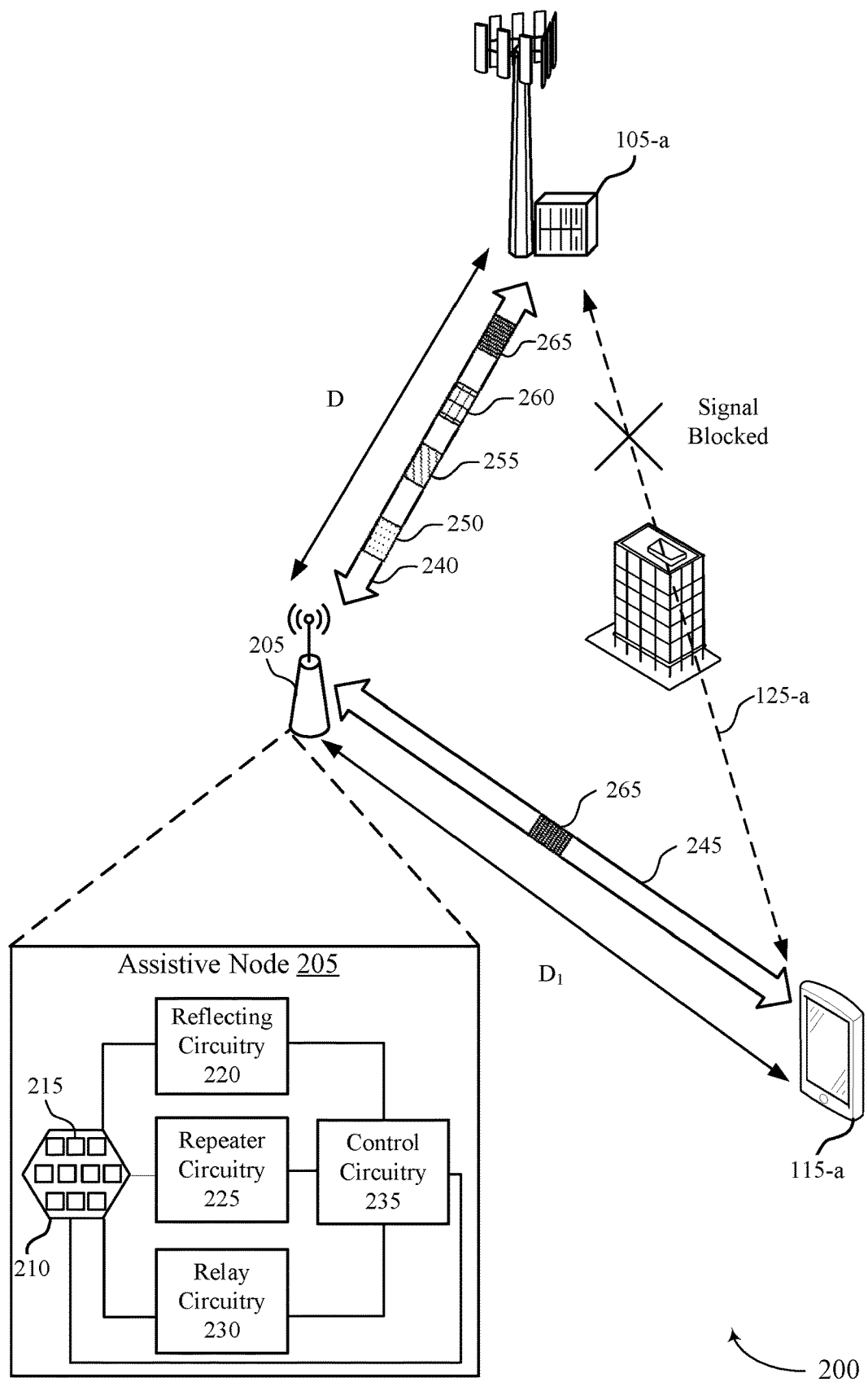
FIG. 2 illustrates an example of a wireless communications system that supports methods for switching between repeater and IRS operations in an assistive device in accordance with aspects of the present disclosure.

FIG. 2 illustrates an example of a wireless communications system 200 that supports methods for switching between repeater and IRS operations in an assistive device in accordance with aspects of the present disclosure. The wireless communications system may include base station 105-a and UE 115-a, which may be respective examples of a base station 105 and a UE 115 as described herein.

The wireless communications system 200 may support use of assistive nodes, such as an assistive node 205. The assistive node 205 may provide viable paths for signaling from base station 105-a to UE 115-a, such as if there are obstructions in a direct link 125-a between base station 105-a and UE 115-a. For example, the direct link 125-a may be blocked by a building, a vehicle, a pedestrian or any other obstacle. In some examples, the direct link 125-a between the base station 105-a and the UE 115-a may be a millimeter wave or sub-THz deployment, which may be particularly susceptible to direct link blockages. The assistive node 205 may support bi-directional communications (e.g., downlink control signals, downlink data signals, uplink control signals, and uplink data signals). For example, in downlink communications, the base station 105-a may transmit signaling to the assistive node 205 via the communications link 240, and the assistive node 205 may forward the signals (e.g., via an amplifying operation or a reflecting operation) to the UE 115-a via the communications link 245. For uplink communications, the UE 115-a may transmit signaling to the assistive node 205 via the communications link 245, and the assistive node 205 may forward the signaling (e.g., via an amplifying operation or a reflecting operation) to the base station 105-a via the communications link 240.

The assistive node 205 may include multiple sets of radio-frequency (RF) or intermediate-frequency (IF) circuitry that enable reflecting operations and amplifying operations. For example, the assistive node 205 may include IRS hardware, a passive reflect-array, repeater hardware, relay hardware, or any combination thereof. An IRS may reflect or propagate signaling from a first device toward a second device, such as by using passive reflecting elements or active elements, or both. In some cases, an IRS may be configurable via control signaling. In some examples, a reflect-array may be a similar device which can reflect signaling between devices. In some examples, an assistive node 205, such as an IRS or a reflect-array, may be configured to change a direction of the reflected signaling. A repeater may decode a transmitted signal from a first device at radio frequency with beamforming, and amplify and feed the signal forward to a second device. A relay may decode a transmitted signal from a first device at radio frequency with beamforming, correct for errors in the decoding, and amplify and feed the signal forward to a second device. Repeater and relay operations are power consuming operations, whereas reflecting, (e.g., via an IRS or a reflect-array) are associated with lower power consumption as compared to repeater and relay operations.

Base station 105-a may transmit signaling to the assistive node 205 using a first transmit power (e.g., $\rho_1$), and the assistive node 205 may forward the signaling to UE 115-a using a second transmit power (e.g., $\rho_2$). $N_t$ and $N_r$ are the numbers of antenna elements at the base station 105-a and the assistive node 205, respectively. $N_{t,1}$ and $N_{r,1}$ are the numbers of antenna elements at the transmit and the receive part of the assistive node 205, respectively.

For a repeating mode, a model for the system may be represented by Equations (1)-(3) below, where $H_{Rep\text{-}gNB}$ denotes the $N_{r,1} \times N_t$ channel matrix for the wireless channel between base station 105-a and the assistive node 205, $H_{UE\text{-}Rep}$ denotes the $N_r \times N_{t,1}$ channel matrix for the wireless channel between the assistive node 205 and UE 115-a, $f_1$ denotes the $N_t \times 1$ beamforming vector at base station 105-a, $f_2$ denotes the $N_t \times 1$ beamforming vector at the assistive node 205, and s is a complex scalar symbol transmitted by base station 105-a. In a repeating mode, the assistive node 205 decodes a first transmitted symbol (e.g., Equation (1)), amplifies the signal, and feeds it forward to the UE 115-a (e.g., Equations (2) and (3)). The first part of Equation (3) is the signal, and the second part is noise. Accordingly, Equation (4) shows the SNR of the signal received at the UE 115-a when the assistive node 205 is operating in a repeating mode.

$$\hat{s} = g_1^H \left( \sqrt{\rho_1} H_{Rep\text{-}gNB} f_1 \cdot s + n_{Rep} \right) \tag{1}$$

$$\tilde{s} = g_2^H \left( \sqrt{\rho_2} H_{UE\text{-}Rep} f_2 \cdot \hat{s} + n_{UE} \right)$$

$$\tilde{s} = \left( \sqrt{\rho_1 \rho_2} \, g_2^H H_{UE\text{-}Rep} f_2 \cdot g_1^H H_{Rep\text{-}gNB} f_1 \cdot s \right) + \tag{3}$$

$$\left( \sqrt{\rho_2} \cdot g_2^H H_{UE\text{-}Rep} f_2 \cdot g_1^H n_{Rep} + g_2^H n_{UE} \right)$$

$$SNR_{Rep} = \frac{\rho_1 \rho_2 \cdot \left| g_2^H H_{UE\text{-}Rep} f_2 \right|^2 \cdot \left| g_1^H H_{Rep\text{-}gNB} f_1 \right|^2}{1 + \rho_2 \cdot \left| g_2^H H_{UE\text{-}Rep} f_2 \right|^2} \tag{4}$$

A model for the system operating in a reflecting mode via an IRS may be represented by Equation (5) below, where $H_{IRS,gNB}$ denotes the $N_{r,1} \times N_t$ channel matrix for the wireless channel between base station 105-a and the assistive node 205, $H_{UE,IRS}$ denotes the $N_r \times N_{t,1}$ channel matrix for the wireless channel between the assistive node 205 and UE 115-a, $f_1$ denotes the $N_t \times 1$ beamforming vector at base station 105-a, $g_1$ denotes the $N_r \times 1$ beamforming vector at UE 115-a, R denotes an $N_{t,1} \times N_{r,1}$ reflection matrix at the assistive node 205, and s is a complex scalar symbol transmitted by base station 105-a. An IRS receives energy from one direction and steers the energy in a different direction with a constraint on the gain and/or phase based on the reflected direction. Equation (6) shows the SNR of the signal received at the UE 115-a when the assistive node 205 is operating in a reflecting mode using an IRS.

$$\hat{s} = g_2^H (\sqrt{\rho_1 \rho_2} H_{UE,IRS} R H_{IRS,gNB} f_1 s + n) \tag{5}$$

$$SNR_{IRS} = \rho_1 \rho_2 \cdot |g_1^H H_{UE,IRS} R H_{IRS,gNB} f_1|^2 \tag{6}$$

There may be performance tradeoffs between repeater and IRS operations that may depend on many factors. Exemplary factors include the location or link margin of the assistive node 205 with respect to the base station 105-*a* or the UE 115-*a*, the antenna array 210 size at the assistive node 205, or the size of an analog beamforming codebook associated with the assistive node 205.

Once the RF circuitry associated with one of amplifying circuitry or reflecting operations (e.g., antenna array 210 and either reflecting circuitry 220 or repeater/relay circuitry 225 or 230) has been deployed at the assistive node 205, the marginal costs to add the other operation (e.g., to add reflecting circuitry 220 or repeater/relay circuitry 225 or 230) may be small. Amplifying operations (e.g., repeater or relay operations) may be half-duplex. For example, amplifying operations may receive a symbol during a first symbol period and amplify and feed the received symbol forward during the second symbol period. Reflecting operations may forward a received symbol in the same symbol period in which the symbol is received. Accordingly, reflecting operation may be full-duplex. Amplifying operations may also be associated with higher costs, as beamforming processes in the receive path may consume more power, be associated with more area on chip, and be associated with additional circuitry, while reflecting operations may be associated with a passive reflecting. The difference in power consumption between reflecting (e.g., IRS) operations and amplifying (e.g., repeating or relaying) operations may increase as the number of antenna elements 215 at the assistive node 205 increases.

Generally reflecting operations may be chosen to reduce latencies (e.g., amplifying operations may be half duplex while reflecting operations may be full duplex), and to reduce power consumption (e.g., a smaller number of antenna elements may be deployed). Reflecting operations may be associated with better performance with smaller numbers of antenna elements 215 at the assistive node 205. Repeating operations may be associated with better performance as $N_{t,1}$, the number of transmit antenna elements at the assistive node 205, increases. A reduced number of antennas may be used to save power. A repeater operation may be used to boost a link budget. A reflecting operation (e.g., using an IRS) may be used if the number of antenna elements 215 at the assistive node 205 to be used is small. Reflecting operations (e.g., using an IRS) may be associated with better performance when the assistive node 205 is within a close proximity to the UE 115-*a* (e.g., when $D_1$ is smaller), while repeating operations may be associated with better performance when the assistive node 205 is farther from the UE 115-*a* (e.g., when $D_1$ is larger).

In some examples, an assistive node 205 may switch between amplifying and reflecting operations. The switching may be triggered by a base station 105-*a* or a network entity via signaling. For example, the assistive node 205 may switch between repeater and reflecting operations based on power consumption and/or or latency targets in forwarding signals from the base station 105-*a* to the UE 115-*a*. For example, a repeater operation may increase latency and power consumption and be associated with increased cost and complexity of design and chip area. In some examples, the assistive node 205 may switch between amplifying and reflecting operations based on feedback metrics from the UE 115-*a* and/or the base station 105-*a*. Metrics that may be fed back may include the location of the UE 115-*a* relative to the assistive node 205 (e.g., the distance $D_1$), the location of the base station 105-*a* relative to the assistive node 205 (e.g., the distance D) the link budget of communications link 240, or the link budget of communications link 245. Other metrics that may be used to determine whether to select amplifying and reflecting operations for a specific UE 115-*a* may include the antenna array sizes and configurations at the base station 105-*a*, the assistive node 205, or the UE 115-*a*. Other metrics that may be used to determine whether to select amplifying and reflecting operations for a specific UE 115-*a* may include the codebook sizes associated with the base station 105-*a*, the assistive node 205, or the UE 115-*a*.

For example, the assistive node 205 may transmit a message 250, to the base station 105-*a*, indicating that the assistive node 205 is capable of operating in an amplifying mode (e.g., using repeater circuitry 225 or relay circuitry 230) and in a reflecting mode (e.g., using reflecting circuitry 220). The assistive node 205 may also indicate feedback metrics to the base station 105-*a* as described herein, for example, a number and arrangement of antenna elements 215 of the assistive node 205, an estimated distance $D_1$ between the assistive node 205 and a UE 115-*a*, and/or a distance D between the assistive node 205 and the base station 105-*a*. In some examples, the UE 115-*a* may report its location to the assistive node 205, for example, which the UE 115-*a* may determine based on global positioning system signals, via a mobility procedure, or via received positioning reference signals. The assistive node 205 may estimate a distance $D_1$ between the UE 115-*a* and the assistive node 205 and report the estimated distance $D_1$ to the base station 105-*a*. In some examples, the assistive node 205 and the base station 105-*a* may be at fixed locations, and the assistive node 205 may estimate a distance D between the assistive node 205 and the base station 105-*a* and report the estimated distance to the base station 105-*a*.

The base station 105-*a* may transmit a message 255 including scheduling information for a packet transmission 265 to be forwarded by the assistive node 205 to the UE 115-*a* via communication links 240 and 245. For example, the base station 105-*a* may be aware that a direct link 125-*a* between the base station 105-*a* and the UE 115-*a* is blocked, and the base station 105-*a* may use the assistive node 205 to create a viable communications path with the UE 115-*a* via the communications links 240 and 245. The base station 105-*a* may transmit control signaling 260 indicating which one of the reflecting mode or the amplifying mode is to be applied by the assistive node 205 to forward the packet transmission 265 to the UE 115-*a*. In some examples, the scheduling information in message 255 and the control signaling 260 may be transmitted in a single message. Control circuitry 235 of the assistive node 205 may configure the assistive node 205 to operate in the reflecting mode or the amplifying mode as indicated by the control signaling 260.

The base station 105-*a* may transmit the packet transmission 265 to the assistive node 205 via the communications link 240, and the assistive node 205 may amplify or reflect the packet transmission 265 to the UE 115-*a* based on the control signaling 260.

In some examples, where the assistive node 205 reports an indication of a number and arrangement of antenna elements 215 of the antenna array 210 of the assistive node 205, the control signaling 260 instructs the assistive node 205 to use at least a subset of antenna elements 215 of the antenna array 210 of the assistive node 205 for amplifying or reflecting the packet transmission 265 based on the number and arrangement of antenna elements 215 reported to the base station 105-*a*. The control circuitry 235 of the assistive node 205 may configure the subset of antenna elements 215 indicated by the control signaling 260.

In some examples, where the assistive node 205 reports an indication of an estimated distance D between the assistive node 205 and the base station 105-*a*, the control signaling 260 indicates to operate in the amplifying mode to amplify the packet transmission 265 or in the reflecting mode to reflect the packet transmission 265 based on the reported estimated distance D between the assistive node 205 and the base station 105-*a* (e.g., the base station 105-*a* may determine that the assistive node 205 should operate in the amplifying mode to amplify the packet transmission 265 or in the reflecting mode to reflect the packet transmission 265 based on the reported estimated distance D between the assistive node 205 and the base station 105-*a*). For example, as discussed herein, reflecting operations may be associated with better performance when the distance between the assistive node 205 and the base station 105-*a* is small (e.g., less than a distance threshold). In some examples, the base station 105-*a* may estimate the distance D between the assistive node 205 and the base station 105-*a*.

In some examples, where the assistive node 205 reports an indication of an estimated distance $D_1$ between the assistive node 205 and the UE 115-*a*, the control signaling 260 indicates to operate in the amplifying mode to amplify the packet transmission 265 or in the reflecting mode to reflect the packet transmission 265 based on the reported estimated distance $D_1$ between the assistive node 205 and the UE 115-*a* (e.g., the base station 105-*a* may determine that the assistive node 205 should operate in the amplifying mode to amplify the packet transmission 265 or in the reflecting mode to reflect the packet transmission 265 based on the reported estimated distance $D_1$ between the assistive node 205 and the UE 115-*a*). For example, as discussed herein, reflecting operations may be associated with better performance when the distance between the assistive node 205 and the UE 115-*a* is small.

In some examples, the base station 105-*a* determines whether the assistive node 205 should operate in a reflecting mode or an amplifying mode based on a message type of the packet transmission, a latency target associated with the packet transmission, a size of an analog beamforming codebook associated with the assistive node 205, beamwidths associated with beams in the analog beamforming codebook, a number and arrangement of antenna elements 215 of the assistive node 205, a first threshold distance between the assistive node 205 and the UE 115-*a* (e.g., where the estimated distance $D_1$ between the assistive node 205 and the UE 115-*a* may be reported to the base station 105-*a*, or where the base station 105-*a* may estimate the distance $D_1$), a threshold distance between the assistive node 205 and the base station 105-*a* (e.g., where the estimated distance D between the assistive node 205 and the base station 105-*a* may be reported at to the base station 105-*a*, or where the base station 105-*a* may estimate the distance), or a combination thereof.

In some examples, the control signaling 260 may indicate an antenna element threshold, and the assistive node 205 operates in the amplifying mode to amplify the packet transmission 265 based on a number of antenna elements 215 of the antenna array 210 of the assistive node 205 satisfying the antenna element threshold (e.g., the number of antenna elements is above a threshold) or the assistive node 205 operates in the reflecting mode to reflect the packet transmission based on the number of antenna elements 215 of the antenna array 210 not satisfying the antenna element threshold (e.g., the number of antenna elements is at or below a threshold). For example, the control circuitry 235 of the assistive node 205 may determine whether the number of antenna elements 215 of the antenna array 210 of the assistive node 205 satisfies the threshold indicated in the control signaling 260. For example, as discussed herein, reflecting operations may be associated with better performance when a number of antenna elements 215 at the assistive node 205 is small.

In some examples, the control signaling 260 may indicate a first beam of an analog beamforming codebook that is associated with the assistive node 205 operating in the amplifying mode, and the assistive node 205 operates in the amplifying mode to amplify the packet transmission 265.

In some examples, the control signaling 260 indicates a distance threshold for the distance between the assistive node 205 and the base station 105-*a*, and the assistive node 205 operates in the amplifying mode to amplify the packet transmission 265 based on an estimated distance D between the assistive node 205 and the base station 105-*a* satisfying the distance threshold (e.g., the estimated distance D exceeds the threshold) or the assistive node 205 operates in the reflecting mode to reflect the packet transmission 265 based on the estimated distance D between the assistive node 205 and the base station 105-*a* not satisfying the distance threshold e.g., the estimated distance D is at or below the threshold). For example, the control circuitry 235 of the assistive node 205 may estimate the distance D between the assistive node 205 and the base station 105-*a* and determine whether the estimated distance D satisfies the threshold indicated in the control signaling 260.

In some examples, the control signaling 260 indicates a distance threshold for the distance $D_1$ between the assistive node 205 and the UE 115-*a*, and the assistive node 205 operates in the amplifying mode to amplify the packet transmission 265 based on an estimated distance $D_1$ between the assistive node 205 and the UE 115-*a* satisfying the distance threshold or the assistive node 205 operates in the reflecting mode to reflect the packet transmission 265 based on the estimated distance $D_1$ between the assistive node 205 and the UE 115-*a* not satisfying the distance threshold. For example, the control circuitry 235 of the assistive node 205 may estimate the distance $D_1$ between the assistive node 205 and the UE 115-*a* and determine whether the estimated distance $D_1$ satisfies the threshold indicated in the control signaling 260.

In some examples, the control circuitry 235 of the assistive node 205 may select at least a subset of antenna elements 215 of the antenna array 210 of the assistive node 205 and a size of an analog beamforming codebook for amplifying or reflecting the packet transmission 265 based on whether the control signaling 260 indicates to operate in the amplifying mode to amplify the packet transmission 265 or in the reflecting mode to reflect the packet transmission 265.

Figure 3:
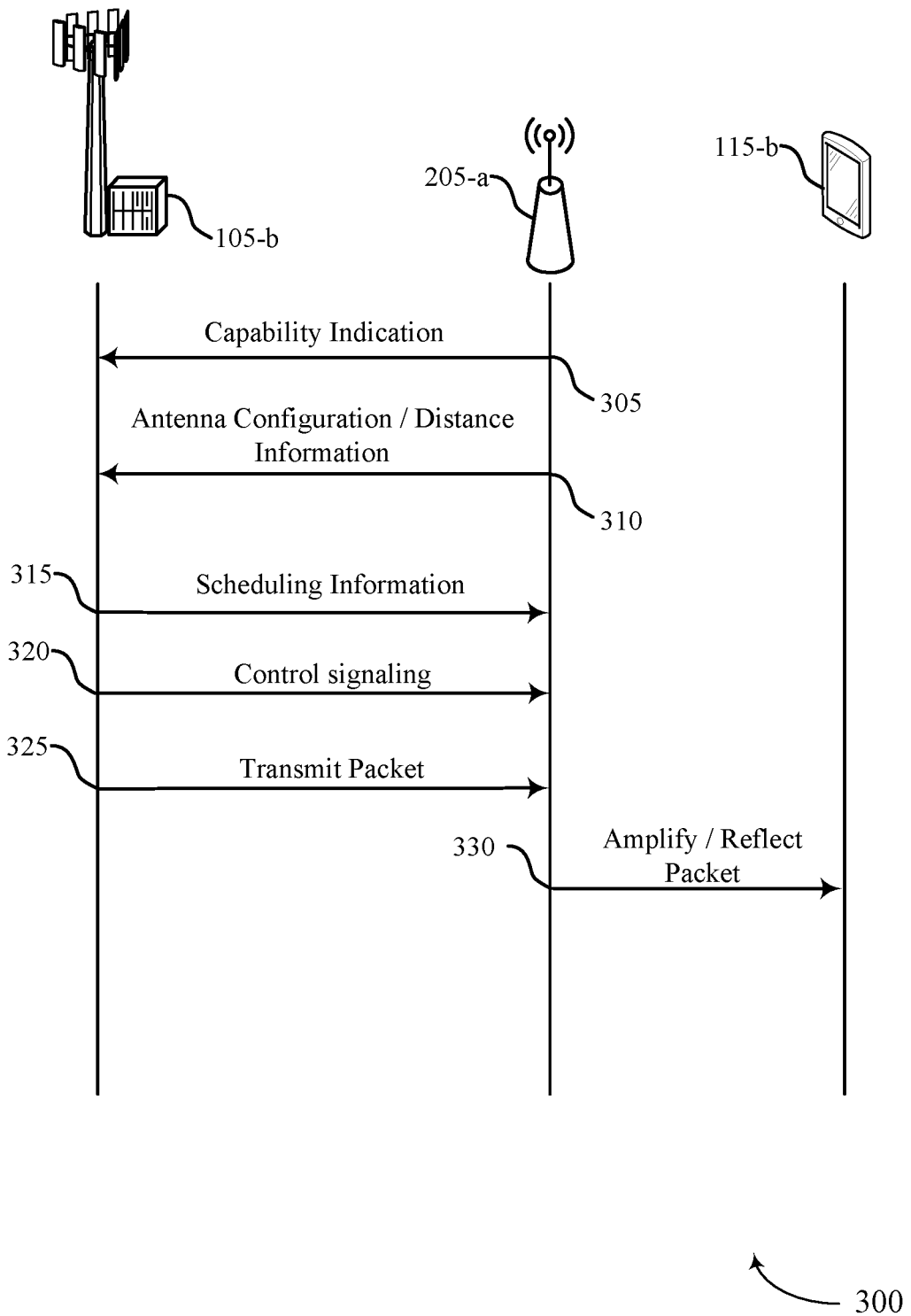
FIG. 3 illustrates an example of a process flow that supports methods for switching between repeater and IRS operations in an assistive device in accordance with aspects of the present disclosure.

FIG. 3 illustrates an example of a process flow 300 that supports methods for switching between repeater and IRS operations in an assistive device in accordance with aspects of the present disclosure. Process flow 300 may implement aspects of or may be implemented by aspects of wireless communications systems 100 or 200. For example, base station 105-*b* may be an example of a base station 105 as described herein, UE 115-*b* may be an example of a UE 115 as described herein, and assistive node 205-*a* may be an example of an assistive node 205 as described herein.

At 305, the assistive node 205-*a* may transmit a message to the base station 105-*b* indicating that the assistive node 205-*a* is capable of operating in an amplifying mode and in a reflecting mode.

In some examples, at 310, the assistive node 205-*a* may transmit a message to the base station 105-*b* indicating a number and arrangement of antenna elements of the assistive node 205-*a*, an estimated distance between the assistive node 205-*a* and a UE 115-*b*, and/or an estimated distance between the assistive node 205-*a* and the base station 105-*b*. In some examples, the UE 115-*b* may report its location to the assistive node 205-*a*, for example, which location the UE 115-*b* may determine based on global positioning system signals, or other positioning signals such as those of 3GPP, other standardization organizations, or other national positioning signals, via a mobility procedure, or via received positioning reference signals. The assistive node 205-*a* may estimate a distance between the UE 115-*b* and the assistive node 205-*a* and report the estimated distance to the base station 105-*b*. In some examples, the assistive node 205-*a* and the base station 105-*b* may be at fixed locations, and the assistive node 205-*a* may estimate a distance between the assistive node 205-*a* and the base station 105-*b* and report the estimated distance to the base station 105-*b*.

At 315, the base station 105-*b* transmits, to the assistive node 205-*a*, scheduling information for a packet transmission to be forwarded to the UE 115-*a* via the assistive node 205-*a*. For example, the base station 105-*b* may be aware that a direct link between the base station 105-*b* and the UE 115-*b* is blocked, and the base station 105-*b* may use the assistive node 205-*a* to create a viable communications path with the UE 115-*b*.

At 320, the base station 105-*b* transmits, to the assistive node 205-*a*, control signaling indicating which one of the reflecting mode or the amplifying mode is to be applied by the assistive node 205-*a* to forward the packet transmission to the UE 115-*b*. In some examples, the scheduling information transmitted at 315 and the control signaling transmitted at 320 may be transmitted in a single message.

In some examples, where the assistive node 205-*a* reports an indication at 310 of a number and arrangement of antenna elements of the assistive node 205-*a*, the control signaling received at 320 instructs the assistive node 205-*a* to use at least a subset of antenna elements of the assistive node 205-*a* for amplifying or reflecting the packet transmission based on the number and arrangement of antenna elements reported at 310.

In some examples, where the assistive node 205-*a* reports an indication at 310 of an estimated distance between the assistive node 205-*a* and the base station 105-*b*, the control signaling received at 320 indicates to operate in the amplifying mode to amplify the packet transmission or in the reflecting mode to reflect the packet transmission based on the reported estimated distance between the assistive node 205-*a* and the base station 105-*b* (e.g., the base station 105-*b* may determine that the assistive node 205-*a* should operate in the amplifying mode to amplify the packet transmission or in the reflecting mode to reflect the packet transmission based on the reported estimated distance between the assistive node 205-*a* and the base station 105-*b*). For example, as discussed herein, reflecting operations may be associated with better performance when the distance between the assistive node 205-*a* and the base station 105-*b* is small. In some examples, the base station 105-*b* may estimate the distance between the assistive node 205-*a* and the base station 105-*b*.

In some examples, where the assistive node 205-*a* reports an indication at 310 of an estimated distance between the assistive node 205-*a* and the UE 115-*b*, the control signaling received at 320 indicates to operate in the amplifying mode to amplify the packet transmission or in the reflecting mode to reflect the packet transmission based on the reported estimated distance between the assistive node 205-*a* and the UE 115-*b* (e.g., the base station 105-*b* may determine that the assistive node 205-*a* should operate in the amplifying mode to amplify the packet transmission or in the reflecting mode to reflect the packet transmission based on the reported estimated distance between the assistive node 205-*a* and the UE 115-*b*). For example, as discussed herein, reflecting operations may be associated with better performance when the distance between the assistive node 205-*a* and the UE 115-*b* is small.

In some examples, the base station 105-*b* determines whether the assistive node 205-*a* should operate in a reflecting mode or an amplifying mode based on a message type of the packet transmission, a latency target associated with the packet transmission, a size of an analog beamforming codebook associated with the assistive node 205-*a*, beamwidths associated with beams in the analog beamforming codebook, a number and arrangement of antenna elements of the assistive node 205-*a* (e.g., reported at 310), a first threshold distance between the assistive node 205-*a* and the UE 115-*b* (e.g., where the estimated distance between the assistive node 205-*a* and the UE 115-*b* may be reported at 310, or where the base station 105-*b* may estimate the distance), a threshold distance between the assistive node 205-*a* and the base station 105-*b* (e.g., where the estimated distance between the assistive node 205-*a* and the base station 105-*b* may be reported at 310, or where the base station 105-*b* may estimate the distance), or a combination thereof.

At 325, the base station 105-*b* transmits the packet transmission to the assistive node 205-*a*. At 330, the assistive node 205-*a* amplifies or reflects the packet transmission to the UE 115-*b* based on the control signaling received at 320. The assistive node 205-*a* may reflect the packet transmission via a reflective surface of the assistive node 205-*a* or amplify the packet transmission via one of a relay or a repeater of the assistive node 205-*a*.

In some examples, the control signaling received at 320 indicates an antenna element threshold, and at 330 the assistive node 205-*a* operates in the amplifying mode to amplify the packet transmission based on a number of antenna elements of the assistive node 205-*a* satisfying the antenna element threshold or the assistive node 205-*a* operates in the reflecting mode to reflect the packet transmission based on the number of antenna elements not satisfying the antenna element threshold. For example, the assistive node 205-*a* may determine whether the number of antenna elements of the assistive node 205-*a* satisfies the threshold indicated in the control signaling. For example, as discussed herein, reflecting operations may be associated with better performance when a number of antenna elements at the assistive node 205-*a* is small.

In some examples, the control signaling received at 320 may indicate a first beam of an analog beamforming codebook that is associated with the assistive node 205-*a* operating in the amplifying mode, and at 330 the assistive node 205-*a* operates in the amplifying mode to amplify the packet transmission.

In some examples, the control signaling received at 320 indicates a distance threshold for the distance between the assistive node 205-*a* and the base station 105-*b*, and at 330 the assistive node 205-*a* operates in the amplifying mode to amplify the packet transmission based on an estimated distance between the assistive node 205-*a* and the base station 105-*b* satisfying the distance threshold or the assistive node 205-*a* operates in the reflecting mode to reflect the packet transmission based on the estimated distance between the assistive node 205-*a* and the base station 105-*b* not satisfying the distance threshold. For example, the assistive node 205-*a* may estimate the distance between the assistive node 205-*a* and the base station 105-*b* and determine whether the estimated distance satisfies the threshold indicated in the control signaling.

In some examples, the control signaling received at 320 indicates a distance threshold for the distance between the assistive node 205-*a* and the UE 115-*b*, and at 330 the assistive node 205-*a* operates in the amplifying mode to amplify the packet transmission based on an estimated distance between the assistive node 205-*a* and the UE 115-*b* satisfying the distance threshold or the assistive node 205-*a* operates in the reflecting mode to reflect the packet transmission based on the estimated distance between the assistive node 205-*a* and the UE 115-*b* not satisfying the distance threshold. For example, the assistive node 205-*a* may estimate the distance between the assistive node 205-*a* and the UE 115-*b* and determine whether the estimated distance satisfies the threshold indicated in the control signaling.

In some examples, the assistive node 205-*a* may select at least a subset of antenna elements of the assistive node 205-*a* and a size of an analog beamforming codebook for amplifying or reflecting the packet transmission (e.g., beamforming transmission) based on whether the control signaling indicates to operate in the amplifying mode to amplify the packet transmission or in the reflecting mode to reflect the packet transmission.

Figure 4:
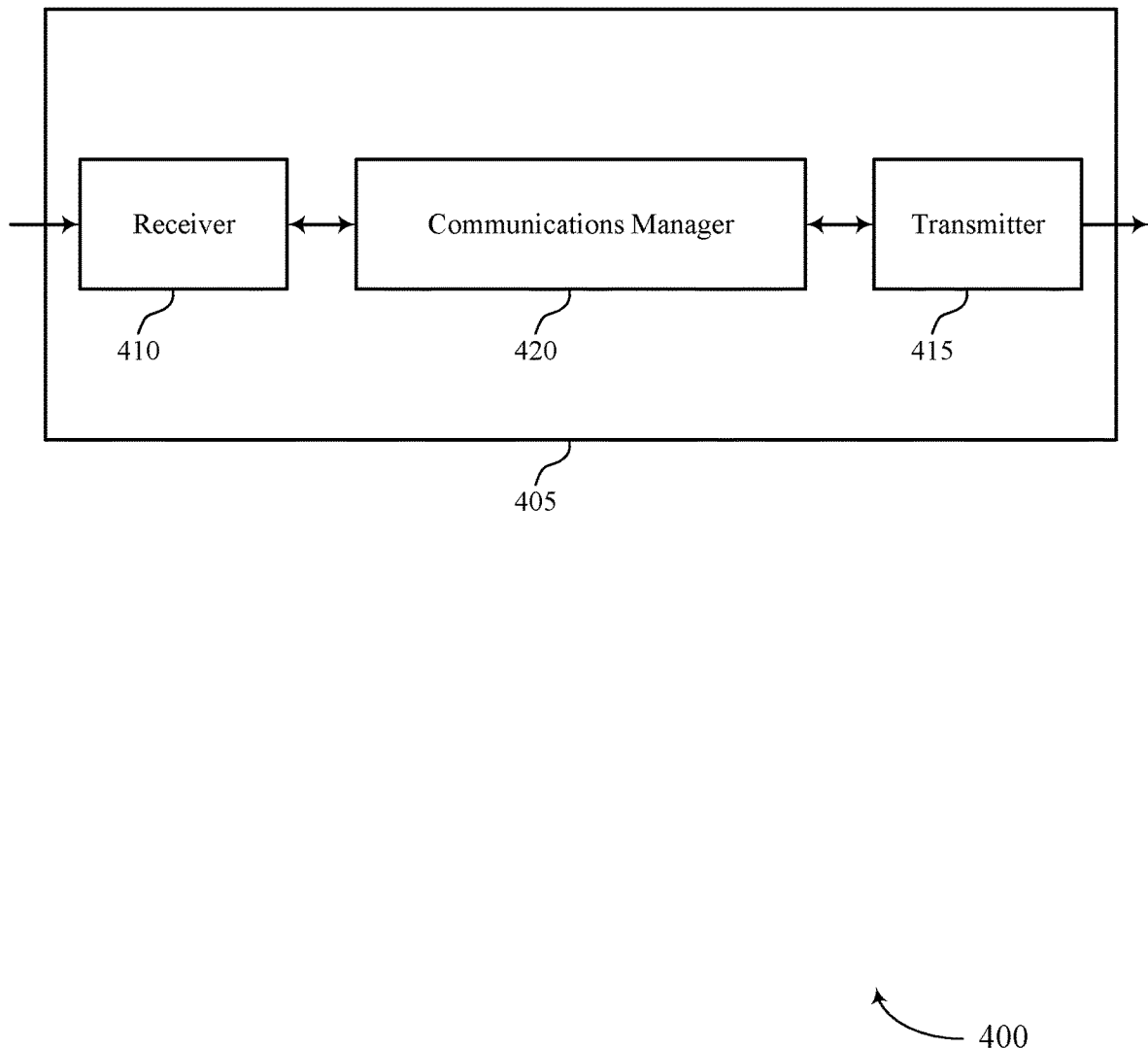
FIGS. 4 and 5 show diagrams of devices that support methods for switching between repeater and IRS operations in an assistive device in accordance with aspects of the present disclosure.

FIG. 4 shows a diagram 400 of a device 405 that supports methods for switching between repeater and IRS operations in an assistive device in accordance with aspects of the present disclosure. The device 405 may be an example of aspects of an assistive node 205 as described herein. The device 405 may include a receiver 410, a transmitter 415, and a communications manager 420. The device 405 may also include a processor. Each of these components may be in communication with one another (e.g., via one or more buses).

The receiver 410 may provide a means for receiving information such as packets, user data, control information, or any combination thereof associated with various information channels (e.g., control channels, data channels, information channels related to methods for switching between repeater and IRS operations in an assistive device). Information may be passed on to other components of the device 405. The receiver 410 may utilize a single antenna or a set of multiple antennas.

The transmitter 415 may provide a means for transmitting signals generated by other components of the device 405. For example, the transmitter 415 may transmit information such as packets, user data, control information, or any combination thereof associated with various information channels (e.g., control channels, data channels, information channels related to methods for switching between repeater and IRS operations in an assistive device). In some examples, the transmitter 415 may be co-located with a receiver 410 in a transceiver module. The transmitter 415 may utilize a single antenna or a set of multiple antennas.

The communications manager 420, the receiver 410, the transmitter 415, or various combinations thereof or various components thereof may be examples of means for performing various aspects of methods for switching between repeater and IRS operations in an assistive device as described herein. For example, the communications manager 420, the receiver 410, the transmitter 415, or various combinations or components thereof may support a method for performing one or more of the functions described herein.

In some examples, the communications manager 420, the receiver 410, the transmitter 415, or various combinations or components thereof may be implemented in hardware (e.g., in communications management circuitry). The hardware may include a processor, a digital signal processor (DSP), an application-specific integrated circuit (ASIC), a field-programmable gate array (FPGA) or other programmable logic device, a discrete gate or transistor logic, discrete hardware components, or any combination thereof configured as or otherwise supporting a means for performing the functions described in the present disclosure. In some examples, a processor and memory coupled with the processor may be configured to perform one or more of the functions described herein (e.g., by executing, by the processor, instructions stored in the memory).

Additionally or alternatively, in some examples, the communications manager 420, the receiver 410, the transmitter 415, or various combinations or components thereof may be implemented in code (e.g., as communications management software or firmware) executed by a processor. If implemented in code executed by a processor, the functions of the communications manager 420, the receiver 410, the transmitter 415, or various combinations or components thereof may be performed by a general-purpose processor, a DSP, a central processing unit (CPU), an ASIC, an FPGA, or any combination of these or other programmable logic devices (e.g., configured as or otherwise supporting a means for performing the functions described in the present disclosure).

In some examples, the communications manager 420 may be configured to perform various operations (e.g., receiving, monitoring, transmitting) using or otherwise in cooperation with the receiver 410, the transmitter 415, or both. For example, the communications manager 420 may receive information from the receiver 410, send information to the transmitter 415, or be integrated in combination with the receiver 410, the transmitter 415, or both to receive information, transmit information, or perform various other operations as described herein.

The communications manager 420 may support wireless communications at an assistive node in accordance with examples as disclosed herein. For example, the communications manager 420 may be configured as or otherwise support a means for transmitting, to a network entity, a control message indicating that the assistive node is capable of operating in an amplifying mode and in a reflecting mode. The communications manager 420 may be configured as or otherwise support a means for receiving, from the network entity, scheduling information for a packet transmission. The communications manager 420 may be configured as or otherwise support a means for receiving, from the network entity, control signaling indicating which one of the reflecting mode or the amplifying mode is to be applied by the assistive node based on the control message. The communications manager 420 may be configured as or otherwise support a means for amplifying or reflecting the packet transmission to a wireless device based on the control signaling.

By including or configuring the communications manager 420 in accordance with examples as described herein, the device 405 (e.g., a processor controlling or otherwise coupled to the receiver 410, the transmitter 415, the communications manager 420, or a combination thereof) may support techniques for reduced power consumption and more efficient utilization of communication resources by operating in an amplifying mode or a reflecting mode based on conditions associated with a given packet transmission to be forwarded by the assistive node.

Figure 5:
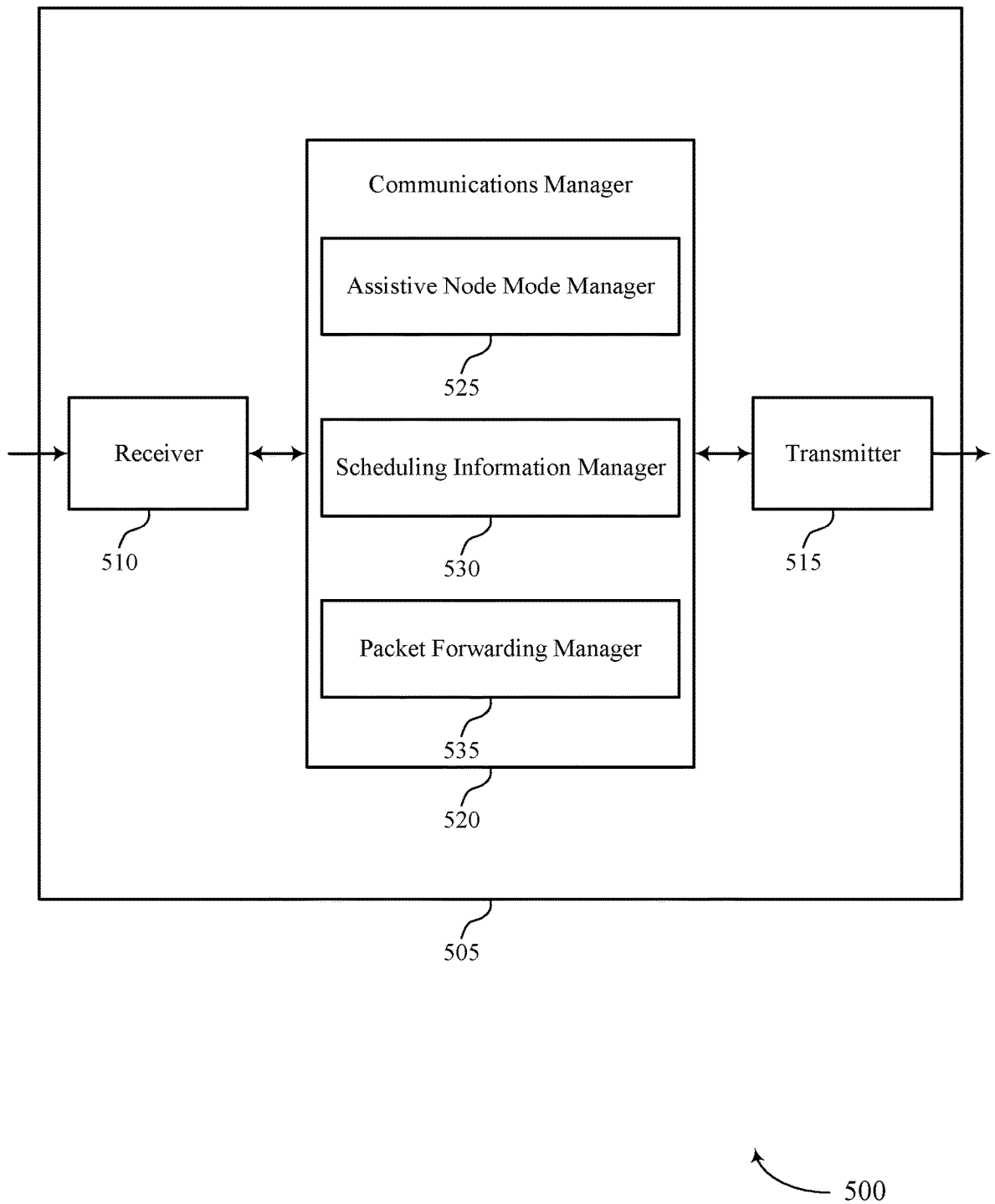

FIG. 5 shows a diagram 500 of a device 505 that supports methods for switching between repeater and IRS operations in an assistive device in accordance with aspects of the present disclosure. The device 505 may be an example of aspects of a device 405 or an assistive node 205 as described herein. The device 505 may include a receiver 510, a transmitter 515, and a communications manager 520. The device 505 may also include a processor. Each of these components may be in communication with one another (e.g., via one or more buses).

The receiver 510 may provide a means for receiving information such as packets, user data, control information, or any combination thereof associated with various information channels (e.g., control channels, data channels, information channels related to methods for switching between repeater and IRS operations in an assistive device). Information may be passed on to other components of the device 505. The receiver 510 may utilize a single antenna or a set of multiple antennas.

The transmitter 515 may provide a means for transmitting signals generated by other components of the device 505. For example, the transmitter 515 may transmit information such as packets, user data, control information, or any combination thereof associated with various information channels (e.g., control channels, data channels, information channels related to methods for switching between repeater and IRS operations in an assistive device). In some examples, the transmitter 515 may be co-located with a receiver 510 in a transceiver module. The transmitter 515 may utilize a single antenna or a set of multiple antennas.

The device 505, or various components thereof, may be an example of means for performing various aspects of methods for switching between repeater and IRS operations in an assistive device as described herein. For example, the communications manager 520 may include an Assistive Node Mode Manager 525, a Scheduling Information Manager 530, a Packet Forwarding Manager 535, or any combination thereof. The communications manager 520 may be an example of aspects of a communications manager 420 as described herein. In some examples, the communications manager 520, or various components thereof, may be configured to perform various operations (e.g., receiving, monitoring, transmitting) using or otherwise in cooperation with the receiver 510, the transmitter 515, or both. For example, the communications manager 520 may receive information from the receiver 510, send information to the transmitter 515, or be integrated in combination with the receiver 510, the transmitter 515, or both to receive information, transmit information, or perform various other operations as described herein.

The communications manager 520 may support wireless communications at an assistive node in accordance with examples as disclosed herein. The Assistive Node Mode Manager 525 may be configured as or otherwise support a means for transmitting, to a network entity, a control message indicating that the assistive node is capable of operating in an amplifying mode and in a reflecting mode. The Scheduling Information Manager 530 may be configured as or otherwise support a means for receiving, from the network entity, scheduling information for a packet transmission. The Assistive Node Mode Manager 525 may be configured as or otherwise support a means for receiving, from the network entity, control signaling indicating which one of the reflecting mode or the amplifying mode is to be applied by the assistive node based on the control message. The Packet Forwarding Manager 535 may be configured as or otherwise support a means for amplifying or reflecting the packet transmission to a wireless device based on the control signaling.

Figure 6:
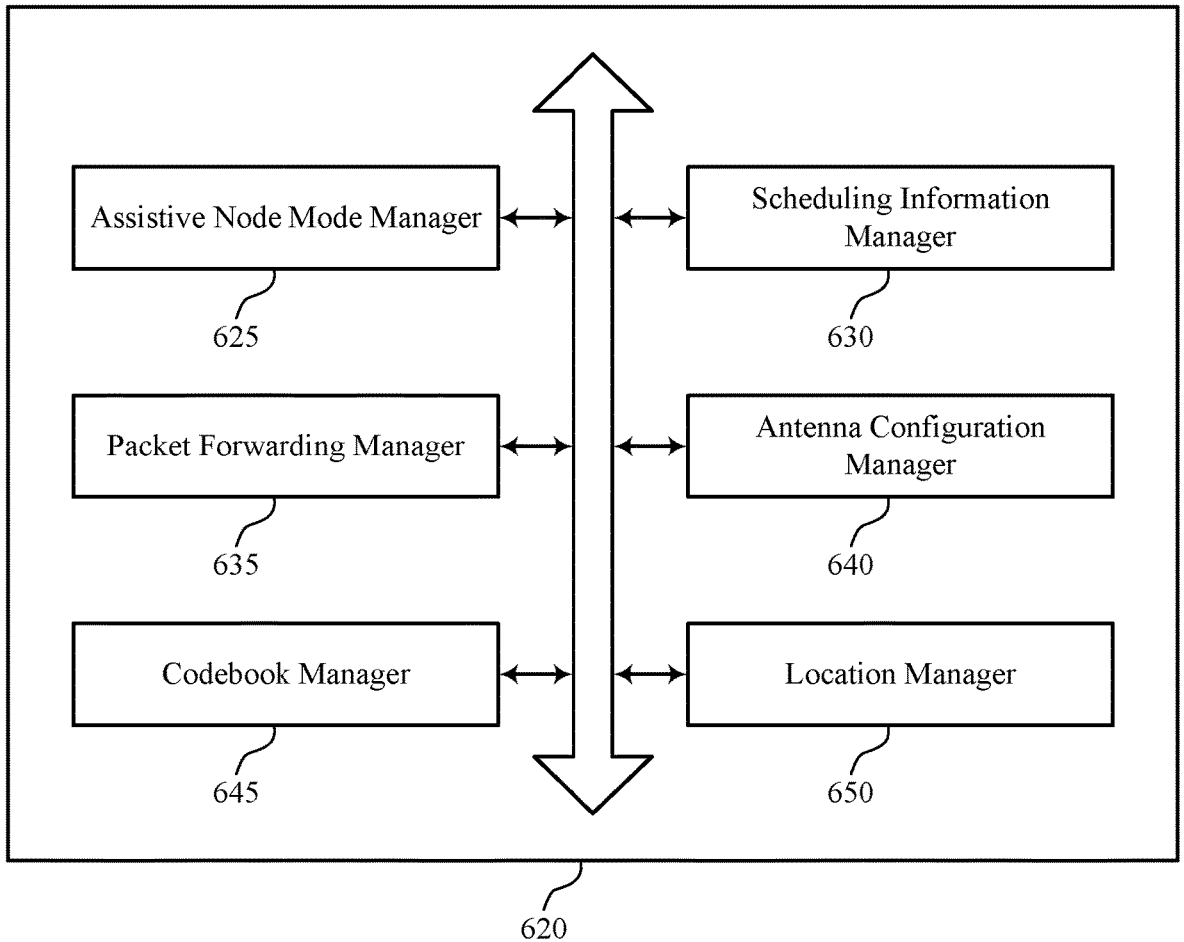
FIG. 6 shows a diagram of a communications manager that supports methods for switching between repeater and IRS operations in an assistive device in accordance with aspects of the present disclosure.

FIG. 6 shows a diagram 600 of a communications manager 620 that supports methods for switching between repeater and IRS operations in an assistive device in accordance with aspects of the present disclosure. The communications manager 620 may be an example of aspects of a communications manager 420, a communications manager 520, or both, as described herein. The communications manager 620, or various components thereof, may be an example of means for performing various aspects of methods for switching between repeater and IRS operations in an assistive device as described herein. For example, the communications manager 620 may include an Assistive Node Mode Manager 625, a Scheduling Information Manager 630, a Packet Forwarding Manager 635, an Antenna Configuration Manager 640, a Codebook Manager 645, a Location Manager 650, or any combination thereof. Each of these components may communicate, directly or indirectly, with one another (e.g., via one or more buses).

The communications manager 620 may support wireless communications at an assistive node in accordance with examples as disclosed herein. The Assistive Node Mode Manager 625 may be configured as or otherwise support a means for transmitting, to a network entity, a control message indicating that the assistive node is capable of operating in an amplifying mode and in a reflecting mode. The Scheduling Information Manager 630 may be configured as or otherwise support a means for receiving, from the network entity, scheduling information for a packet transmission. In some examples, the Assistive Node Mode Manager 625 may be configured as or otherwise support a means for receiving, from the network entity, control signaling indicating which one of the reflecting mode or the amplifying mode is to be applied by the assistive node based on the control message. The Packet Forwarding Manager 635 may be configured as or otherwise support a means for amplifying or reflecting the packet transmission to a wireless device based on the control signaling.

In some examples, the Antenna Configuration Manager 640 may be configured as or otherwise support a means for transmitting, to the network entity, a second message indicating a number and arrangement of antenna elements of the assistive node, where the control signaling instructs the assistive node to use at least a subset of antenna elements of the assistive node for amplifying or reflecting the packet transmission based on the number and arrangement of antenna elements.

In some examples, the Assistive Node Mode Manager 625 may be configured as or otherwise support a means for receiving the control signaling indicating an antenna element threshold, where the assistive node operates in the amplifying mode to amplify the packet transmission based on a number of antenna elements of the assistive node satisfying the antenna element threshold or the assistive node operates in the reflecting mode to reflect the packet transmission based on the number of antenna elements not satisfying the antenna element threshold.

In some examples, the Codebook Manager 645 may be configured as or otherwise support a means for receiving the control signaling indicating a first beam of a first codebook that is associated with the assistive node operating in the amplifying mode, where the packet transmission is amplified by the assistive node using the first beam.

In some examples, the Location Manager 650 may be configured as or otherwise support a means for transmitting, to the network entity, a second message indicating an estimated distance between the assistive node and the network entity, where the control signaling indicates to operate in the reflecting mode to reflect the packet transmission or operate in the amplifying mode to amplify the packet transmission based on the estimated distance between the assistive node and the network entity.

In some examples, the Location Manager 650 may be configured as or otherwise support a means for receiving the control signaling indicating a distance threshold between the assistive node and the network entity, where the assistive node operates in the amplifying mode to amplify the packet transmission based on an estimated distance between the assistive node and the network entity satisfying the distance threshold or the assistive node operates in the reflecting mode to reflect the packet transmission based on the estimated distance between the assistive node and the network entity not satisfying the distance threshold.

In some examples, the Location Manager 650 may be configured as or otherwise support a means for transmitting, to the network entity, a second message indicating an estimated distance between the assistive node and the wireless device, where the control signaling indicates to one of operate in the reflecting mode to reflect the packet transmission or operate in the amplifying mode to amplify the packet transmission based on the estimated distance between the assistive node and the wireless device.

In some examples, the Location Manager 650 may be configured as or otherwise support a means for receiving the control signaling indicating a distance threshold between the assistive node and the wireless device, where the assistive node operates in the amplifying mode to amplify the packet transmission based on an estimated distance between the assistive node and the wireless device satisfying the distance threshold or the assistive node operates in the reflecting mode to reflect the packet transmission based on the estimated distance between the assistive node and the wireless device not satisfying the distance threshold.

In some examples, the Assistive Node Mode Manager 625 may be configured as or otherwise support a means for receiving the control signaling indicating which one of the reflecting mode or the amplifying mode is to be applied to the packet transmission based on a message type of the packet transmission, a latency target associated with the packet transmission, a size of an analog beamforming codebook associated with the assistive node, beamwidths associated with beams in the analog beamforming codebook, a number and arrangement of antenna elements of the assistive node, a first threshold distance between the assistive node and the wireless device, a second threshold distance between the assistive node and the network entity, or a combination thereof.

In some examples, the packet transmission is one of reflected via a reflective surface of the assistive node or amplified via one of a relay or a repeater of the assistive node.

In some examples, the Scheduling Information Manager 630 may be configured as or otherwise support a means for receiving, from the network entity, a second message including the scheduling information and the control signaling.

In some examples, the Assistive Node Mode Manager 625 may be configured as or otherwise support a means for selecting at least a subset of antenna elements of the assistive node and a size of an analog beamforming codebook for amplifying or reflecting the packet transmission based on the control signaling indicating which one of the reflecting mode or the amplifying mode is to be applied by the assistive node.

Figure 7:
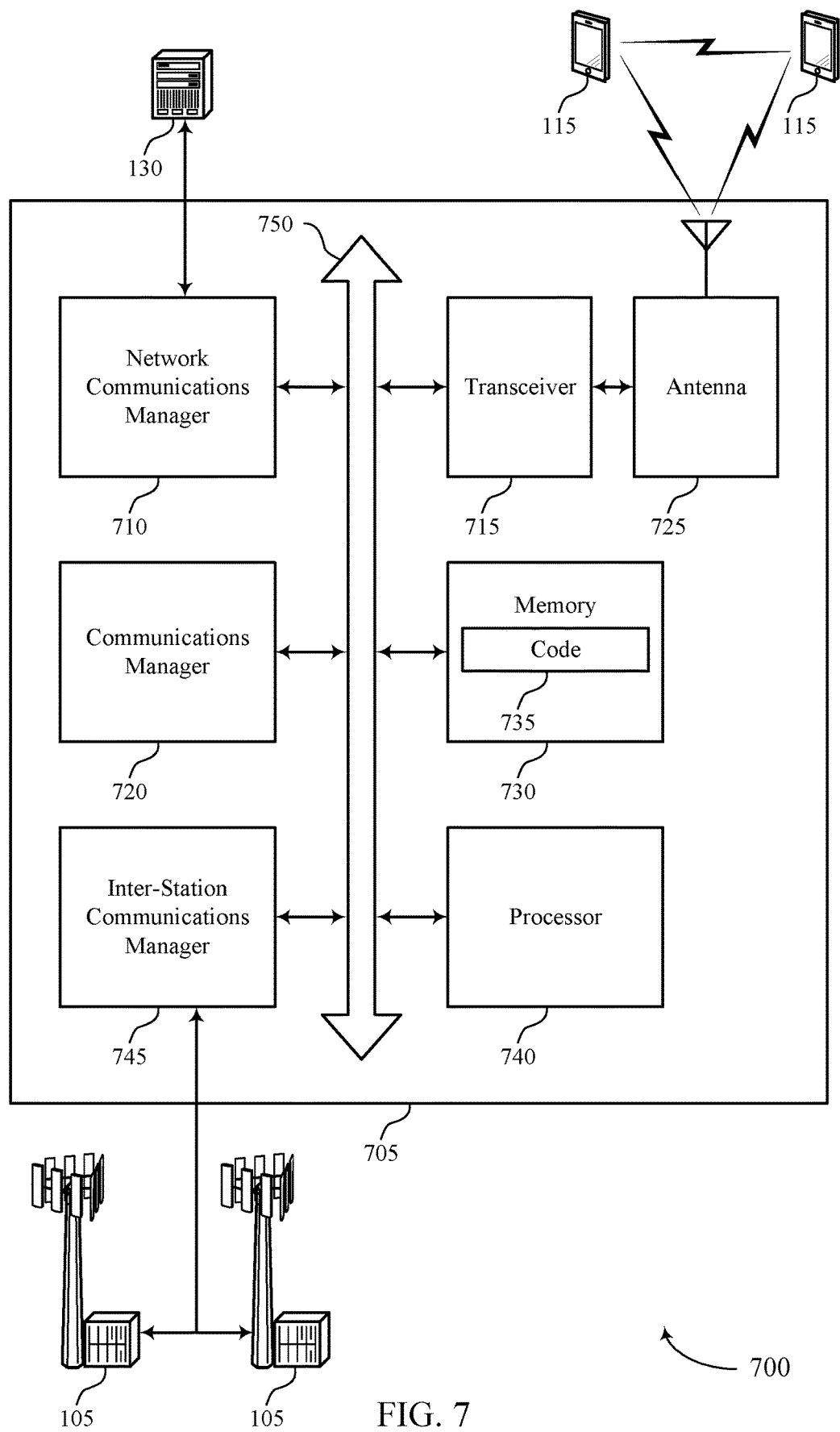
FIG. 7 shows a diagram of a system including a device that supports methods for switching between repeater and IRS operations in an assistive device in accordance with aspects of the present disclosure.

FIG. 7 shows a diagram of a system 700 including a device 705 that supports methods for switching between repeater and IRS operations in an assistive device in accordance with aspects of the present disclosure. The device 705 may be an example of or include the components of a device 405, a device 505, or an assistive node 205 as described herein. The device 705 may include components for bi-directional voice and data communications including components for transmitting and receiving communications, such as a communications manager 720, a network communications manager 710, a transceiver 715, an antenna 725, a memory 730, code 735, a processor 740, and an inter-station communications manager 745. These components may be in electronic communication or otherwise coupled (e.g., operatively, communicatively, functionally, electronically, electrically) via one or more buses (e.g., a bus 750).

The network communications manager 710 may manage communications with a core network 130 (e.g., via one or more wired backhaul links). For example, the network communications manager 710 may manage the transfer of data communications for client devices, such as one or more UEs 115.

In some cases, the device 705 may include a single antenna 725. However, in some other cases the device 705 may have more than one antenna 725, which may be capable of concurrently transmitting or receiving multiple wireless transmissions. The transceiver 715 may communicate bi-directionally, via the one or more antennas 725, wired, or wireless links as described herein. For example, the transceiver 715 may represent a wireless transceiver and may communicate bi-directionally with another wireless transceiver. The transceiver 715 may also include a modem to modulate the packets, to provide the modulated packets to one or more antennas 725 for transmission, and to demodulate packets received from the one or more antennas 725. The transceiver 715, or the transceiver 715 and one or more antennas 725, may be an example of a transmitter 415, a transmitter 515, a receiver 410, a receiver 510, or any combination thereof or component thereof, as described herein.

The memory 730 may include random access memory (RAM) and read-only memory (ROM). The memory 730 may store computer-readable, computer-executable code 735 including instructions that, when executed by the processor 740, cause the device 705 to perform various functions described herein. The code 735 may be stored in a non-transitory computer-readable medium such as system memory or another type of memory. In some cases, the code 735 may not be directly executable by the processor 740 but may cause a computer (e.g., when compiled and executed) to perform functions described herein. In some cases, the memory 730 may contain, among other things, a basic I/O system (BIOS) which may control basic hardware or software operation such as the interaction with peripheral components or devices.

The processor 740 may include an intelligent hardware device (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 740 may be configured to operate a memory array using a memory controller. In some other cases, a memory controller may be integrated into the processor 740. The processor 740 may be configured to execute computer-readable instructions stored in a memory (e.g., the memory 730) to cause the device 705 to perform various functions (e.g., functions or tasks supporting methods for switching between repeater and IRS operations in an assistive device). For example, the device 705 or a component of the device 705 may include a processor 740 and memory 730 coupled to the processor 740, the processor 740 and memory 730 configured to perform various functions described herein.

The inter-station communications manager 745 may manage communications with other base stations 105, and may include a controller or scheduler for controlling communications with UEs 115 in cooperation with other base stations 105. For example, the inter-station communications manager 745 may coordinate scheduling for transmissions to UEs 115 for various interference mitigation techniques such as beamforming or joint transmission. In some examples, the inter-station communications manager 745 may provide an X2 interface within an LTE/LTE-A wireless communications network technology to provide communication between base stations 105.

The communications manager 720 may support wireless communications at an assistive node in accordance with examples as disclosed herein. For example, the communications manager 720 may be configured as or otherwise support a means for transmitting, to a network entity, a control message indicating that the assistive node is capable of operating in an amplifying mode and in a reflecting mode. The communications manager 720 may be configured as or otherwise support a means for receiving, from the network entity, scheduling information for a packet transmission. The communications manager 720 may be configured as or otherwise support a means for receiving, from the network entity, control signaling indicating which one of the reflecting mode or the amplifying mode is to be applied by the assistive node based on the control message. The communications manager 720 may be configured as or otherwise support a means for amplifying or reflecting the packet transmission to a wireless device based on the control signaling.

By including or configuring the communications manager 720 in accordance with examples as described herein, the device 705 may support techniques for reduced latency, reduced power consumption, more efficient utilization of communication resources, and improved coordination between devices by operating in an amplifying mode or a reflecting mode based on conditions associated with a given packet transmission to be forwarded by the assistive node.

In some examples, the communications manager 720 may be configured to perform various operations (e.g., receiving, monitoring, transmitting) using or otherwise in cooperation with the transceiver 715, the one or more antennas 725, or any combination thereof. Although the communications manager 720 is illustrated as a separate component, in some examples, one or more functions described with reference to the communications manager 720 may be supported by or performed by the processor 740, the memory 730, the code 735, or any combination thereof. For example, the code 735 may include instructions executable by the processor 740 to cause the device 705 to perform various aspects of methods for switching between repeater and IRS operations in an assistive device as described herein, or the processor 740 and the memory 730 may be otherwise configured to perform or support such operations.

Figure 8:
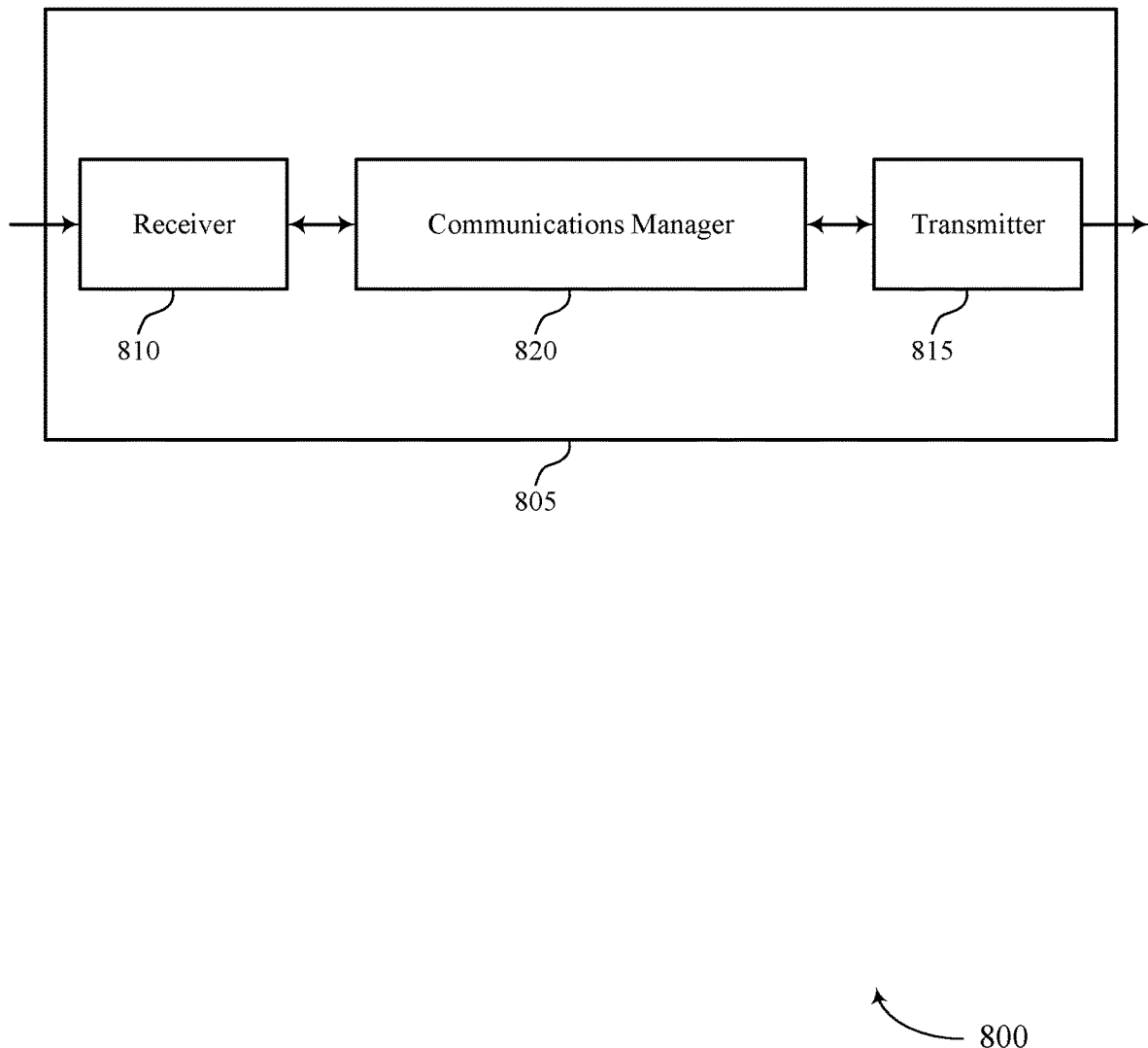
FIGS. 8 and 9 show diagrams of devices that support methods for switching between repeater and IRS operations in an assistive device in accordance with aspects of the present disclosure.

FIG. 8 shows a diagram 800 of a device 805 that supports methods for switching between repeater and IRS operations in an assistive device in accordance with aspects of the present disclosure. The device 805 may be an example of aspects of a network entity or a base station 105 as described herein. The device 805 may include a receiver 810, a transmitter 815, and a communications manager 820. The device 805 may also include a processor. Each of these components may be in communication with one another (e.g., via one or more buses).

The receiver 810 may provide a means for receiving information such as packets, user data, control information, or any combination thereof associated with various information channels (e.g., control channels, data channels, information channels related to methods for switching between repeater and IRS operations in an assistive device). Information may be passed on to other components of the device 805. The receiver 810 may utilize a single antenna or a set of multiple antennas.

The transmitter 815 may provide a means for transmitting signals generated by other components of the device 805. For example, the transmitter 815 may transmit information such as packets, user data, control information, or any combination thereof associated with various information channels (e.g., control channels, data channels, information channels related to methods for switching between repeater and IRS operations in an assistive device). In some examples, the transmitter 815 may be co-located with a receiver 810 in a transceiver module. The transmitter 815 may utilize a single antenna or a set of multiple antennas.

The communications manager 820, the receiver 810, the transmitter 815, or various combinations thereof or various components thereof may be examples of means for performing various aspects of methods for switching between repeater and IRS operations in an assistive device as described herein. For example, the communications manager 820, the receiver 810, the transmitter 815, or various combinations or components thereof may support a method for performing one or more of the functions described herein.

In some examples, the communications manager 820, the receiver 810, the transmitter 815, or various combinations or components thereof may be implemented in hardware (e.g., in communications management circuitry). The hardware may include a processor, a DSP, an ASIC, an FPGA or other programmable logic device, a discrete gate or transistor logic, discrete hardware components, or any combination thereof configured as or otherwise supporting a means for performing the functions described in the present disclosure. In some examples, a processor and memory coupled with the processor may be configured to perform one or more of the functions described herein (e.g., by executing, by the processor, instructions stored in the memory).

Additionally or alternatively, in some examples, the communications manager 820, the receiver 810, the transmitter 815, or various combinations or components thereof may be implemented in code (e.g., as communications management software or firmware) executed by a processor. If implemented in code executed by a processor, the functions of the communications manager 820, the receiver 810, the transmitter 815, or various combinations or components thereof may be performed by a general-purpose processor, a DSP, a CPU, an ASIC, an FPGA, or any combination of these or other programmable logic devices (e.g., configured as or otherwise supporting a means for performing the functions described in the present disclosure).

In some examples, the communications manager 820 may be configured to perform various operations (e.g., receiving, monitoring, transmitting) using or otherwise in cooperation with the receiver 810, the transmitter 815, or both. For example, the communications manager 820 may receive information from the receiver 810, send information to the transmitter 815, or be integrated in combination with the receiver 810, the transmitter 815, or both to receive information, transmit information, or perform various other operations as described herein.

The communications manager 820 may support wireless communications at a network entity in accordance with examples as disclosed herein. For example, the communications manager 820 may be configured as or otherwise support a means for receiving, from an assistive node, a control message indicating that the assistive node is capable of operating in an amplifying mode and in a reflecting mode. The communications manager 820 may be configured as or otherwise support a means for transmitting, to the assistive node, scheduling information for a packet transmission. The communications manager 820 may be configured as or otherwise support a means for transmitting, to the assistive node, control signaling indicating which one of the reflecting mode or the amplifying mode is to be applied by the assistive node to reflect or amplify the packet transmission to a wireless device based on the control message. The communications manager 820 may be configured as or otherwise support a means for transmitting, to the assistive node, the packet transmission based on the scheduling information.

By including or configuring the communications manager 820 in accordance with examples as described herein, the device 805 (e.g., a processor controlling or otherwise coupled to the receiver 810, the transmitter 815, the communications manager 820, or a combination thereof) may support techniques for reduced power consumption and more efficient utilization of communication resources by signaling to an assistive node to operate in an amplifying mode or a reflecting mode based on conditions associated with a given packet transmission to be forwarded by the assistive node.

Figure 9:
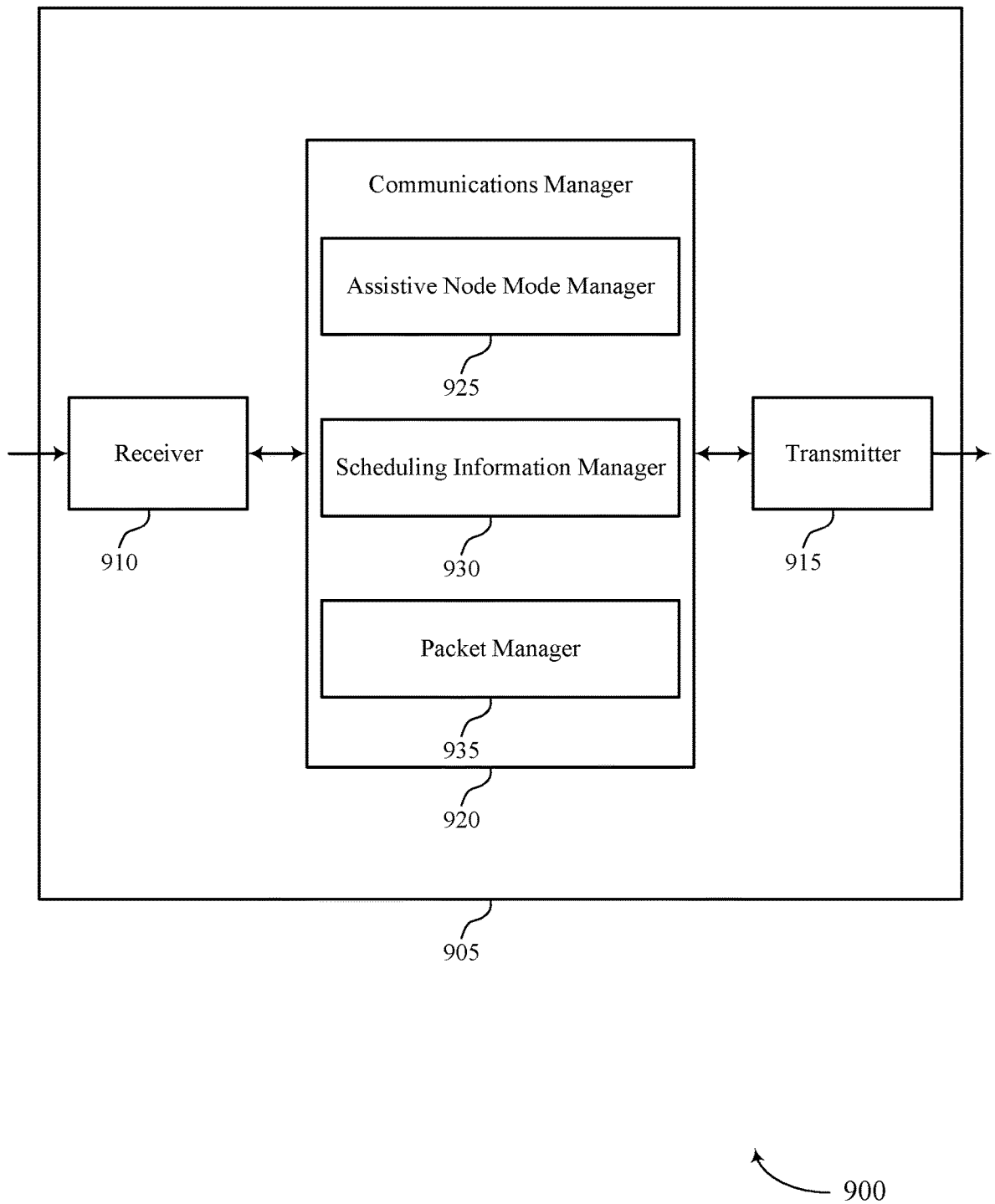

FIG. 9 shows a diagram 900 of a device 905 that supports methods for switching between repeater and IRS operations in an assistive device in accordance with aspects of the present disclosure. The device 905 may be an example of aspects of a device 805 or a network entity or a base station 105 as described herein. The device 905 may include a receiver 910, a transmitter 915, and a communications manager 920. The device 905 may also include a processor. Each of these components may be in communication with one another (e.g., via one or more buses).

The receiver 910 may provide a means for receiving information such as packets, user data, control information, or any combination thereof associated with various information channels (e.g., control channels, data channels, information channels related to methods for switching between repeater and IRS operations in an assistive device). Information may be passed on to other components of the device 905. The receiver 910 may utilize a single antenna or a set of multiple antennas.

The transmitter 915 may provide a means for transmitting signals generated by other components of the device 905. For example, the transmitter 915 may transmit information such as packets, user data, control information, or any combination thereof associated with various information channels (e.g., control channels, data channels, information channels related to methods for switching between repeater and IRS operations in an assistive device). In some examples, the transmitter 915 may be co-located with a receiver 910 in a transceiver module. The transmitter 915 may utilize a single antenna or a set of multiple antennas.

The device 905, or various components thereof, may be an example of means for performing various aspects of methods for switching between repeater and IRS operations in an assistive device as described herein. For example, the communications manager 920 may include an Assistive Node Mode Manager 925, a Scheduling Information Manager 930, a Packet Manager 935, or any combination thereof. The communications manager 920 may be an example of aspects of a communications manager 820 as described herein. In some examples, the communications manager 920, or various components thereof, may be configured to perform various operations (e.g., receiving, monitoring, transmitting) using or otherwise in cooperation with the receiver 910, the transmitter 915, or both. For example, the communications manager 920 may receive information from the receiver 910, send information to the transmitter 915, or be integrated in combination with the receiver 910, the transmitter 915, or both to receive information, transmit information, or perform various other operations as described herein.

The communications manager 920 may support wireless communications at a network entity in accordance with examples as disclosed herein. The Assistive Node Mode Manager 925 may be configured as or otherwise support a means for receiving, from an assistive node, a control message indicating that the assistive node is capable of operating in an amplifying mode and in a reflecting mode. The Scheduling Information Manager 930 may be configured as or otherwise support a means for transmitting, to the assistive node, scheduling information for a packet transmission. The Assistive Node Mode Manager 925 may be configured as or otherwise support a means for transmitting, to the assistive node, control signaling indicating which one of the reflecting mode or the amplifying mode is to be applied by the assistive node to reflect or amplify the packet transmission to a wireless device based on the control message. The Packet Manager 935 may be configured as or otherwise support a means for transmitting, to the assistive node, the packet transmission based on the scheduling information.

Figure 10:
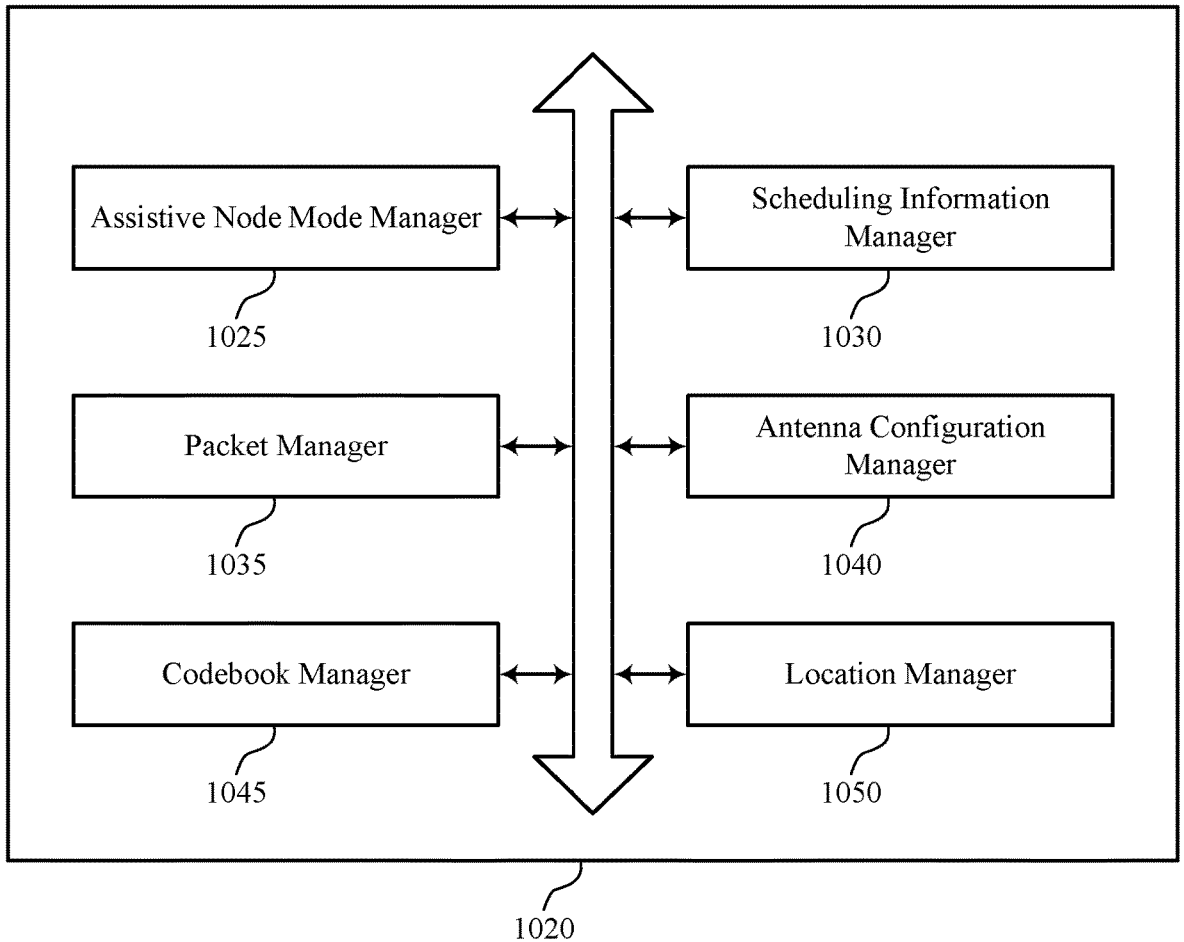
FIG. 10 shows a diagram of a communications manager that supports methods for switching between repeater and IRS operations in an assistive device in accordance with aspects of the present disclosure.

FIG. 10 shows a diagram 1000 of a communications manager 1020 that supports methods for switching between repeater and IRS operations in an assistive device in accordance with aspects of the present disclosure. The communications manager 1020 may be an example of aspects of a communications manager 820, a communications manager 920, or both, as described herein. The communications manager 1020, or various components thereof, may be an example of means for performing various aspects of methods for switching between repeater and IRS operations in an assistive device as described herein. For example, the communications manager 1020 may include an Assistive Node Mode Manager 1025, a Scheduling Information Manager 1030, a Packet Manager 1035, an Antenna Configuration Manager 1040, a Codebook Manager 1045, a Location Manager 1050, or any combination thereof. Each of these components may communicate, directly or indirectly, with one another (e.g., via one or more buses).

The communications manager 1020 may support wireless communications at a network entity in accordance with examples as disclosed herein. The Assistive Node Mode Manager 1025 may be configured as or otherwise support a means for receiving, from an assistive node, a control message indicating that the assistive node is capable of operating in an amplifying mode and in a reflecting mode. The Scheduling Information Manager 1030 may be configured as or otherwise support a means for transmitting, to the assistive node, scheduling information for a packet transmission. In some examples, the Assistive Node Mode Manager 1025 may be configured as or otherwise support a means for transmitting, to the assistive node, control signaling indicating which one of the reflecting mode or the amplifying mode is to be applied by the assistive node to reflect or amplify the packet transmission to a wireless device based on the control message. The Packet Manager 1035 may be configured as or otherwise support a means for transmitting, to the assistive node, the packet transmission based on the scheduling information.

In some examples, the Antenna Configuration Manager 1040 may be configured as or otherwise support a means for receiving, from the assistive node, a second message indicating a number and arrangement of antenna elements of the assistive node, where the control signaling instructs the assistive node to use at least a subset of antenna elements of the assistive node for amplifying or reflecting the packet transmission based on the number and arrangement of antenna elements.

In some examples, the Antenna Configuration Manager 1040 may be configured as or otherwise support a means for transmitting the control signaling indicating an antenna element threshold, where the assistive node operates in the amplifying mode to amplify the packet transmission based on a number of antenna elements of the assistive node satisfying the antenna element threshold or the assistive node operates in the reflecting mode to reflect the packet transmission based on the number of antenna elements not satisfying the antenna element threshold.

In some examples, the Codebook Manager 1045 may be configured as or otherwise support a means for transmitting the control signaling indicating a first beam of a first codebook that is associated with the assistive node operating in the amplifying mode, where the packet transmission is amplified by the assistive node using the first beam.

In some examples, the Location Manager 1050 may be configured as or otherwise support a means for receiving, from the assistive node, a second message indicating an estimated distance between the assistive node and the network entity, where the control signaling indicates to operate in the reflecting mode to reflect the packet transmission or operate in the amplifying mode to amplify the packet transmission based on the estimated distance between the assistive node and the network entity.

In some examples, the Location Manager 1050 may be configured as or otherwise support a means for transmitting the control signaling indicating a distance threshold between the assistive node and the network entity, where the assistive node operates in the amplifying mode to amplify the packet transmission based on an estimated distance between the assistive node and the network entity satisfying the distance threshold or the assistive node operates in the reflecting mode to reflect the packet transmission based on the estimated distance between the assistive node and the network entity not satisfying the distance threshold.

In some examples, the Location Manager 1050 may be configured as or otherwise support a means for receiving, from the assistive node, a second message indicating an estimated distance between the assistive node and the wireless device, where the control signaling indicates to one of operate in the reflecting mode to reflect the packet transmission or operate in the amplifying mode to amplify the packet transmission based on the estimated distance between the assistive node and the wireless device.

In some examples, the Location Manager 1050 may be configured as or otherwise support a means for transmitting the control signaling indicating a distance threshold between the assistive node and the wireless device, where the assistive node operates in the amplifying mode to amplify the packet transmission based on an estimated distance between the assistive node and the wireless device satisfying the distance threshold or the assistive node operates in the reflecting mode to reflect the packet transmission based on the estimated distance between the assistive node and the wireless device not satisfying the distance threshold.

In some examples, the Assistive Node Mode Manager 1025 may be configured as or otherwise support a means for transmitting the control signaling indicating which one of the reflecting mode or the amplifying mode is to be applied based on a message type of the packet transmission, a latency target associated with the packet transmission, a size of an analog beamforming codebook associated with the assistive node, beamwidths associated with beams in the analog beamforming codebook, a number and arrangement of antenna elements of the assistive node, a first threshold distance between the assistive node and the wireless device, a second threshold distance between the assistive node and the network entity, or a combination thereof.

In some examples, the Scheduling Information Manager 1030 may be configured as or otherwise support a means for transmitting, to the assistive node, a second message including the scheduling information and the control signaling.

Figure 11:
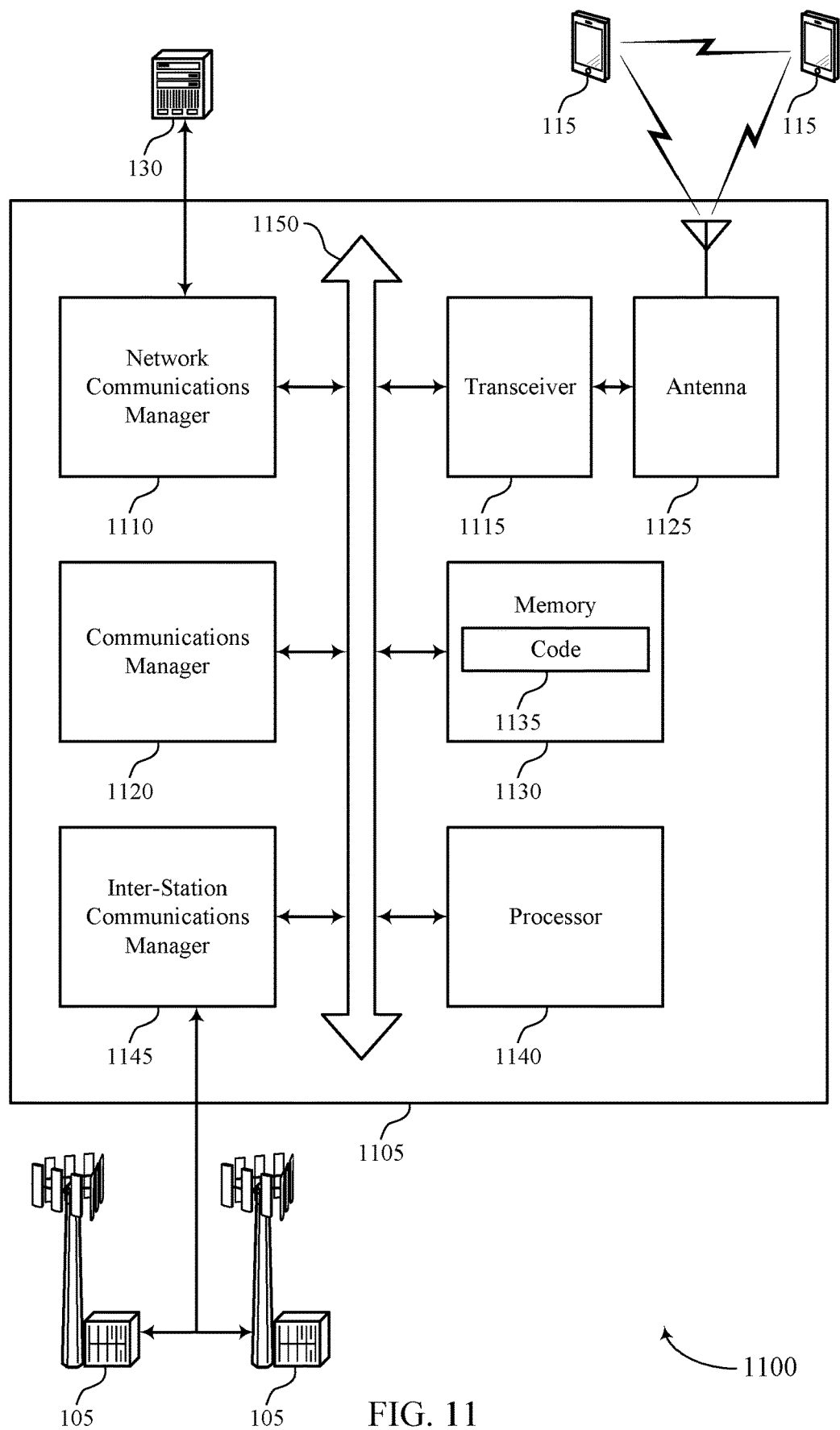
FIG. 11 shows a diagram of a system including a device that supports methods for switching between repeater and IRS operations in an assistive device in accordance with aspects of the present disclosure.

FIG. 11 shows a diagram of a system 1100 including a device 1105 that supports methods for switching between repeater and IRS operations in an assistive device in accordance with aspects of the present disclosure. The device 1105 may be an example of or include the components of a device 805, a device 905, a network entity, or a base station 105 as described herein. The device 1105 may communicate wirelessly with one or more base stations 105, UEs 115, or any combination thereof. The device 1105 may include components for bi-directional voice and data communications including components for transmitting and receiving communications, such as a communications manager 1120, a network communications manager 1110, a transceiver 1115, an antenna 1125, a memory 1130, code 1135, a processor 1140, and an inter-station communications manager 1145. These components may be in electronic communication or otherwise coupled (e.g., operatively, communicatively, functionally, electronically, electrically) via one or more buses (e.g., a bus 1150).

The network communications manager 1110 may manage communications with a core network 130 (e.g., via one or more wired backhaul links). For example, the network communications manager 1110 may manage the transfer of data communications for client devices, such as one or more UEs 115.

In some cases, the device 1105 may include a single antenna 1125. However, in some other cases the device 1105 may have more than one antenna 1125, which may be capable of concurrently transmitting or receiving multiple wireless transmissions. The transceiver 1115 may communicate bi-directionally, via the one or more antennas 1125, wired, or wireless links as described herein. For example, the transceiver 1115 may represent a wireless transceiver and may communicate bi-directionally with another wireless transceiver. The transceiver 1115 may also include a modem to modulate the packets, to provide the modulated packets to one or more antennas 1125 for transmission, and to demodulate packets received from the one or more antennas 1125. The transceiver 1115, or the transceiver 1115 and one or more antennas 1125, may be an example of a transmitter 815, a transmitter 915, a receiver 810, a receiver 910, or any combination thereof or component thereof, as described herein.

The memory 1130 may include RAM and ROM. The memory 1130 may store computer-readable, computer-executable code 1135 including instructions that, when executed by the processor 1140, cause the device 1105 to perform various functions described herein. The code 1135 may be stored in a non-transitory computer-readable medium such as system memory or another type of memory. In some cases, the code 1135 may not be directly executable by the processor 1140 but may cause a computer (e.g., when compiled and executed) to perform functions described herein. In some cases, the memory 1130 may contain, among other things, a BIOS which may control basic hardware or software operation such as the interaction with peripheral components or devices.

The processor 1140 may include an intelligent hardware device (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 1140 may be configured to operate a memory array using a memory controller. In some other cases, a memory controller may be integrated into the processor 1140. The processor 1140 may be configured to execute computer-readable instructions stored in a memory (e.g., the memory 1130) to cause the device 1105 to perform various functions (e.g., functions or tasks supporting methods for switching between repeater and IRS operations in an assistive device). For example, the device 1105 or a component of the device 1105 may include a processor 1140 and memory 1130 coupled to the processor 1140, the processor 1140 and memory 1130 configured to perform various functions described herein.

The inter-station communications manager 1145 may manage communications with other base stations 105, and may include a controller or scheduler for controlling communications with UEs 115 in cooperation with other base stations 105. For example, the inter-station communications manager 1145 may coordinate scheduling for transmissions to UEs 115 for various interference mitigation techniques such as beamforming or joint transmission. In some examples, the inter-station communications manager 1145 may provide an X2 interface within an LTE/LTE-A wireless communications network technology to provide communication between base stations 105.

The communications manager 1120 may support wireless communications at a network entity in accordance with examples as disclosed herein. For example, the communications manager 1120 may be configured as or otherwise support a means for receiving, from an assistive node, a control message indicating that the assistive node is capable of operating in an amplifying mode and in a reflecting mode. The communications manager 1120 may be configured as or otherwise support a means for transmitting, to the assistive node, scheduling information for a packet transmission. The communications manager 1120 may be configured as or otherwise support a means for transmitting, to the assistive node, control signaling indicating which one of the reflecting mode or the amplifying mode is to be applied by the assistive node to reflect or amplify the packet transmission to a wireless device based on the control message. The communications manager 1120 may be configured as or otherwise support a means for transmitting, to the assistive node, the packet transmission based on the scheduling information.

By including or configuring the communications manager 1120 in accordance with examples as described herein, the device 1105 may support techniques for reduced latency, reduced power consumption, more efficient utilization of communication resources, and improved coordination between devices resources by signaling to an assistive node to operate in an amplifying mode or a reflecting mode based on conditions associated with a given packet transmission to be forwarded by the assistive node.

In some examples, the communications manager 1120 may be configured to perform various operations (e.g., receiving, monitoring, transmitting) using or otherwise in cooperation with the transceiver 1115, the one or more antennas 1125, or any combination thereof. Although the communications manager 1120 is illustrated as a separate component, in some examples, one or more functions described with reference to the communications manager 1120 may be supported by or performed by the processor 1140, the memory 1130, the code 1135, or any combination thereof. For example, the code 1135 may include instructions executable by the processor 1140 to cause the device 1105 to perform various aspects of methods for switching between repeater and IRS operations in an assistive device as described herein, or the processor 1140 and the memory 1130 may be otherwise configured to perform or support such operations.

Figure 12:
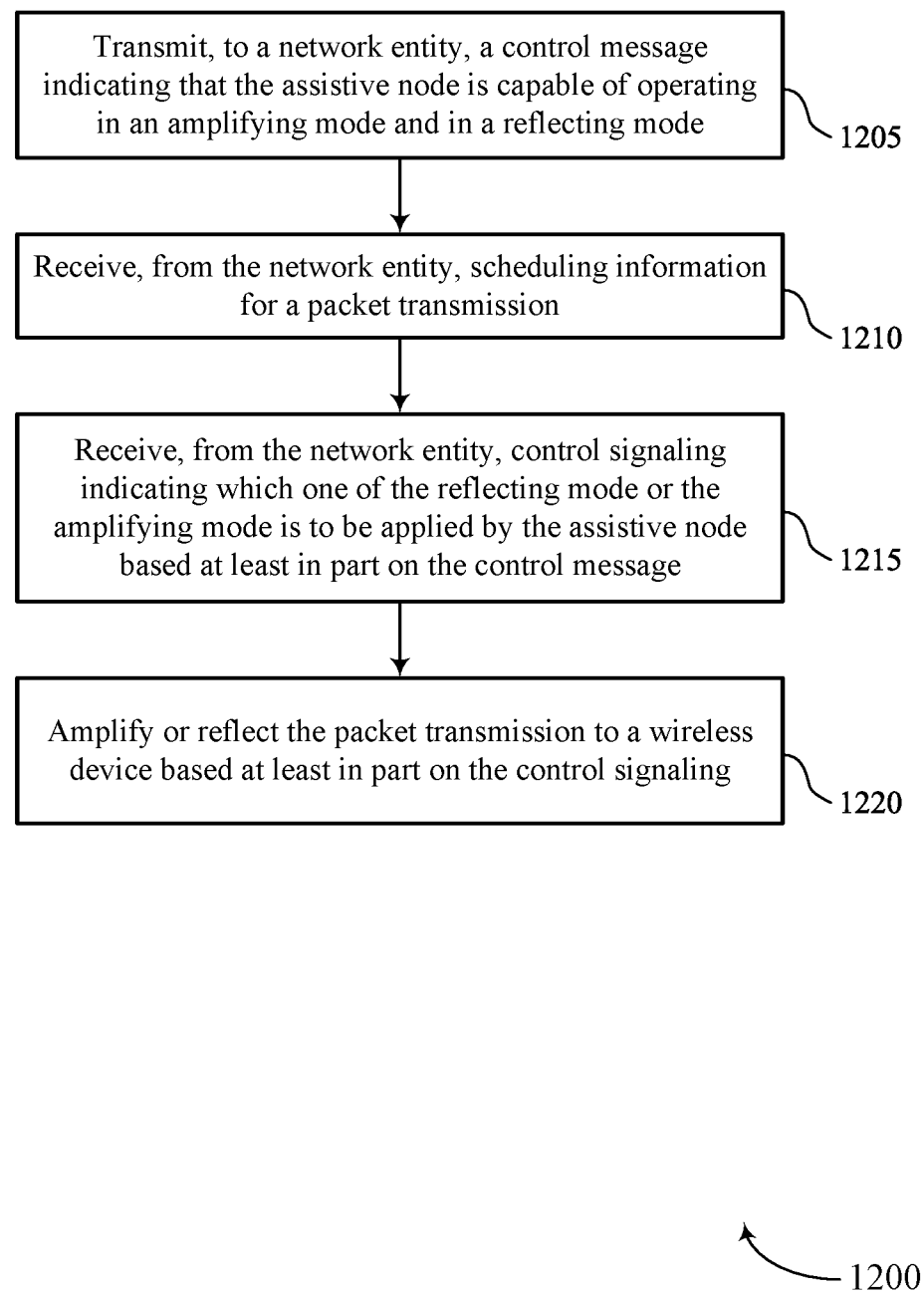
FIGS. 12 through 22 show flowcharts illustrating methods that support methods for switching between repeater and IRS operations in an assistive device in accordance with aspects of the present disclosure.

FIG. 12 shows a flowchart illustrating a method 1200 that supports methods for switching between repeater and IRS operations in an assistive device in accordance with aspects of the present disclosure. The operations of the method 1200 may be implemented by an assistive node or its components as described herein. For example, the operations of the method 1200 may be performed by an assistive node as described with reference to FIGS. 1 through 7. In some examples, an assistive node may execute a set of instructions to control the functional elements of the assistive node to perform the described functions. Additionally or alternatively, the assistive node may perform aspects of the described functions using special-purpose hardware.

At 1205, the method may include transmitting, to a network entity, a control message indicating that the assistive node is capable of operating in an amplifying mode and in a reflecting mode. The operations of 1205 may be performed in accordance with examples as disclosed herein. In some examples, aspects of the operations of 1205 may be performed by an Assistive Node Mode Manager 625 as described with reference to FIG. 6.

At 1210, the method may include receiving, from the network entity, scheduling information for a packet transmission. The operations of 1210 may be performed in accordance with examples as disclosed herein. In some examples, aspects of the operations of 1210 may be performed by a Scheduling Information Manager 630 as described with reference to FIG. 6.

At 1215, the method may include receiving, from the network entity, control signaling indicating which one of the reflecting mode or the amplifying mode is to be applied by the assistive node based on the control message. The operations of 1215 may be performed in accordance with examples as disclosed herein. In some examples, aspects of the operations of 1215 may be performed by an Assistive Node Mode Manager 625 as described with reference to FIG. 6.

At 1220, the method may include amplifying or reflecting the packet transmission to a wireless device based on the control signaling. The operations of 1220 may be performed in accordance with examples as disclosed herein. In some examples, aspects of the operations of 1220 may be performed by a Packet Forwarding Manager 635 as described with reference to FIG. 6.

Figure 13:
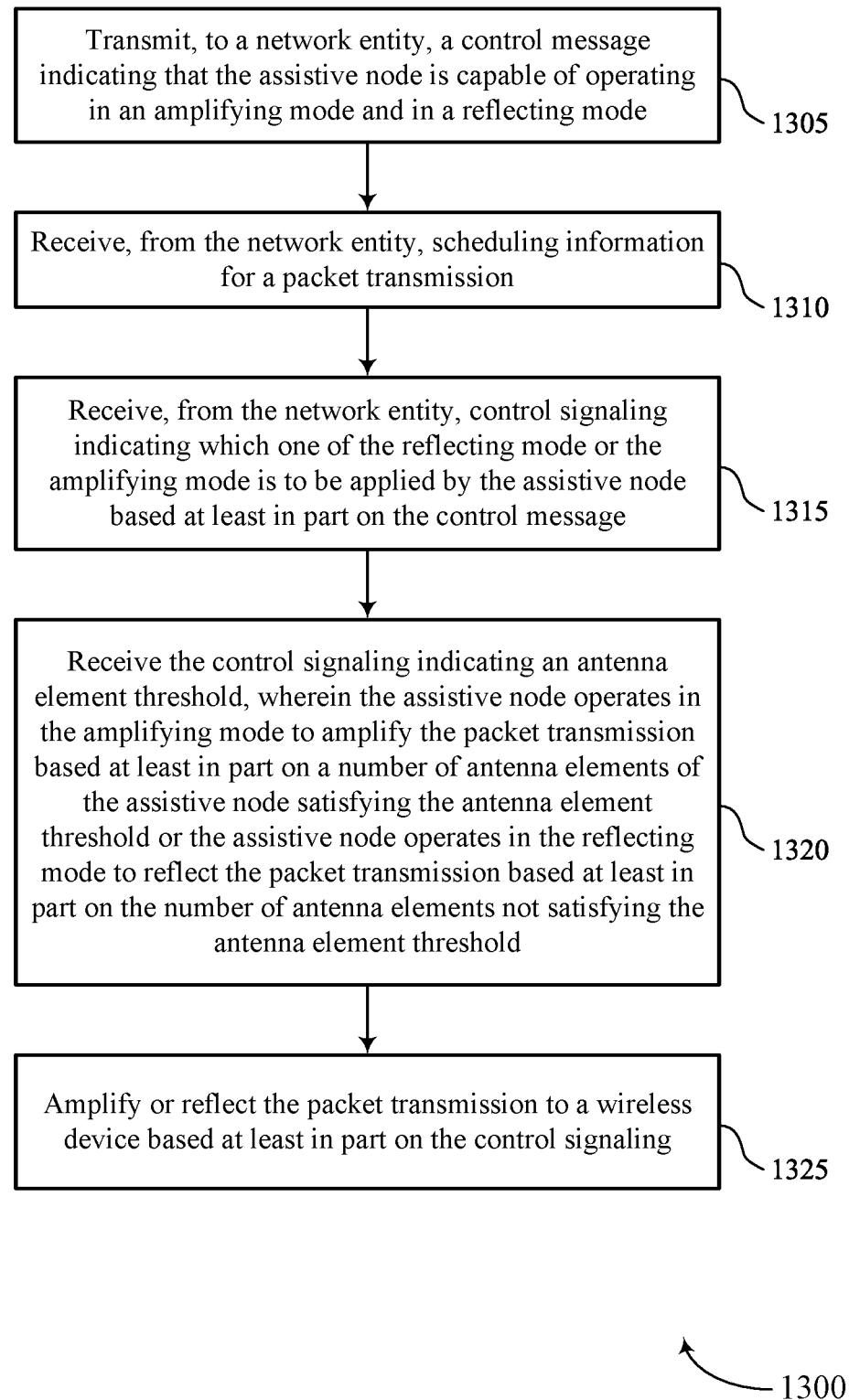

FIG. 13 shows a flowchart illustrating a method 1300 that supports methods for switching between repeater and IRS operations in an assistive device in accordance with aspects of the present disclosure. The operations of the method 1300 may be implemented by an assistive node or its components as described herein. For example, the operations of the method 1300 may be performed by an assistive node as described with reference to FIGS. 1 through 7. In some examples, an assistive node may execute a set of instructions to control the functional elements of the Assistive node to perform the described functions. Additionally or alternatively, the Assistive node may perform aspects of the described functions using special-purpose hardware.

At 1305, the method may include transmitting, to a network entity, a control message indicating that the assistive node is capable of operating in an amplifying mode and in a reflecting mode. The operations of 1305 may be performed in accordance with examples as disclosed herein. In some examples, aspects of the operations of 1305 may be performed by an Assistive Node Mode Manager 625 as described with reference to FIG. 6.

At 1310, the method may include receiving, from the network entity, scheduling information for a packet transmission. The operations of 1310 may be performed in accordance with examples as disclosed herein. In some examples, aspects of the operations of 1310 may be performed by a Scheduling Information Manager 630 as described with reference to FIG. 6.

At 1315, the method may include receiving, from the network entity, control signaling indicating which one of the reflecting mode or the amplifying mode is to be applied by the assistive node based on the control message. The operations of 1315 may be performed in accordance with examples as disclosed herein. In some examples, aspects of the operations of 1315 may be performed by an Assistive Node Mode Manager 625 as described with reference to FIG. 6.

At 1320, the method may include receiving the control signaling indicating an antenna element threshold, where the assistive node operates in the amplifying mode to amplify the packet transmission based on a number of antenna elements of the assistive node satisfying the antenna element threshold or the assistive node operates in the reflecting mode to reflect the packet transmission based on the number of antenna elements not satisfying the antenna element threshold. The operations of 1320 may be performed in accordance with examples as disclosed herein. In some examples, aspects of the operations of 1320 may be performed by an Assistive Node Mode Manager 625 as described with reference to FIG. 6.

At 1325, the method may include amplifying or reflecting the packet transmission to a wireless device based on the control signaling. The operations of 1325 may be performed in accordance with examples as disclosed herein. In some examples, aspects of the operations of 1325 may be performed by a Packet Forwarding Manager 635 as described with reference to FIG. 6.

Figure 14:
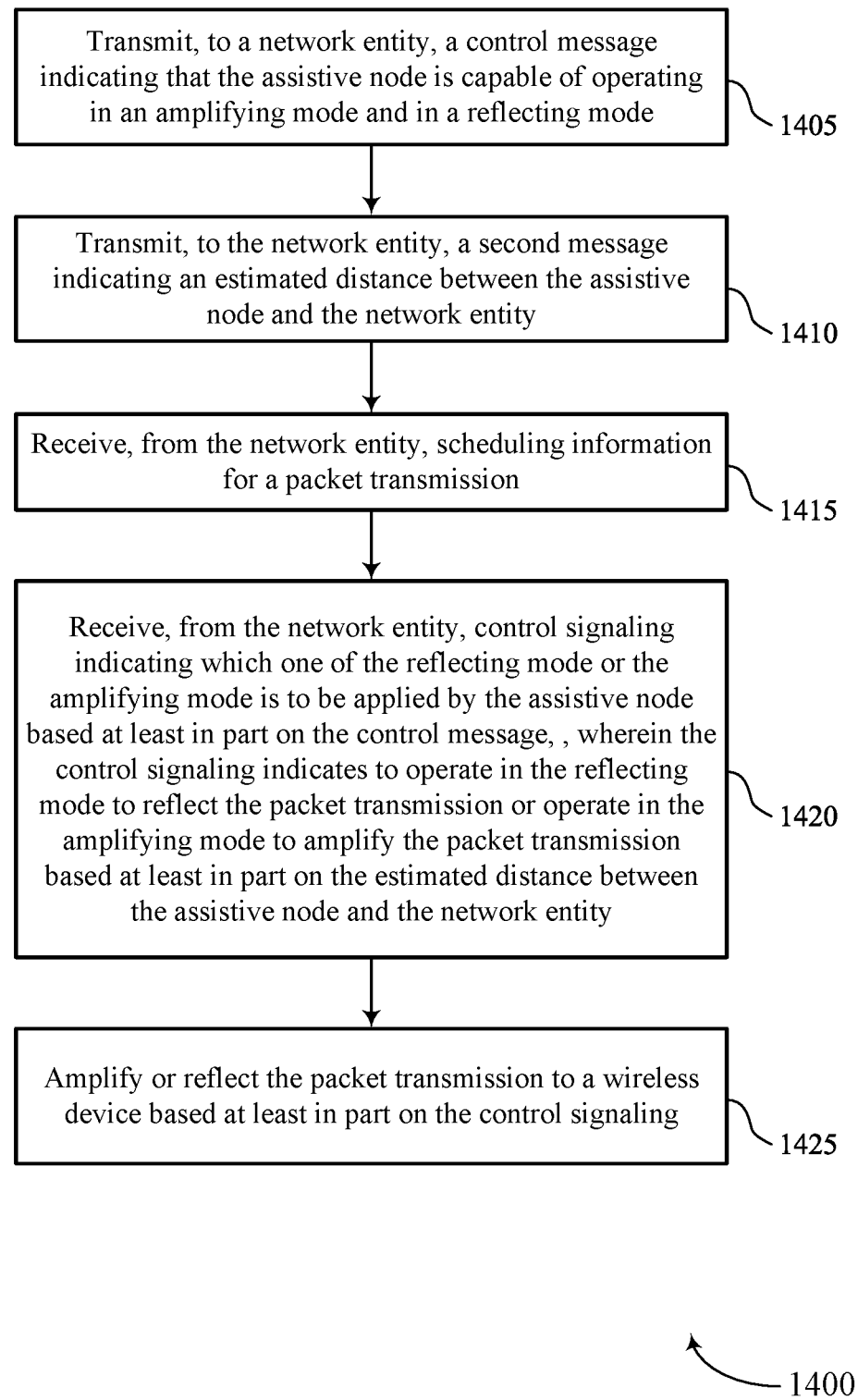

FIG. 14 shows a flowchart illustrating a method 1400 that supports methods for switching between repeater and IRS operations in an assistive device in accordance with aspects of the present disclosure. The operations of the method 1400 may be implemented by an assistive node or its components as described herein. For example, the operations of the method 1400 may be performed by an assistive node as described with reference to FIGS. 1 through 7. In some examples, an assistive node may execute a set of instructions to control the functional elements of the Assistive node to perform the described functions. Additionally or alternatively, the Assistive node may perform aspects of the described functions using special-purpose hardware.

At 1405, the method may include transmitting, to a network entity, a control message indicating that the assistive node is capable of operating in an amplifying mode and in a reflecting mode. The operations of 1405 may be performed in accordance with examples as disclosed herein. In some examples, aspects of the operations of 1405 may be performed by an Assistive Node Mode Manager 625 as described with reference to FIG. 6.

At 1410, the method may include transmitting, to the network entity, a second message indicating an estimated distance between the assistive node and the network entity. The operations of 1410 may be performed in accordance with examples as disclosed herein. In some examples, aspects of the operations of 1410 may be performed by a Location Manager 650 as described with reference to FIG. 6.

At 1415, the method may include receiving, from the network entity, scheduling information for a packet transmission. The operations of 1415 may be performed in accordance with examples as disclosed herein. In some examples, aspects of the operations of 1415 may be performed by a Scheduling Information Manager 630 as described with reference to FIG. 6.

At 1420, the method may include receiving, from the network entity, control signaling indicating which one of the reflecting mode or the amplifying mode is to be applied by the assistive node based on the control message, where the control signaling indicates to operate in the reflecting mode to reflect the packet transmission or operate in the amplifying mode to amplify the packet transmission based on the estimated distance between the assistive node and the network entity. The operations of 1420 may be performed in accordance with examples as disclosed herein. In some examples, aspects of the operations of 1420 may be performed by an Assistive Node Mode Manager 625 as described with reference to FIG. 6.

At 1425, the method may include amplifying or reflecting the packet transmission to a wireless device based on the control signaling. The operations of 1425 may be performed in accordance with examples as disclosed herein. In some examples, aspects of the operations of 1425 may be performed by a Packet Forwarding Manager 635 as described with reference to FIG. 6.

Figure 15:
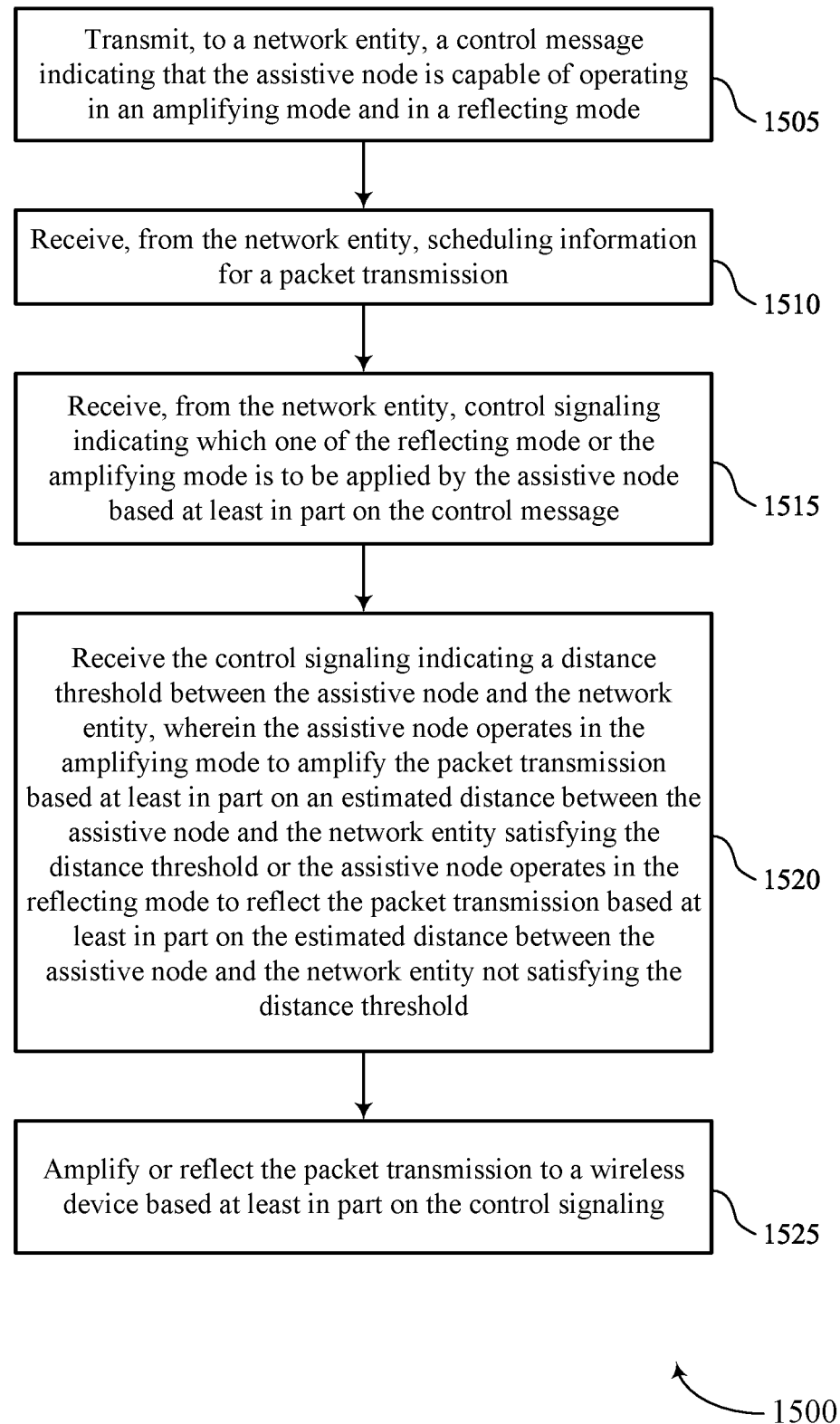

FIG. 15 shows a flowchart illustrating a method 1500 that supports methods for switching between repeater and IRS operations in an assistive device in accordance with aspects of the present disclosure. The operations of the method 1500 may be implemented by an assistive node or its components as described herein. For example, the operations of the method 1500 may be performed by an assistive node as described with reference to FIGS. 1 through 7. In some examples, an assistive node may execute a set of instructions to control the functional elements of the assistive node to perform the described functions. Additionally or alternatively, the assistive node may perform aspects of the described functions using special-purpose hardware.

At 1505, the method may include transmitting, to a network entity, a control message indicating that the assistive node is capable of operating in an amplifying mode and in a reflecting mode. The operations of 1505 may be performed in accordance with examples as disclosed herein. In some examples, aspects of the operations of 1505 may be performed by an Assistive Node Mode Manager 625 as described with reference to FIG. 6.

At 1510, the method may include receiving, from the network entity, scheduling information for a packet transmission. The operations of 1510 may be performed in accordance with examples as disclosed herein. In some examples, aspects of the operations of 1510 may be performed by a Scheduling Information Manager 630 as described with reference to FIG. 6.

At 1515, the method may include receiving, from the network entity, control signaling indicating which one of the reflecting mode or the amplifying mode is to be applied by the assistive node based on the control message. The operations of 1515 may be performed in accordance with examples as disclosed herein. In some examples, aspects of the operations of 1515 may be performed by an Assistive Node Mode Manager 625 as described with reference to FIG. 6.

At 1520, the method may include receiving the control signaling indicating a distance threshold between the assistive node and the network entity, where the assistive node operates in the amplifying mode to amplify the packet transmission based on an estimated distance between the assistive node and the network entity satisfying the distance threshold or the assistive node operates in the reflecting mode to reflect the packet transmission based on the estimated distance between the assistive node and the network entity not satisfying the distance threshold. The operations of 1520 may be performed in accordance with examples as disclosed herein. In some examples, aspects of the operations of 1520 may be performed by a Location Manager 650 as described with reference to FIG. 6.

At 1525, the method may include amplifying or reflecting the packet transmission to a wireless device based on the control signaling. The operations of 1525 may be performed in accordance with examples as disclosed herein. In some examples, aspects of the operations of 1525 may be performed by a Packet Forwarding Manager 635 as described with reference to FIG. 6.

Figure 16:
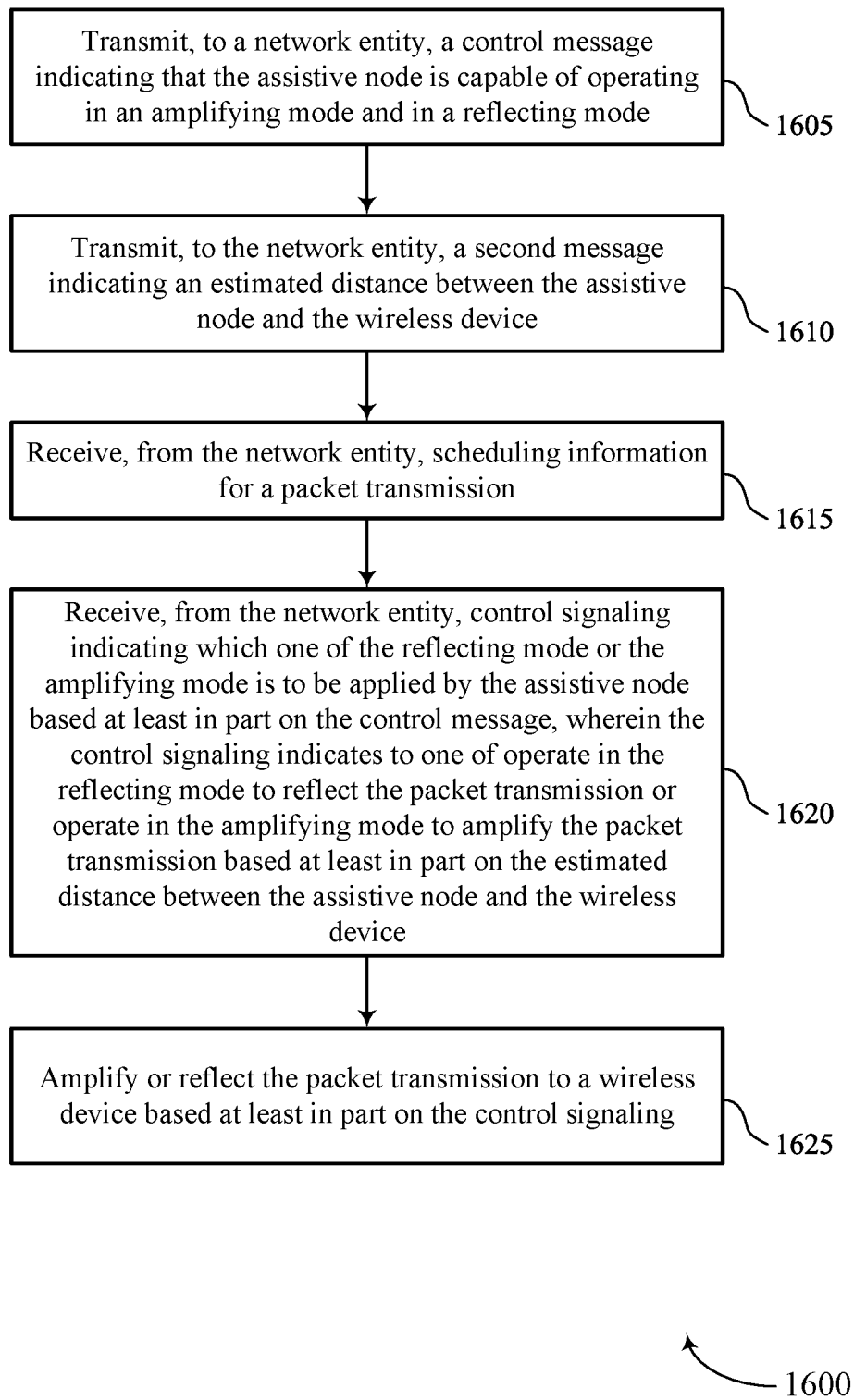

FIG. 16 shows a flowchart illustrating a method 1600 that supports methods for switching between repeater and IRS operations in an assistive device in accordance with aspects of the present disclosure. The operations of the method 1600 may be implemented by an assistive node or its components as described herein. For example, the operations of the method 1600 may be performed by an assistive node as described with reference to FIGS. 1 through 7. In some examples, an assistive node may execute a set of instructions to control the functional elements of the Assistive node to perform the described functions. Additionally or alternatively, the Assistive node may perform aspects of the described functions using special-purpose hardware.

At 1605, the method may include transmitting, to a network entity, a control message indicating that the assistive node is capable of operating in an amplifying mode and in a reflecting mode. The operations of 1605 may be performed in accordance with examples as disclosed herein. In some examples, aspects of the operations of 1605 may be performed by an Assistive Node Mode Manager 625 as described with reference to FIG. 6.

At 1610, the method may include transmitting, to the network entity, a second message indicating an estimated distance between the assistive node and the wireless device. The operations of 1610 may be performed in accordance with examples as disclosed herein. In some examples, aspects of the operations of 1610 may be performed by a Location Manager 650 as described with reference to FIG. 6.

At 1615, the method may include receiving, from the network entity, scheduling information for a packet transmission. The operations of 1615 may be performed in accordance with examples as disclosed herein. In some examples, aspects of the operations of 1615 may be performed by a Scheduling Information Manager 630 as described with reference to FIG. 6.

At 1620, the method may include receiving, from the network entity, control signaling indicating which one of the reflecting mode or the amplifying mode is to be applied by the assistive node based on the control message, where the control signaling indicates to one of operate in the reflecting mode to reflect the packet transmission or operate in the amplifying mode to amplify the packet transmission based on the estimated distance between the assistive node and the wireless device. The operations of 1620 may be performed in accordance with examples as disclosed herein. In some examples, aspects of the operations of 1620 may be performed by an Assistive Node Mode Manager 625 as described with reference to FIG. 6.

At 1625, the method may include amplifying or reflecting the packet transmission to a wireless device based on the control signaling. The operations of 1625 may be performed in accordance with examples as disclosed herein. In some examples, aspects of the operations of 1625 may be performed by a Packet Forwarding Manager 635 as described with reference to FIG. 6.

Figure 17:
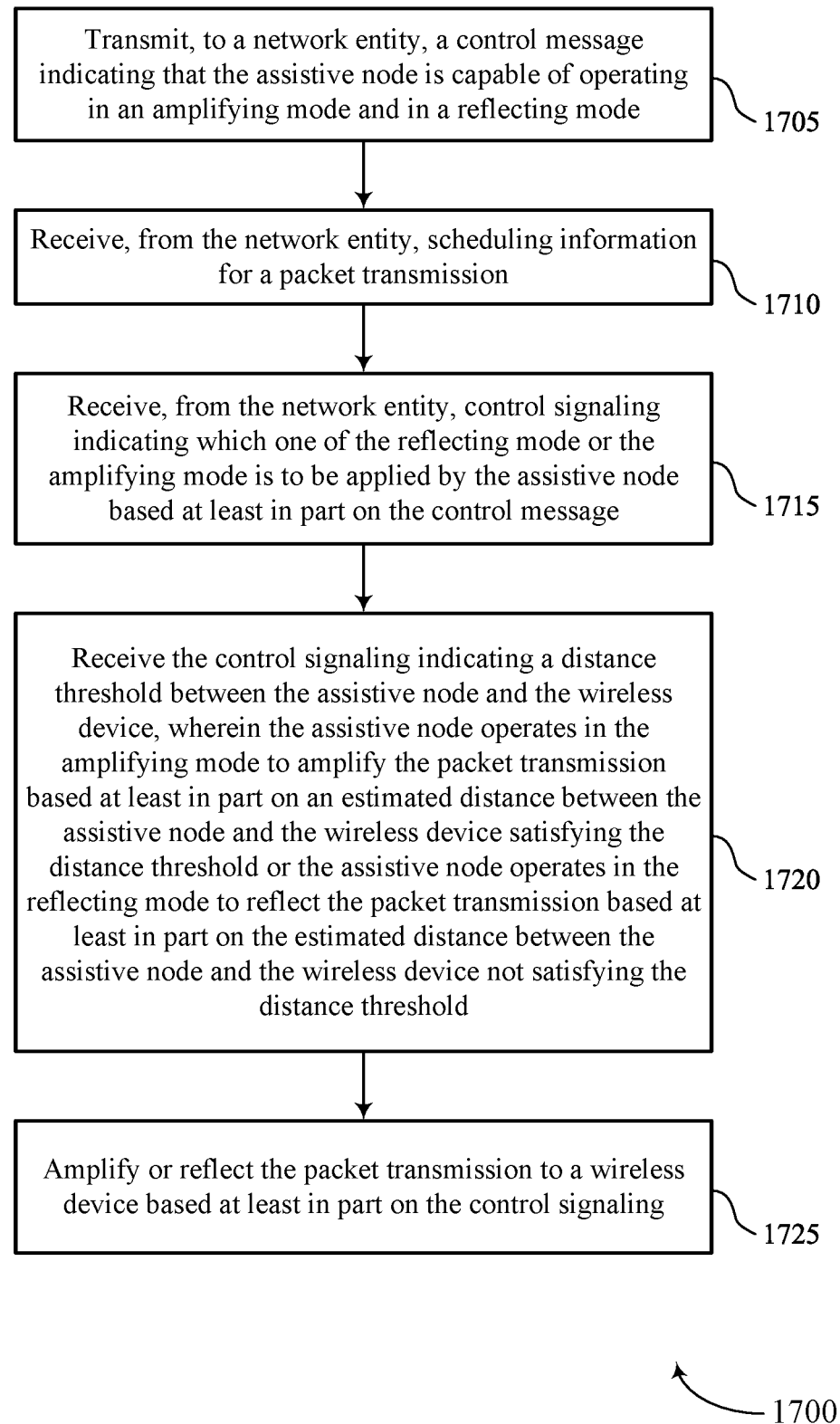

FIG. 17 shows a flowchart illustrating a method 1700 that supports methods for switching between repeater and IRS operations in an assistive device in accordance with aspects of the present disclosure. The operations of the method 1700 may be implemented by an assistive node or its components as described herein. For example, the operations of the method 1700 may be performed by an assistive node as described with reference to FIGS. 1 through 7. In some examples, an assistive node may execute a set of instructions to control the functional elements of the Assistive node to perform the described functions. Additionally or alternatively, the Assistive node may perform aspects of the described functions using special-purpose hardware.

At 1705, the method may include transmitting, to a network entity, a control message indicating that the assistive node is capable of operating in an amplifying mode and in a reflecting mode. The operations of 1705 may be performed in accordance with examples as disclosed herein. In some examples, aspects of the operations of 1705 may be performed by an Assistive Node Mode Manager 625 as described with reference to FIG. 6.

At 1710, the method may include receiving, from the network entity, scheduling information for a packet transmission. The operations of 1710 may be performed in accordance with examples as disclosed herein. In some examples, aspects of the operations of 1710 may be performed by a Scheduling Information Manager 630 as described with reference to FIG. 6.

At 1715, the method may include receiving, from the network entity, control signaling indicating which one of the reflecting mode or the amplifying mode is to be applied by the assistive node based on the control message. The operations of 1715 may be performed in accordance with examples as disclosed herein. In some examples, aspects of the operations of 1715 may be performed by an Assistive Node Mode Manager 625 as described with reference to FIG. 6.

At 1720, the method may include receiving the control signaling indicating a distance threshold between the assistive node and the wireless device, where the assistive node operates in the amplifying mode to amplify the packet transmission based on an estimated distance between the assistive node and the wireless device satisfying the distance threshold or the assistive node operates in the reflecting mode to reflect the packet transmission based on the estimated distance between the assistive node and the wireless device not satisfying the distance threshold. The operations of 1720 may be performed in accordance with examples as disclosed herein. In some examples, aspects of the operations of 1720 may be performed by a Location Manager 650 as described with reference to FIG. 6.

At 1725, the method may include amplifying or reflecting the packet transmission to a wireless device based on the control signaling. The operations of 1725 may be performed in accordance with examples as disclosed herein. In some examples, aspects of the operations of 1725 may be performed by a Packet Forwarding Manager 635 as described with reference to FIG. 6.

Figure 18:
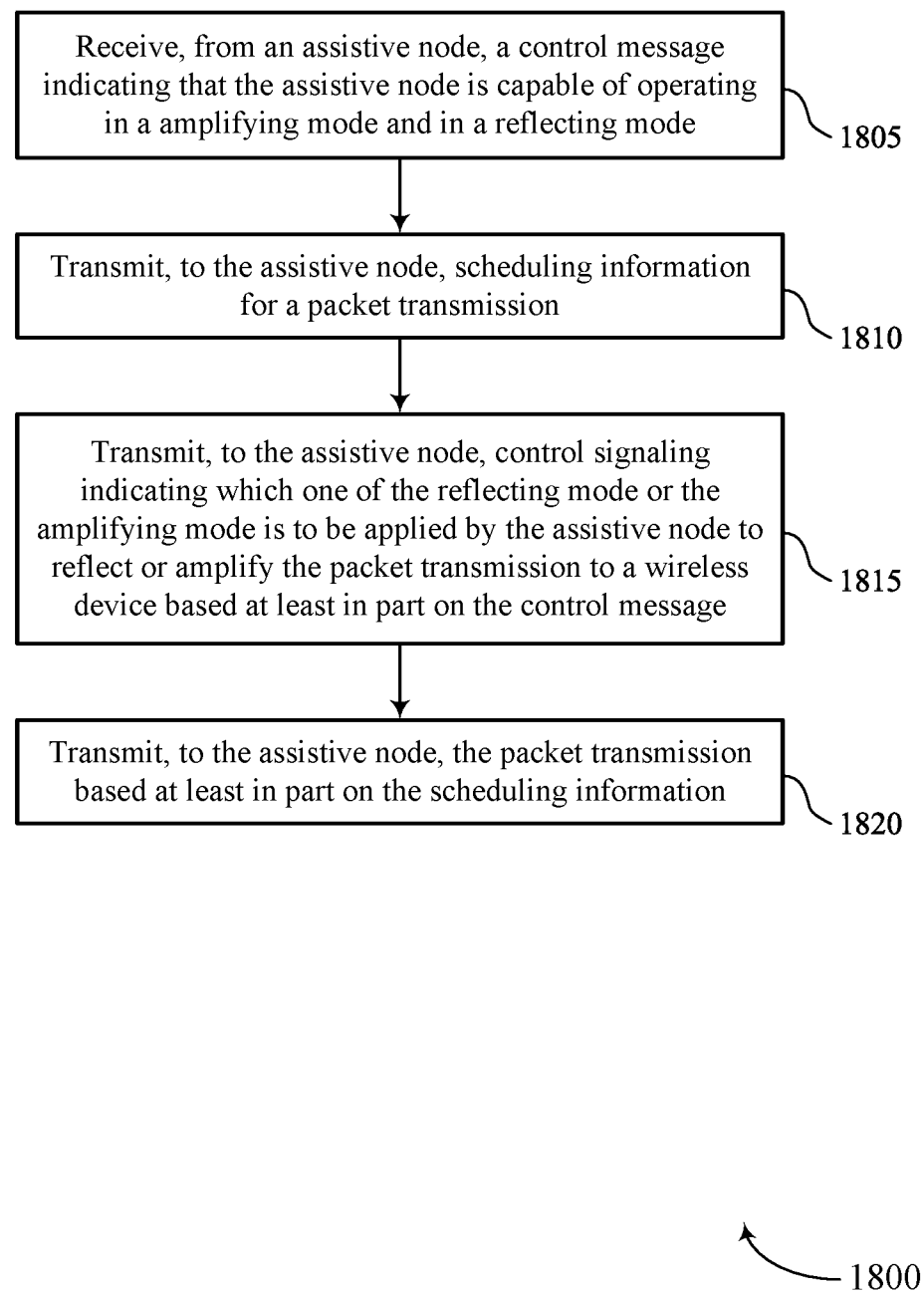

FIG. 18 shows a flowchart illustrating a method 1800 that supports methods for switching between repeater and IRS operations in an assistive device in accordance with aspects of the present disclosure. The operations of the method 1800 may be implemented by a base station or its components as described herein. For example, the operations of the method 1800 may be performed by a base station 105 as described with reference to FIGS. 1 through 3 and 8 through 11. In some examples, a base station may execute a set of instructions to control the functional elements of the base station to perform the described functions. Additionally or alternatively, the base station may perform aspects of the described functions using special-purpose hardware.

At 1805, the method may include receiving, from an assistive node, a control message indicating that the assistive node is capable of operating in an amplifying mode and in a reflecting mode. The operations of 1805 may be performed in accordance with examples as disclosed herein. In some examples, aspects of the operations of 1805 may be performed by an Assistive Node Mode Manager 1025 as described with reference to FIG. 10.

At 1810, the method may include transmitting, to the assistive node, scheduling information for a packet transmission. The operations of 1810 may be performed in accordance with examples as disclosed herein. In some examples, aspects of the operations of 1810 may be performed by a Scheduling Information Manager 1030 as described with reference to FIG. 10.

At 1815, the method may include transmitting, to the assistive node, control signaling indicating which one of the reflecting mode or the amplifying mode is to be applied by the assistive node to reflect or amplify the packet transmission to a wireless device based on the control message. The operations of 1815 may be performed in accordance with examples as disclosed herein. In some examples, aspects of the operations of 1815 may be performed by an Assistive Node Mode Manager 1025 as described with reference to FIG. 10.

At 1820, the method may include transmitting, to the assistive node, the packet transmission based on the scheduling information. The operations of 1820 may be performed in accordance with examples as disclosed herein. In some examples, aspects of the operations of 1820 may be performed by a Packet Manager 1035 as described with reference to FIG. 10.

Figure 19:
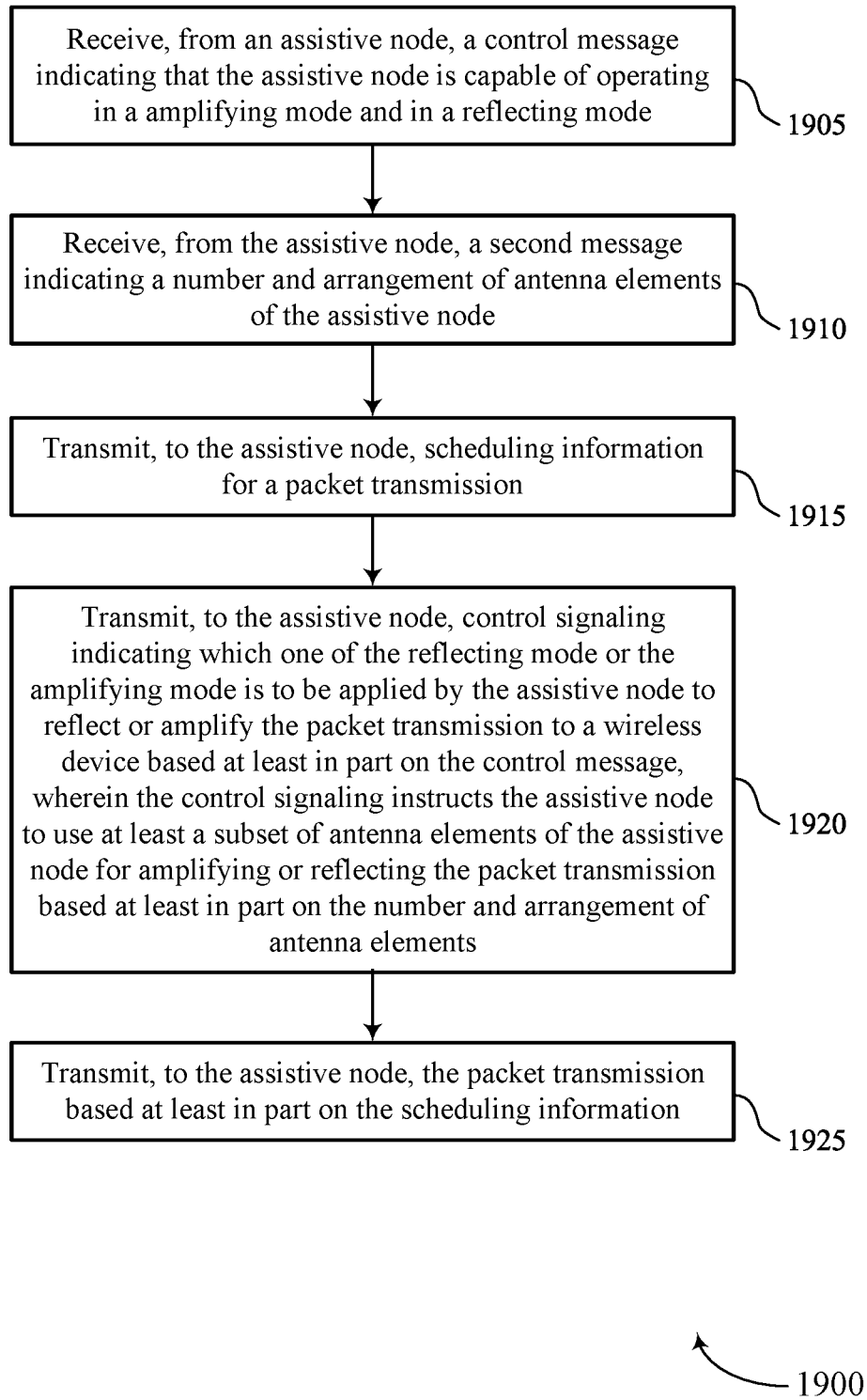

FIG. 19 shows a flowchart illustrating a method 1900 that supports methods for switching between repeater and IRS operations in an assistive device in accordance with aspects of the present disclosure. The operations of the method 1900 may be implemented by a base station or its components as described herein. For example, the operations of the method 1900 may be performed by a base station 105 as described with reference to FIGS. 1 through 3 and 8 through 11. In some examples, a base station may execute a set of instructions to control the functional elements of the base station to perform the described functions. Additionally or alternatively, the base station may perform aspects of the described functions using special-purpose hardware.

At 1905, the method may include receiving, from an assistive node, a control message indicating that the assistive node is capable of operating in an amplifying mode and in a reflecting mode. The operations of 1905 may be performed in accordance with examples as disclosed herein. In some examples, aspects of the operations of 1905 may be performed by an Assistive Node Mode Manager 1025 as described with reference to FIG. 10.

At 1910, the method may include receiving, from the assistive node, a second message indicating a number and arrangement of antenna elements of the assistive node. The operations of 1910 may be performed in accordance with examples as disclosed herein. In some examples, aspects of the operations of 1910 may be performed by an Antenna Configuration Manager 1040 as described with reference to FIG. 10.

At 1915, the method may include transmitting, to the assistive node, scheduling information for a packet transmission. The operations of 1915 may be performed in accordance with examples as disclosed herein. In some examples, aspects of the operations of 1915 may be performed by a Scheduling Information Manager 1030 as described with reference to FIG. 10.

At 1920, the method may include transmitting, to the assistive node, control signaling indicating which one of the reflecting mode or the amplifying mode is to be applied by the assistive node to reflect or amplify the packet transmission to a wireless device based on the control message, where the control signaling instructs the assistive node to use at least a subset of antenna elements of the assistive node for amplifying or reflecting the packet transmission based on the number and arrangement of antenna elements. The operations of 1920 may be performed in accordance with examples as disclosed herein. In some examples, aspects of the operations of 1920 may be performed by an Assistive Node Mode Manager 1025 as described with reference to FIG. 10.

At 1925, the method may include transmitting, to the assistive node, the packet transmission based on the scheduling information. The operations of 1925 may be performed in accordance with examples as disclosed herein. In some examples, aspects of the operations of 1925 may be performed by a Packet Manager 1035 as described with reference to FIG. 10.

Figure 20:
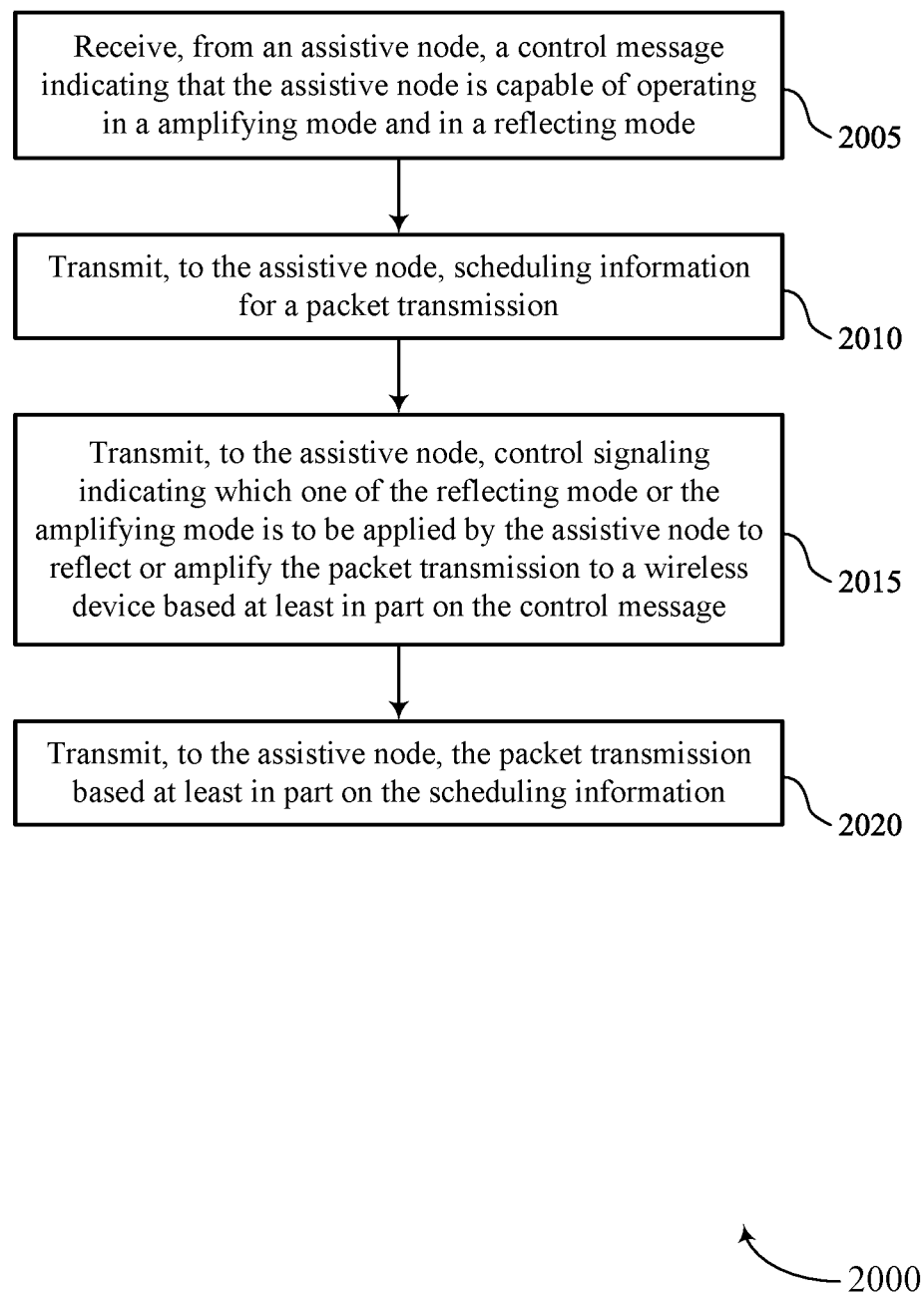

FIG. 20 shows a flowchart illustrating a method 2000 that supports methods for switching between repeater and IRS operations in an assistive device in accordance with aspects of the present disclosure. The operations of the method 2000 may be implemented by a base station or its components as described herein. For example, the operations of the method 2000 may be performed by a base station 105 as described with reference to FIGS. 1 through 3 and 8 through 11. In some examples, a base station may execute a set of instructions to control the functional elements of the base station to perform the described functions. Additionally or alternatively, the base station may perform aspects of the described functions using special-purpose hardware.

At 2005, the method may include receiving, from an assistive node, a control message indicating that the assistive node is capable of operating in an amplifying mode and in a reflecting mode. The operations of 2005 may be performed in accordance with examples as disclosed herein. In some examples, aspects of the operations of 2005 may be performed by an Assistive Node Mode Manager 1025 as described with reference to FIG. 10.

At 2010, the method may include transmitting, to the assistive node, scheduling information for a packet transmission. The operations of 2010 may be performed in accordance with examples as disclosed herein. In some examples, aspects of the operations of 2010 may be performed by a Scheduling Information Manager 1030 as described with reference to FIG. 10.

At 2015, the method may include transmitting, to the assistive node, control signaling indicating which one of the reflecting mode or the amplifying mode is to be applied by the assistive node to reflect or amplify the packet transmission to a wireless device based on the control message. The operations of 2015 may be performed in accordance with examples as disclosed herein. In some examples, aspects of the operations of 2015 may be performed by an Assistive Node Mode Manager 1025 as described with reference to FIG. 10.

At 2020, the method may include transmitting, to the assistive node, the packet transmission based on the scheduling information. The operations of 2020 may be performed in accordance with examples as disclosed herein. In some examples, aspects of the operations of 2020 may be performed by a Packet Manager 1035 as described with reference to FIG. 10.

Figure 21:
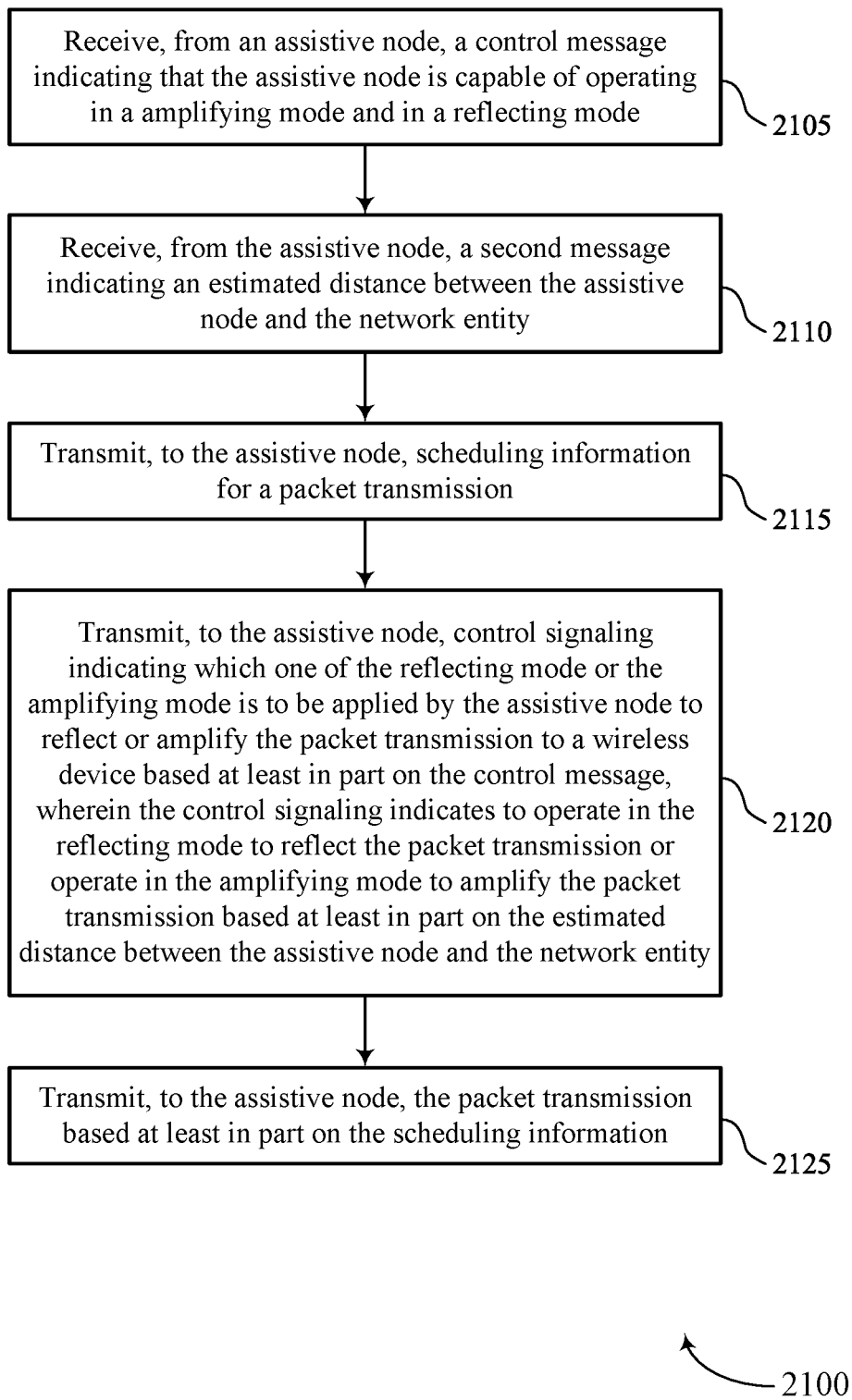

FIG. 21 shows a flowchart illustrating a method 2100 that supports methods for switching between repeater and IRS operations in an assistive device in accordance with aspects of the present disclosure. The operations of the method 2100 may be implemented by a base station or its components as described herein. For example, the operations of the method 2100 may be performed by a base station 105 as described with reference to FIGS. 1 through 3 and 8 through 11. In some examples, a base station may execute a set of instructions to control the functional elements of the base station to perform the described functions. Additionally or alternatively, the base station may perform aspects of the described functions using special-purpose hardware.

At 2105, the method may include receiving, from an assistive node, a control message indicating that the assistive node is capable of operating in an amplifying mode and in a reflecting mode. The operations of 2105 may be performed in accordance with examples as disclosed herein. In some examples, aspects of the operations of 2105 may be performed by an Assistive Node Mode Manager 1025 as described with reference to FIG. 10.

At 2110, the method may include receiving, from the assistive node, a second message indicating an estimated distance between the assistive node and the network entity. The operations of 2110 may be performed in accordance with examples as disclosed herein. In some examples, aspects of the operations of 2110 may be performed by a Location Manager 1050 as described with reference to FIG. 10.

At 2115, the method may include transmitting, to the assistive node, scheduling information for a packet transmission. The operations of 2115 may be performed in accordance with examples as disclosed herein. In some examples, aspects of the operations of 2115 may be performed by a Scheduling Information Manager 1030 as described with reference to FIG. 10.

At 2120, the method may include transmitting, to the assistive node, control signaling indicating which one of the reflecting mode or the amplifying mode is to be applied by the assistive node to reflect or amplify the packet transmission to a wireless device based on the control message, where the control signaling indicates to operate in the reflecting mode to reflect the packet transmission or operate in the amplifying mode to amplify the packet transmission based on the estimated distance between the assistive node and the network entity. The operations of 2120 may be performed in accordance with examples as disclosed herein. In some examples, aspects of the operations of 2120 may be performed by an Assistive Node Mode Manager 1025 as described with reference to FIG. 10.

At 2125, the method may include transmitting, to the assistive node, the packet transmission based on the scheduling information. The operations of 2125 may be performed in accordance with examples as disclosed herein. In some examples, aspects of the operations of 2125 may be performed by a Packet Manager 1035 as described with reference to FIG. 10.

Figure 22:
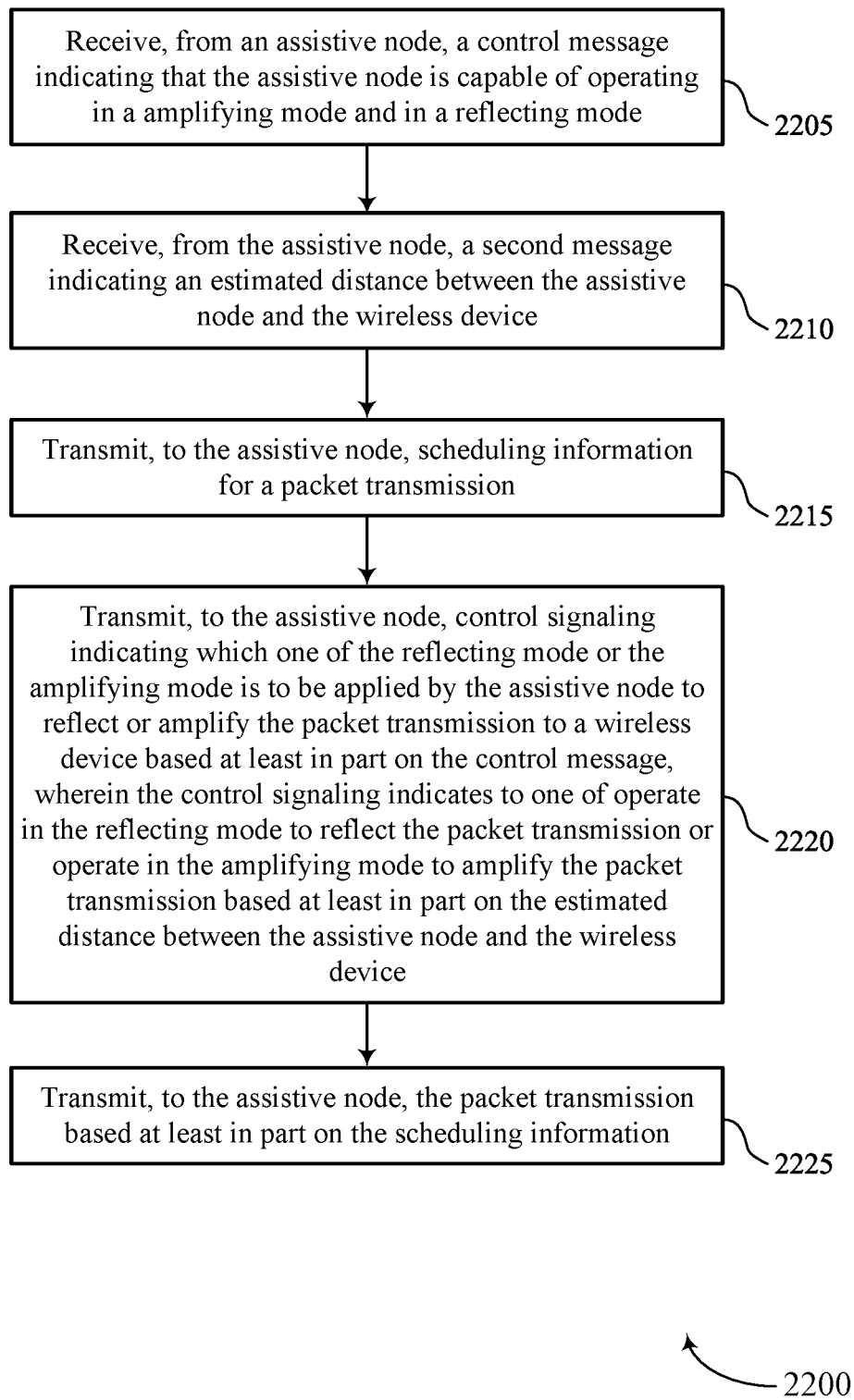

FIG. 22 shows a flowchart illustrating a method 2200 that supports methods for switching between repeater and IRS operations in an assistive device in accordance with aspects of the present disclosure. The operations of the method 2200 may be implemented by a base station or its components as described herein. For example, the operations of the method 2200 may be performed by a base station 105 as described with reference to FIGS. 1 through 3 and 8 through 11. In some examples, a base station may execute a set of instructions to control the functional elements of the base station to perform the described functions. Additionally or alternatively, the base station may perform aspects of the described functions using special-purpose hardware.

At 2205, the method may include receiving, from an assistive node, a control message indicating that the assistive node is capable of operating in an amplifying mode and in a reflecting mode. The operations of 2205 may be performed in accordance with examples as disclosed herein. In some examples, aspects of the operations of 2205 may be performed by an Assistive Node Mode Manager 1025 as described with reference to FIG. 10.

At 2210, the method may include receiving, from the assistive node, a second message indicating an estimated distance between the assistive node and the wireless device. The operations of 2210 may be performed in accordance with examples as disclosed herein. In some examples, aspects of the operations of 2210 may be performed by a Location Manager 1050 as described with reference to FIG. 10.

At 2215, the method may include transmitting, to the assistive node, scheduling information for a packet transmission. The operations of 2215 may be performed in accordance with examples as disclosed herein. In some examples, aspects of the operations of 2215 may be performed by a Scheduling Information Manager 1030 as described with reference to FIG. 10.

At 2220, the method may include transmitting, to the assistive node, control signaling indicating which one of the reflecting mode or the amplifying mode is to be applied by the assistive node to reflect or amplify the packet transmission to a wireless device based on the control message, where the control signaling indicates to one of operate in the reflecting mode to reflect the packet transmission or operate in the amplifying mode to amplify the packet transmission based on the estimated distance between the assistive node and the wireless device. The operations of 2220 may be performed in accordance with examples as disclosed herein. In some examples, aspects of the operations of 2220 may be performed by an Assistive Node Mode Manager 1025 as described with reference to FIG. 10.

At 2225, the method may include transmitting, to the assistive node, the packet transmission based on the scheduling information. The operations of 2225 may be performed in accordance with examples as disclosed herein. In some examples, aspects of the operations of 2225 may be performed by a Packet Manager 1035 as described with reference to FIG. 10.

The following provides an overview of aspects of the present disclosure:

Aspect 1: A method for wireless communications at an assistive node, comprising: transmitting, to a network entity, a control message indicating that the assistive node is capable of operating in an amplifying mode and in a reflecting mode; receiving, from the network entity, scheduling information for a packet transmission; receiving, from the network entity, control signaling indicating which one of the reflecting mode or the amplifying mode is to be applied by the assistive node based at least in part on the control message; and amplifying or reflecting the packet transmission to a wireless device based at least in part on the control signaling.

Aspect 2: The method of aspect 1, further comprising: transmitting, to the network entity, a second message indicating a number and arrangement of antenna elements of the assistive node, wherein the control signaling instructs the assistive node to use at least a subset of antenna elements of the assistive node for amplifying or reflecting the packet transmission based at least in part on the number and arrangement of antenna elements.

Aspect 3: The method of any of aspects 1 through 2, further comprising: receiving the control signaling indicating an antenna element threshold, wherein the assistive node operates in the amplifying mode to amplify the packet transmission based at least in part on a number of antenna elements of the assistive node satisfying the antenna element threshold or the assistive node operates in the reflecting mode to reflect the packet transmission based at least in part on the number of antenna elements not satisfying the antenna element threshold.

Aspect 4: The method of any of aspects 1 through 3, further comprising: receiving the control signaling indicating a first beam of a first codebook that is associated with the assistive node operating in the amplifying mode, wherein the packet transmission is amplified by the assistive node using the first beam.

Aspect 5: The method of any of aspects 1 through 4, further comprising: transmitting, to the network entity, a second message indicating an estimated distance between the assistive node and the network entity, wherein the control signaling indicates to operate in the reflecting mode to reflect the packet transmission or operate in the amplifying mode to amplify the packet transmission based at least in part on the estimated distance between the assistive node and the network entity.

Aspect 6: The method of any of aspects 1 through 5, further comprising: receiving the control signaling indicating a distance threshold between the assistive node and the network entity, wherein the assistive node operates in the amplifying mode to amplify the packet transmission based at least in part on an estimated distance between the assistive node and the network entity satisfying the distance threshold or the assistive node operates in the reflecting mode to reflect the packet transmission based at least in part on the estimated distance between the assistive node and the network entity not satisfying the distance threshold.

Aspect 7: The method of any of aspects 1 through 6, further comprising: transmitting, to the network entity, a second message indicating an estimated distance between the assistive node and the wireless device, wherein the control signaling indicates to one of operate in the reflecting mode to reflect the packet transmission or operate in the amplifying mode to amplify the packet transmission based at least in part on the estimated distance between the assistive node and the wireless device.

Aspect 8: The method of any of aspects 1 through 7, further comprising: receiving the control signaling indicating a distance threshold between the assistive node and the wireless device, wherein the assistive node operates in the amplifying mode to amplify the packet transmission based at least in part on an estimated distance between the assistive node and the wireless device satisfying the distance threshold or the assistive node operates in the reflecting mode to reflect the packet transmission based at least in part on the estimated distance between the assistive node and the wireless device not satisfying the distance threshold.

Aspect 9: The method of any of aspects 1 through 8, further comprising: receiving the control signaling indicating which one of the reflecting mode or the amplifying mode is to be applied to the packet transmission based at least in part on a message type of the packet transmission, a latency target associated with the packet transmission, a size of an analog beamforming codebook associated with the assistive node, beamwidths associated with beams in the analog beamforming codebook, a number and arrangement of antenna elements of the assistive node, a first threshold distance between the assistive node and the wireless device, a second threshold distance between the assistive node and the network entity, or a combination thereof.

Aspect 10: The method of any of aspects 1 through 9, wherein the packet transmission is one of reflected via a reflective surface of the assistive node or amplified via one of a relay or a repeater of the assistive node.

Aspect 11: The method of any of aspects 1 through 10, further comprising: receiving, from the network entity, a second message comprising the scheduling information and the control signaling.

Aspect 12: The method of any of aspects 1 through 11, further comprising: selecting at least a subset of antenna elements of the assistive node and a size of an analog beamforming codebook for amplifying or reflecting the packet transmission based at least in part on the control signaling indicating which one of the reflecting mode or the amplifying mode is to be applied by the assistive node.

Aspect 13: A method for wireless communications at a network entity, comprising: receiving, from an assistive node, a control message indicating that the assistive node is capable of operating in an amplifying mode and in a reflecting mode; transmitting, to the assistive node, scheduling information for a packet transmission; transmitting, to the assistive node, control signaling indicating which one of the reflecting mode or the amplifying mode is to be applied by the assistive node to reflect or amplify the packet transmission to a wireless device based at least in part on the control message; and transmitting, to the assistive node, the packet transmission based at least in part on the scheduling information.

Aspect 14: The method of aspect 13, further comprising: receiving, from the assistive node, a second message indicating a number and arrangement of antenna elements of the assistive node, wherein the control signaling instructs the assistive node to use at least a subset of antenna elements of the assistive node for amplifying or reflecting the packet transmission based at least in part on the number and arrangement of antenna elements.

Aspect 15: The method of any of aspects 13 through 14, further comprising: transmitting the control signaling indicating an antenna element threshold, wherein the assistive node operates in the amplifying mode to amplify the packet transmission based at least in part on a number of antenna elements of the assistive node satisfying the antenna element threshold or the assistive node operates in the reflecting mode to reflect the packet transmission based at least in part on the number of antenna elements not satisfying the antenna element threshold.

Aspect 16: The method of any of aspects 13 through 15, further comprising: transmitting the control signaling indicating a first beam of a first codebook that is associated with the assistive node operating in the amplifying mode, wherein the packet transmission is amplified by the assistive node using the first beam.

Aspect 17: The method of any of aspects 13 through 16, further comprising: receiving, from the assistive node, a second message indicating an estimated distance between the assistive node and the network entity, wherein the control signaling indicates to operate in the reflecting mode to reflect the packet transmission or operate in the amplifying mode to amplify the packet transmission based at least in part on the estimated distance between the assistive node and the network entity.

Aspect 18: The method of any of aspects 13 through 17, further comprising: transmitting the control signaling indicating a distance threshold between the assistive node and the network entity, wherein the assistive node operates in the amplifying mode to amplify the packet transmission based at least in part on an estimated distance between the assistive node and the network entity satisfying the distance threshold or the assistive node operates in the reflecting mode to reflect the packet transmission based at least in part on the estimated distance between the assistive node and the network entity not satisfying the distance threshold.

Aspect 19: The method of any of aspects 13 through 18, further comprising: receiving, from the assistive node, a second message indicating an estimated distance between the assistive node and the wireless device, wherein the control signaling indicates to one of operate in the reflecting mode to reflect the packet transmission or operate in the amplifying mode to amplify the packet transmission based at least in part on the estimated distance between the assistive node and the wireless device.

Aspect 20: The method of any of aspects 13 through 19, further comprising: transmitting the control signaling indicating a distance threshold between the assistive node and the wireless device, wherein the assistive node operates in the amplifying mode to amplify the packet transmission based at least in part on an estimated distance between the assistive node and the wireless device satisfying the distance threshold or the assistive node operates in the reflecting mode to reflect the packet transmission based at least in part on the estimated distance between the assistive node and the wireless device not satisfying the distance threshold.

Aspect 21: The method of any of aspects 13 through 20, further comprising: transmitting the control signaling indicating which one of the reflecting mode or the amplifying mode is to be applied based at least in part on a message type of the packet transmission, a latency target associated with the packet transmission, a size of an analog beamforming codebook associated with the assistive node, beamwidths associated with beams in the analog beamforming codebook, a number and arrangement of antenna elements of the assistive node, a first threshold distance between the assistive node and the wireless device, a second threshold distance between the assistive node and the network entity, or a combination thereof.

Aspect 22: The method of any of aspects 13 through 21, further comprising: transmitting, to the assistive node, a second message comprising the scheduling information and the control signaling.

Aspect 23: An apparatus for wireless communications at an assistive node, comprising a processor; memory coupled with the processor; and instructions stored in the memory and executable by the processor to cause the apparatus to perform a method of any of aspects 1 through 12.

Aspect 24: An apparatus for wireless communications at an assistive node, comprising at least one means for performing a method of any of aspects 1 through 12.

Aspect 25: A non-transitory computer-readable medium storing code for wireless communications at an assistive node, the code comprising instructions executable by a processor to perform a method of any of aspects 1 through 12.

Aspect 26: An apparatus for wireless communications at a network entity, comprising a processor; memory coupled with the processor; and instructions stored in the memory and executable by the processor to cause the apparatus to perform a method of any of aspects 13 through 22.

Aspect 27: An apparatus for wireless communications at a network entity, comprising at least one means for performing a method of any of aspects 13 through 22.

Aspect 28: A non-transitory computer-readable medium storing code for wireless communications at a network entity, the code comprising instructions executable by a processor to perform a method of any of aspects 13 through 22.

It should be noted that the methods described herein describe possible implementations, and that the operations and the steps may be rearranged or otherwise modified and that other implementations are possible. Further, aspects from two or more of the methods may be combined.

Although aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR networks. For example, the described techniques may be applicable to various other wireless communications systems such as Ultra Mobile Broadband (UMB), Institute of Electrical and Electronics Engineers (IEEE) 802.11 (Wi-Fi), IEEE 802.16 (WiMAX), IEEE 802.20, Flash-OFDM, as well as other systems and radio technologies not explicitly mentioned herein.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof.

The various illustrative blocks and components described in connection with the disclosure herein may be implemented or performed with a general-purpose processor, a DSP, an ASIC, a CPU, an FPGA or other programmable logic device, discrete gate or transistor logic, discrete hardware components, or any combination thereof designed to perform the functions described herein. A general-purpose processor may be a microprocessor, but in the alternative, the processor may be any processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope and spirit of the disclosure and appended claims. For example, due to the nature of software, functions described above can be implemented using software executed by a processor, hardware, firmware, hardwiring, or combinations of any of these. Features implementing functions may also be physically located at various positions, including being distributed such that portions of functions are implemented at different physical locations. As used herein, including in the claims, the term "and/or," when used in a list of two or more items, means that any one of the listed items can be employed by itself, or any combination of two or more of the listed items can be employed. For example, if a composition is described as containing components A, B, and/or C, the composition can contain A alone; B alone; C alone; A and B in combination; A and C in combination; B and C in combination; or A, B, and C in combination. Also, as used herein, including in the claims, "or" as used in a list of items (for example, a list of items prefaced by a phrase such as "at least one of" or "one or more of") indicates a disjunctive list such that, for example, a list of "at least one of A, B, or C" means A or B or C or AB or AC or BC or ABC (i.e., A and B and C).

Computer-readable media includes both non-transitory computer storage media and communication media including any medium that facilitates transfer of a computer program from one place to another. A non-transitory storage medium may be any available medium that may be accessed by a general-purpose or special-purpose computer. By way of example, and not limitation, non-transitory computer-readable media may include RAM, ROM, electrically erasable programmable ROM (EEPROM), flash memory, compact disk (CD) ROM or other optical disk storage, magnetic disk storage or other magnetic storage devices, or any other non-transitory medium that may be used to carry or store desired program code means in the form of instructions or data structures and that may be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of computer-readable medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an example step that is described as "based on condition A" may be based on both a condition A and a condition B without departing from the scope of the present disclosure. In other words, as used herein, the phrase "based on" shall be construed in the same manner as the phrase "based at least in part on."

The term "determine" or "determining" encompasses a wide variety of actions and, therefore, "determining" can include calculating, computing, processing, deriving, investigating, looking up (such as via looking up in a table, a database or another data structure), ascertaining and the like. Also, "determining" can include receiving (such as receiving information), accessing (such as accessing data in a memory) and the like. Also, "determining" can include resolving, selecting, choosing, establishing and other such similar actions.

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "example" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, known structures and devices are shown in diagram form in order to avoid obscuring the concepts of the described examples.

The description herein is provided to enable a person having ordinary skill in the art to make or use the disclosure. Various modifications to the disclosure will be apparent to a person having ordinary skill in the art, and the generic principles defined herein may be applied to other variations without departing from the scope of the disclosure. Thus, the disclosure is not limited to the examples and designs described herein but is to be accorded the broadest scope consistent with the principles and novel features disclosed herein.

What is claimed is:

1. An assistive node comprising:
memory; and
at least one processor coupled to the memory, wherein the at least one processor is configured to:
transmit, to a network entity, a control message indicating that the assistive node is capable of operating in an amplifying mode and in a reflecting mode;
receive, from the network entity, scheduling information for a packet transmission;
receive, from the network entity, control signaling indicating which one of the reflecting mode or the amplifying mode is to be applied by the assistive node based at least in part on the control message; and
amplify or reflect the packet transmission to a wireless device based at least in part on the control signaling.

2. The assistive node of claim 1, wherein the at least one processor is further configured to:
transmit, to the network entity, a second message indicating a number and arrangement of antenna elements of the assistive node, wherein the control signaling instructs the assistive node to use at least a subset of antenna elements of the assistive node for amplifying or reflecting the packet transmission based at least in part on the number and arrangement of antenna elements.

3. The assistive node of claim 1, wherein the at least one processor is further configured to:
receive the control signaling indicating an antenna element threshold, wherein the assistive node operates in the amplifying mode to amplify the packet transmission based at least in part on a number of antenna elements of the assistive node being above the antenna element threshold or the assistive node operates in the reflecting mode to reflect the packet transmission based at least in part on the number of antenna elements being at or below the antenna element threshold.

4. The assistive node of claim 1, wherein the at least one processor is further configured to:
receive the control signaling indicating a first beam of a first codebook that is associated with the assistive node operating in the amplifying mode, wherein the packet transmission is amplified by the assistive node using the first beam.

5. The assistive node of claim 1, wherein the at least one processor is further configured to:
transmit, to the network entity, a second message indicating an estimated distance between the assistive node and the network entity, wherein the control signaling indicates to operate in the reflecting mode to reflect the packet transmission or operate in the amplifying mode to amplify the packet transmission based at least in part on the estimated distance between the assistive node and the network entity.

6. The assistive node of claim 1, wherein the at least one processor is further configured to:
receive the control signaling indicating a distance threshold between the assistive node and the network entity, wherein the assistive node operates in the amplifying mode to amplify the packet transmission based at least in part on an estimated distance between the assistive node and the network entity exceeding the distance threshold or the assistive node operates in the reflecting mode to reflect the packet transmission based at least in part on the estimated distance between the assistive node and the network entity not exceeding the distance threshold.

7. The assistive node of claim 1, wherein the at least one processor is further configured to:
transmit, to the network entity, a second message indicating an estimated distance between the assistive node and the wireless device, wherein the control signaling indicates to one of operate in the reflecting mode to reflect the packet transmission or operate in the amplifying mode to amplify the packet transmission based at least in part on the estimated distance between the assistive node and the wireless device.

8. The assistive node of claim 1, wherein the at least one processor is further configured to:
receive the control signaling indicating a distance threshold between the assistive node and the wireless device, wherein the assistive node operates in the amplifying mode to amplify the packet transmission based at least in part on an estimated distance between the assistive node and the wireless device exceeding the distance threshold or the assistive node operates in the reflecting mode to reflect the packet transmission based at least in part on the estimated distance between the assistive node and the wireless device not exceeding the distance threshold.

9. The assistive node of claim 1, wherein the at least one processor is further configured to:
receive the control signaling indicating which one of the reflecting mode or the amplifying mode is to be applied to the packet transmission based at least in part on a message type of the packet transmission, a latency target associated with the packet transmission, a size of an analog beamforming codebook associated with the assistive node, beamwidths associated with beams in the analog beamforming codebook, a number and arrangement of antenna elements of the assistive node, a first threshold distance between the assistive node and the wireless device, a second threshold distance between the assistive node and the network entity, or a combination thereof.

10. The assistive node of claim 1, wherein the packet transmission is one of reflected via a reflective surface of the assistive node or amplified via one of a relay or a repeater of the assistive node.

11. The assistive node of claim 1, wherein the at least one processor is further configured to:
receive, from the network entity, a second message comprising the scheduling information and the control signaling.

12. The assistive node of claim 1, wherein the at least one processor is further configured to:
select at least a subset of antenna elements of the assistive node and a size of an analog beamforming codebook for amplifying or reflecting the packet transmission based at least in part on the control signaling indicating which one of the reflecting mode or the amplifying mode is to be applied by the assistive node.

13. A network entity comprising:
memory; and
at least one processor coupled to the memory, wherein the at least one processor is configured to:
receive, from an assistive node, a control message indicating that the assistive node is capable of operating in an amplifying mode and in a reflecting mode;

transmit, to the assistive node, scheduling information for a packet transmission;

transmit, to the assistive node, control signaling indicating which one of the reflecting mode or the amplifying mode is to be applied by the assistive node to reflect or amplify the packet transmission to a wireless device based at least in part on the control message; and transmit, to the assistive node, the packet transmission based at least in part on the scheduling information.

14. The network entity of claim 13, wherein the at least one processor is further configured to:

receive, from the assistive node, a second message indicating a number and arrangement of antenna elements of the assistive node, wherein the control signaling instructs the assistive node to use at least a subset of antenna elements of the assistive node for amplifying or reflecting the packet transmission based at least in part on the number and arrangement of antenna elements.

15. The network entity of claim 13, wherein the at least one processor is further configured to:

transmit the control signaling indicating an antenna element threshold, wherein the assistive node operates in the amplifying mode to amplify the packet transmission based at least in part on a number of antenna elements of the assistive node being above the antenna element threshold or the assistive node operates in the reflecting mode to reflect the packet transmission based at least in part on the number of antenna elements being at or below the antenna element threshold.

16. The network entity of claim 13, wherein the at least one processor is further configured to:

transmit the control signaling indicating a first beam of a first codebook that is associated with the assistive node operating in the amplifying mode, wherein the packet transmission is amplified by the assistive node using the first beam.

17. The network entity of claim 13, wherein the at least one processor is further configured to:

receive, from the assistive node, a second message indicating an estimated distance between the assistive node and the network entity, wherein the control signaling indicates to operate in the reflecting mode to reflect the packet transmission or operate in the amplifying mode to amplify the packet transmission based at least in part on the estimated distance between the assistive node and the network entity.

18. The network entity of claim 13, wherein the at least one processor is further configured to:

transmit the control signaling indicating a distance threshold between the assistive node and the network entity, wherein the assistive node operates in the amplifying mode to amplify the packet transmission based at least in part on an estimated distance between the assistive node and the network entity exceeding the distance threshold or the assistive node operates in the reflecting mode to reflect the packet transmission based at least in part on the estimated distance between the assistive node and the network entity not exceeding the distance threshold.

19. The network entity of claim 13, wherein the at least one processor is further configured to:

receive, from the assistive node, a second message indicating an estimated distance between the assistive node and the wireless device, wherein the control signaling indicates to one of operate in the reflecting mode to reflect the packet transmission or operate in the amplifying mode to amplify the packet transmission based at least in part on the estimated distance between the assistive node and the wireless device.

20. The network entity of claim 13, wherein the at least one processor is further configured to:

transmit the control signaling indicating a distance threshold between the assistive node and the wireless device, wherein the assistive node operates in the amplifying mode to amplify the packet transmission based at least in part on an estimated distance between the assistive node and the wireless device exceeding the distance threshold or the assistive node operates in the reflecting mode to reflect the packet transmission based at least in part on the estimated distance between the assistive node and the wireless device not exceeding the distance threshold.

21. The network entity of claim 13, wherein the at least one processor is further configured to:

transmit the control signaling indicating which one of the reflecting mode or the amplifying mode is to be applied based at least in part on a message type of the packet transmission, a latency target associated with the packet transmission, a size of an analog beamforming codebook associated with the assistive node, beamwidths associated with beams in the analog beamforming codebook, a number and arrangement of antenna elements of the assistive node, a first threshold distance between the assistive node and the wireless device, a second threshold distance between the assistive node and the network entity, or a combination thereof.

22. The network entity of claim 13, wherein the at least one processor is further configured to:

transmit, to the assistive node, a second message comprising the scheduling information and the control signaling.

23. A method for wireless communications at an assistive node, comprising:

transmitting, to a network entity, a control message indicating that the assistive node is capable of operating in an amplifying mode and in a reflecting mode;

receiving, from the network entity, scheduling information for a packet transmission;

receiving, from the network entity, control signaling indicating which one of the reflecting mode or the amplifying mode is to be applied by the assistive node based at least in part on the control message; and amplifying or reflecting the packet transmission to a wireless device based at least in part on the control signaling.

24. The method of claim 23, further comprising:

transmitting, to the network entity, a second message indicating a number and arrangement of antenna elements of the assistive node, wherein the control signaling instructs the assistive node to use at least a subset of antenna elements of the assistive node for amplifying or reflecting the packet transmission based at least in part on the number and arrangement of antenna elements.

25. The method of claim 23, further comprising:

receiving the control signaling indicating an antenna element threshold, wherein the assistive node operates in the amplifying mode to amplify the packet transmission based at least in part on a number of antenna elements of the assistive node being above the antenna element threshold or the assistive node operates in the reflecting mode to reflect the packet transmission based at least in part on the number of antenna elements being at or below the antenna element threshold.

26. The method of claim 23, further comprising:
receiving the control signaling indicating a first beam of a first codebook that is associated with the assistive node operating in the amplifying mode, wherein the packet transmission is amplified by the assistive node using the first beam.

27. The method of claim 23, further comprising:
transmitting, to the network entity, a second message indicating an estimated distance between the assistive node and the network entity, wherein the control signaling indicates to operate in the reflecting mode to reflect the packet transmission or operate in the amplifying mode to amplify the packet transmission based at least in part on the estimated distance between the assistive node and the network entity.

28. The method of claim 23, further comprising:
receiving the control signaling indicating a distance threshold between the assistive node and the network entity, wherein the assistive node operates in the amplifying mode to amplify the packet transmission based at least in part on an estimated distance between the assistive node and the network entity exceeding the distance threshold or the assistive node operates in the reflecting mode to reflect the packet transmission based at least in part on the estimated distance between the assistive node and the network entity not exceeding the distance threshold.

29. The method of claim 23, further comprising:
transmitting, to the network entity, a second message indicating an estimated distance between the assistive node and the wireless device, wherein the control signaling indicates to one of operate in the reflecting mode to reflect the packet transmission or operate in the amplifying mode to amplify the packet transmission based at least in part on the estimated distance between the assistive node and the wireless device.

30. A method for wireless communications at a network entity, comprising:
receiving, from an assistive node, a control message indicating that the assistive node is capable of operating in an amplifying mode and in a reflecting mode;
transmitting, to the assistive node, scheduling information for a packet transmission;
transmitting, to the assistive node, control signaling indicating which one of the reflecting mode or the amplifying mode is to be applied by the assistive node to reflect or amplify the packet transmission to a wireless device based at least in part on the control message; and
transmitting, to the assistive node, the packet transmission based at least in part on the scheduling information.

\* \* \* \* \*